(12) United States Patent
Boren

(10) Patent No.: US 7,877,758 B2
(45) Date of Patent: Jan. 25, 2011

(54) TRANSLATOR SOFTWARE FOR MONITORING, AUTOMATION, TESTING AND CONTROL

(76) Inventor: Gary W. Boren, 24702 Calle El Toro Grande, Lake Forest, CA (US) 92630

( * ) Notice: Subject to any disclaimer, the term of this patent is extended or adjusted under 35 U.S.C. 154(b) by 935 days.

(21) Appl. No.: 11/744,666

(22) Filed: May 4, 2007

(65) Prior Publication Data

US 2007/0271282 A1 Nov. 22, 2007

Related U.S. Application Data

(60) Provisional application No. 60/797,628, filed on May 4, 2006.

(51) Int. Cl.
*G06F 13/00* (2006.01)
(52) U.S. Cl. .................... 719/318; 715/700; 700/17
(58) Field of Classification Search ............... 719/318; 715/700; 700/17
See application file for complete search history.

(56) References Cited

U.S. PATENT DOCUMENTS 7,318,009 B2 * 1/2008 Beam et al. .................. 702/188

2004/0010731 A1 * 1/2004 Yu et al. ........................ 714/4
2007/0060108 A1 * 3/2007 East et al. ................ 455/414.1
2007/0179732 A1 * 8/2007 Kolman et al. .............. 702/118

* cited by examiner

*Primary Examiner*—Andy Ho
(74) *Attorney, Agent, or Firm*—Sean D. Burdick

(57) ABSTRACT

Menu-driven translator software prompts a computer user to create procedures for controlling modules external to the computer. The software prompts a non-programmer to enter familiar terms to create devices having a read or write interface, and to describe device functions for communicating with the external modules. Using created devices, the software conveniently prompts the user to compose sequences for running tests on modules, evaluating module responses, and logging results. Preferred translator software includes a User Module for controlling access rights, a Device Editor for creating devices, a Sequence Editor for creating sequences, a Sequence Execution Module for running sequences, and a Records Module for managing files created by the software and ensuring strict version control. The translator software may be embodied as a computer readable medium storing a series of process steps allowing the user to create the procedures.

20 Claims, 34 Drawing Sheets

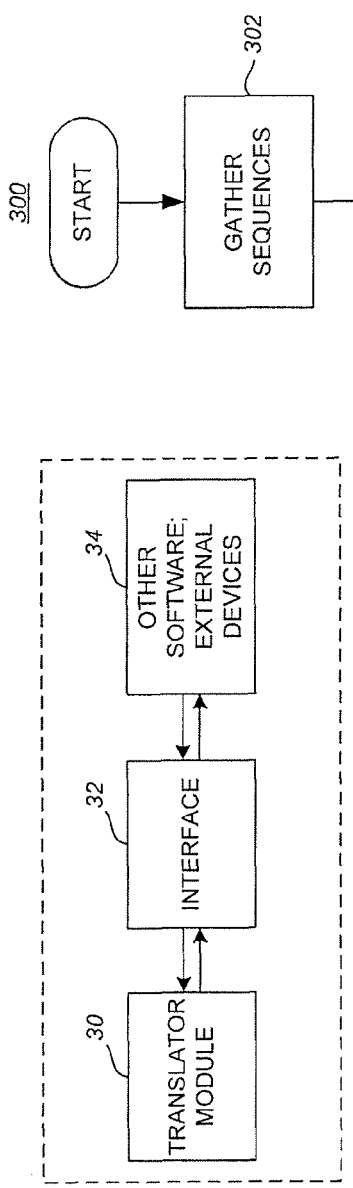
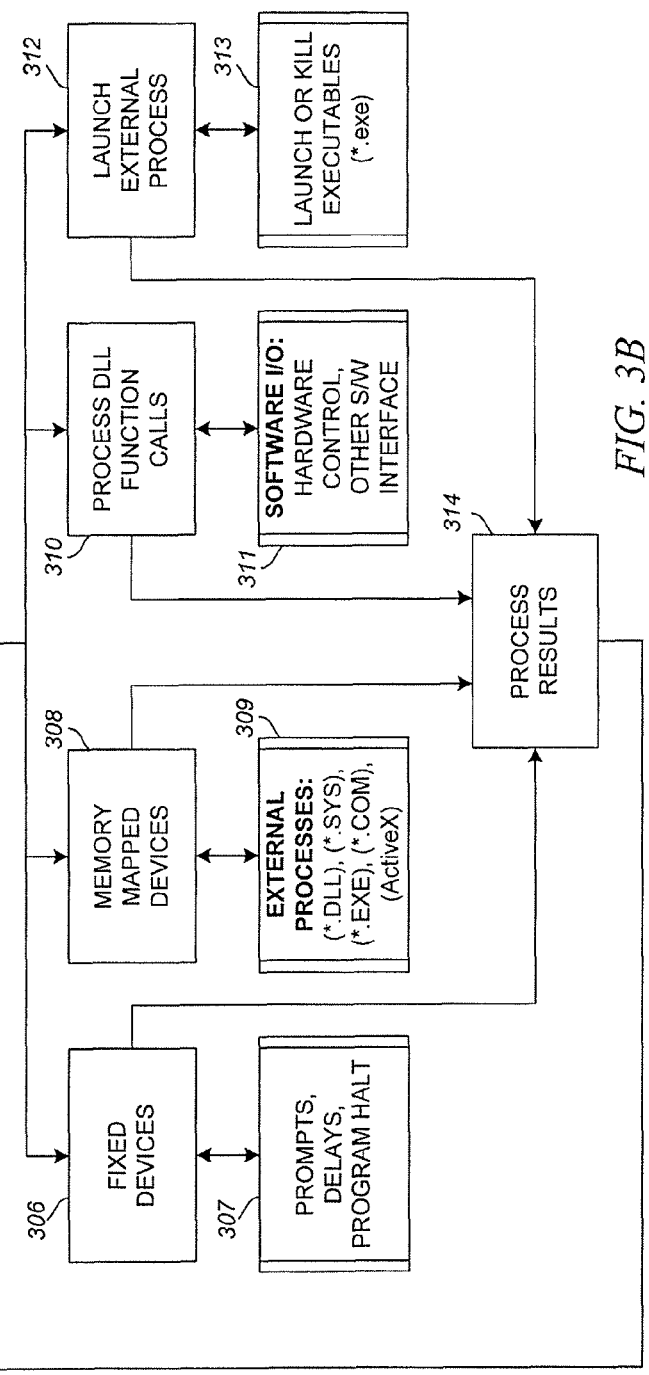
FIG. 3A
FIG. 3B

TRANSLATOR SOFTWARE FOR MONITORING, AUTOMATION, TESTING AND CONTROL

This application traces its filing priority to U.S. Provisional Patent Application No. 60/797,628, filed May 4, 2006, which is fully incorporated herein by reference.

BACKGROUND

1. Field

The invention relates generally to computer software for controlling hardware and software systems external to the computer. More specifically, the invention relates to a process enabling a computer user to create customized programs for monitoring, automating, testing, and controlling hardware and software systems external to the computer.

2. Background

Computerized control systems have been around since the 1960s. In the last two decades, the use and application of computer systems for automation and control have become commonplace in just about every industry, including aviation, banking, chemical processing, communications, construction, data processing, defense, engineering, entertainment, finance, investment, manufacturing, medicine, power generation, real estate, security, and transportation, to name a few. In developed nations today, computerized controls are seemingly omnipresent, having permeated nearly all segments of consumer-grade markets. Up-to-date microprocessor-based control systems can be found in common household products such as appliances, cameras, clocks, cookware, pianos, printers, stereos, thermostats, telephones, televisions, toys, and other home electronics and consumer goods.

Historically, the application of computerized control to a particular industrial process, hardware system, or consumer appliance has required the development of specialized software. A computer programmer or software engineer, or a team of software developers is typically employed to translate plain-language criteria as set forth, for example, in a software requirements specification, into a source code language. The source code may then be compiled into an object code that is executable by a computer processor. Depending on the complexity of the requirements, the operating system platform, the source code language selected, and the sophistication of the programmers, the customization of software can be a prohibitively expensive and time consuming part of the overall product development process.

Aggressive budgetary and scheduling demands often compel software developers to cut corners during development, such that it is now standard procedure for the developer to release unperfected software to the consuming public, knowing in advance that an indefinite number of upgrades may be periodically released to address any unresolved problems. As a result, the initial release of many customized software projects is an imperfect, user-unfriendly product to which the purchaser must continue to devote resources, for example, to acquire version upgrades and corresponding training.

From the developer's perspective, maintaining version control of software products adds another level of complexity to the development process. Electronic copies of software code under development are easily duplicated and disseminated, and can quickly lead to loss of configuration control. Where software development is subject to strict quality assurance requirements, such as in defense, aerospace, nuclear, and various other manufacturing industries, the ability to administratively control the release status of a version of software is, in and of itself, a critical component of the quality assurance program. For example, software used to automate manufacturing or testing procedures must be secure, archived, retrievable, and repeatable to ensure consistency and acceptable quality control in the manufacturing or testing process. Records of processes run, or of test results obtained must be traceable to the particular version of software that controlled the automation in order to troubleshoot, optimize, and properly audit the process. Without having such controls firmly in place, a development firm risks the release of unauthorized versions, corruption of released versions, or simultaneously release of different code bearing identical version numbers. Inadequate version control can lead to poor quality control, loss of accreditation of a corporate quality assurance program, and ultimately disqualification of a supplier.

As applications for computerized controls continue to expand throughout industrial and consumer markets, the need for software customization in those markets is growing beyond the availability of skilled labor to fulfill the need. What is needed is a simpler way to translate plain-language software requirements into computer executable controls that also provides for efficient administrative version control.

SUMMARY

The present invention addresses the foregoing problems by providing a menu-driven computer program called translator software that prompts a user in step-by-step fashion to create procedures for controlling external hardware and software modules. According to the invention, the translator software allows an unsophisticated computer user, or a non-computer programmer, to enter familiar terms that describe devices to be manipulated, and that describe sequences to be performed by the external modules. Using convenient menus of the translator software that prompt a user for needed input, the user may create devices, compose sequences, run sequence tests on modules and equipment, and save the results. When a sequence is deemed satisfactory, the translator software provides authorization for an administrator to release the sequence file to ensure strict version control.

The translator software in one embodiment contains five main modules: a User Module, a Device Editor, a Sequence Editor, a Sequence Execution Module, and a Records Module. The User Module allows an user having a highest security level (administrator) to control access rights of other human users, to add new users, delete existing users, and modify the security level of existing users, where security level determines the access rights of a user to perform certain operations in the translator module. The Device Editor contains a menu-driven Device Wizard which allows a user of appropriate security level to define new devices and device functions, for any device having a read or write interface, and guides the user through a series of steps for associating the devices with communication means for effecting device functions. Device types may include dll devices, memory mapped devices, predefined devices, and devices that launch an executable file. The Sequence Editor includes a menu-driven Sequence Wizard that prompts a user of proper security level to create a sequence of events consisting of read and write operations to and from devices. The Sequence Wizard allows the user to number the steps of the sequence as desired, specify acceptance criteria for a test, and specify whether a sequence may repeat and whether results should be recorded. The Sequence Execution Module allows an administrator to run released sequences. The Sequence Execution Module may conveniently include a menu with control buttons allowing the user to run a sequence, stop a sequence, pause a sequence, run a selected portion of a sequence, or return available results from memory. The Records Module allows an administrator to access electronic files for all devices, sequences, and test results defined, created, or performed by the translator software. Using this module, an administrator can manage data files that are stored in a database of the translator software, release newly created sequences, and permanently remove any unwanted files from the database.

In an embodiment of a method according to the invention, the translator software enables a computer user to create an executable procedure for executing a sequence of events in a module external to the computer through a series of steps. The steps include prompting the user to input device nomenclature representing one or more devices and to input event nomenclature representing one or more events to be processed by the one or more devices, mapping the event nomenclature to an executable file accessible by the computer, writing the device nomenclature and the event nomenclature to a database accessible by the computer, prompting the user to compose a sequence containing the device nomenclature and the event nomenclature, saving the sequence to the database and running the sequence upon user command by parsing event nomenclature from the database one event at a time.

In another embodiment of a method according to the invention, the translator software through a graphical user interface enables a computer user to create a procedure for automatically executing a sequence of events in a system external to the computer system as a series of steps. The steps include prompting the user to enter a device name representing a device, prompting the user to enter event nomenclature representing one or more functions of the named device, prompting the user to select a means for the device to communicate with the external system, prompting the user to enter a sequence name representing the sequence of events, prompting the user to compose the sequence of events by selecting each event from the event nomenclature, and saving the sequence name in the computer system, such that when the user selects the sequence name for execution, the device through the communication means causes the external system to perform the functions according to the sequence of events.

In another embodiment of the invention, the translator software may be a computer readable medium storing one of the foregoing methods as a series of process steps executable by a computer.

BRIEF DESCRIPTION OF THE DRAWINGS

The features, objects, and advantages of the invention will become more apparent from the detailed description set forth below when taken in conjunction with the drawings, wherein:

FIG. 3A is a relational block diagram depicting data flow among software modules operating according to the present invention.

FIG. 3B is a process flow diagram of a method using translator software according to the invention.

FIG. 40B is an illustration of a Sequence Wizard menu showing a user manually selecting individual sequences for running according to the invention.

DETAILED DESCRIPTION

Translator level software according to the invention allows a lay person without formal programming experience to create customized software for monitoring, automation, testing, or control of target hardware and software modules via a personal computer. The translator software allows a user to define communication devices, and functions of the communication devices, using familiar terms such as everyday words, names, and other common language. A user may then compose, using familiar terms, sequences of events by associating device names with the sequence. The user may then execute the sequence of events to automatically operate a computer-controllable target module. The complexity of the target module being operated may range from the very simplest such as a single electronic component, to a more complex system such as residential lighting system, to the most complex such as process controls in a manufacturing plant. The translator software eliminates the need for a user to hire expensive programmers to create customized software.

In addition, the translator software provides administrative controls. These allow an owner to control access rights to the software, and to authorize and control the release of sequences. The translator software also provides a means for saving sequences, and for saving results of tests run according to a sequence.

Figure 1:
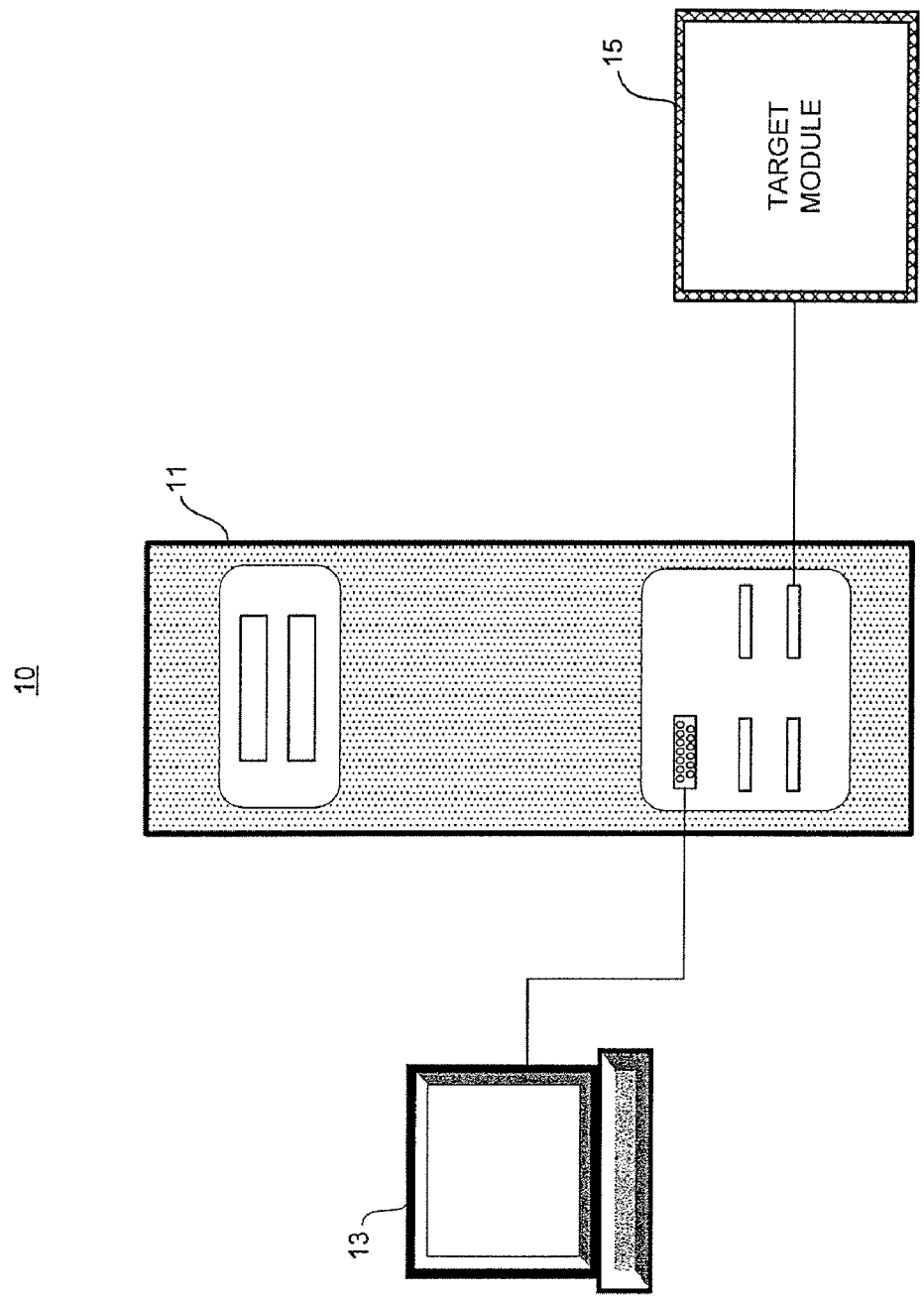
FIG. 1 is a general block diagram of one embodiment of a hardware system running translator software according to the present invention.

FIG. 1 shows one embodiment of a basic hardware system 10 implementing translator software according to the invention. System 10 may include a processing/storage unit 11, a display unit 13, and target module 15. In one embodiment, processing/storage unit 11 may be a processor coupled to memory, such as a microprocessor having integral memory, or a personal computer loaded with RAM, ROM and/or an accessible hard drive. One example of a processing/storage unit 11 according to the invention may be a personal computer, such as a desktop or laptop computer. Processing/storage unit 11 stores and runs the translator software of the present invention, and in this respect functions as a master controller. Hereinafter, processing/storage unit 11 may be referred to as personal computer 11 or simply as computer 11.

In one embodiment, personal computer 11 may include a processor such as a Pentium III processor with 256 MRAM, a 1 gigabyte hard drive, a medium-to-high quality video card such as those manufactured by ATI, Nvidea or Creative, and communication ports, preferably including at least four USB 2.0 ports. Software for the personal computer 11 may preferably include a GUI platform such as Windows XP home or professional operating system software, a Win32 program using XP functions, and an open source database such as a Firebird database engine. Other embodiments are possible within the scope of the invention wherein computer 11 runs a Linux, MacIntosh or other operating system.

Display unit 13 may be an industrial or consumer grade computer monitor, suitable for cooperation with computer 11 to effect the GUI functions. Display unit 11 may be a CRT, LCD, plasma screen, or other type of monitor. Display unit 13 may be coupled to computer 11 by any reliable means, such as a VGA, DVI, S-Video, or other standard video cable connector, or may receive video signals from computer 11 wirelessly. In one embodiment, display unit 13 may provide an 800×600 minimum display resolution.

Target module 15 represents one or more articles of hardware or software, usually external to computer 11, to be controlled, tested, operated, or monitored by the translator software running on computer 11. Target module 15 may represent a single component such as an on/off switch, a motor, a light, an alarm, or a relay, or it may be a complete system of controllable components, such as a lighting system, an amusement part ride, a pumping station, a heating & refrigeration system, an automated assembly line, or some other population or combination of electrical, mechanical, electromechanical, hydraulic, pneumatic, or optical components or instruments or other controllable target modules. Target module 15 may also represent executable software, such as a .dll or .exe program, that interfaces directly with controllable hardware. Alternatively, target module 15 may represent another computer or controller capable of receiving an actuation signal from computer 11.

As used throughout this disclosure, a "device" is hardware or software that has read, write, or read & write interfaces. These interfaces may allow the device to be controlled or queried, e.g., using memory mapping, by a sequence or by another device. A device may exist in or as part of a module that is a computer program, an instrument of hardware, a hardware system, or other equipment whose operation may be controlled or monitored. Typically, a device interfaces, or is capable of interfacing, with a computer by means of a memory-mapped executable file (*.exe) or dynamic link library (*.dll). One example of a device is a "prompt" in the form of a window displayed on a computer monitor employed as a GUI. The window may include an OK button and some text describing a sequence to be performed if the OK button is selected by a user. Another example of a device is a time delay, or a "delay device", which when executed causes a specified amount of time to lapse between execution of events. A delay device may include an argument for specifying the length of the time delay. Another example of a device is a switching circuit having a write interface for receiving on/off commands.

As used throughout this disclosure, a "sequence" is a single event or a chain of events. Typically, a sequence connotes a series of events, or functional steps, for manipulating devices. In a sequence of events, each event may represent a read or write event performed on or by a device, or some other operation performed on or by a device.

As used throughout this disclosure, the term "test" as in "unit under test" may refer to either testing, operating, or otherwise manipulating a module by means of a sequence writing data to and/or reading data from one or more devices.

Figure 2:
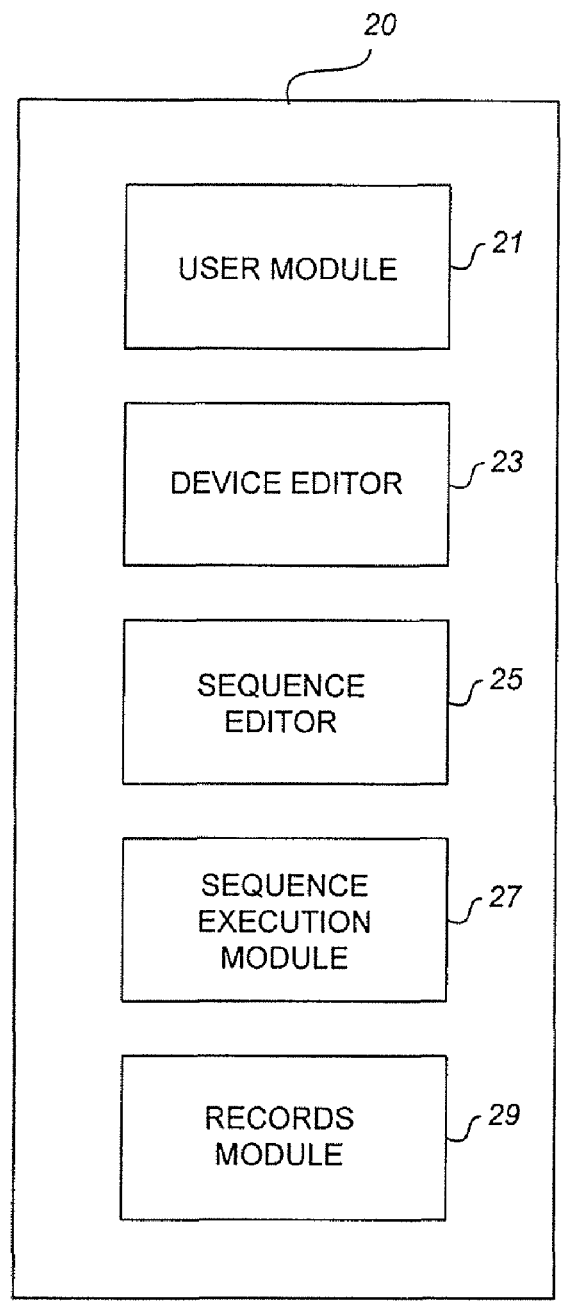
FIG. 2 is a block diagram showing software modules that make up one embodiment of translator software according to the invention.

FIG. 2 is a block diagram showing software modules that make up one embodiment of translator software according to the invention. The translator software may be stored as a series of instructions on a computer readable medium such as a hard disk or other electronic, magnetic, or optical storage medium. The translator software (or equivalently Translator Module 20) may include a User Module 21, a Device Editor 23, a Sequence Editor 25, a Sequence Execution Module 27, and a Records Module 29. One or more of these software modules may be menu-driven programs that prompt a user to enter basic information needed to operate the software. For example, the menu-driven program may provide one or more windows, such as those employed in GUI programs. The window may contain textual descriptions and fields, and the textual descriptions may describe the type of information that a user is to enter into a field. A user may enter the information by positioning a cursor at the field using a mouse or other input mechanism, and then pressing a button to allow entry of data into the field.

User Module 21 allows an Administrator (i.e. a person having highest security level) to control access rights of other human users. User Module 21 allows the Administrator to add new users, delete existing users, and modify the security level of existing users. In one embodiment, multiple security levels are possible, where security levels determine the access rights of a user to perform certain operations in Translator Module 20. In one embodiment, User Module 21 may allow for three security levels: User, Operator, and Administrator. A User may have the lowest security level, which may include a right to create new devices and sequences, and to view records of previously released sequences. An Operator may have the next highest security level, which in addition to all rights of a User, may further include a right to run previously released sequences. An Administrator may have the next highest security level, which in addition to all rights of an Operator, may further include a right to release newly created sequences, a right to save records, and a right to add, delete, and modify security rights. A Programmer has the highest security level, with all possible access rights. The Programmer security level may be reserved, for example, for the author of the translator software.

The User Module 21 may also associate passwords with individual users for added security. When starting Translator Module 20, the user module 21 may prompt the user for a name and password before proceeding with the program. This process is described below in greater detail in the context of method 400.

As used throughout this disclosure, the term user (with lower case u) refers to a computer user in general, and may include one or more of a User, Operator, Administrator, or Programmer. The term User (with upper case U) refers to a user having a specific security level, which is the lowest security level.

Device Editor 23 allows a user of appropriate security level to define new devices. In one embodiment, Device Editor 23 contains a Device Wizard in the form of a menu-driven program that prompts a user to enter basic information needed to define a device, such as a device name and function. For example, the Device Wizard may prompt a user to enter a familiar word or lay terminology to use as a name for the device being defined. The Device Wizard may also prompt the user to enter another lay term to describe a function to be performed by or on the device being defined. The Device Wizard then guides the user through a series of steps that allow a user to associate the newly defined device with pre-defined programs that perform the function just described. The pre-defined program associated with the device will depend on the type of device being created. Examples of types of devices may include dll devices, memory mapped devices, pre-defined devices, and devices that simply launch a pre-existing executable file.

Sequence Editor 25 allows a user of appropriate security level to create a sequence. The Sequence Editor 25 allows a user to specify whether the sequence created performs read, write, or read & write operations, whether read operations pass or fail, whether and how many times a sequence should be repeated, and whether or under what circumstances the results of running the sequence should be recorded. In one embodiment, Sequence Editor 25 includes a Sequence Wizard in the form of a menu-driven program that prompts a user to enter basic information needed to create a sequence. This basic information may include indicia such as the name of a unit under test, its part number, etc. Because a sequence is a chain of events, the Sequence Wizard allows a user to number each event according to a sequence number so that the events execute in their proper order. Accordingly, the basic information may also include a starting sequence number. The Sequence Wizard also allows the user to specify write data to be written to a device if the event requires a write, and may further allow the user to specify read data expected from a device if the event requires a read, and to establish parameters for comparing the value of read data to pass/fail criteria.

Sequence Execution Module 27 allows a user of appropriate security level to run released sequences. This module may appear as a menu from which a user may select whether to run a sequence, stop a sequence, pause a sequence, run a selected portion of a sequence (i.e. a sub-sequence), or return available results from memory. In one embodiment, the sequence execution module may appear as a window containing selectable icons that represent the foregoing functions, and that when selected, execute the function represented.

Records Module 29 allows an Administrator to access electronic files for all devices, sequences, and test results defined, created, or performed by the Translator Module 20. Using this module, an Administrator can manage data files that are stored in a database of the translator software. This management right includes the ability to release files, and permanently remove any unwanted files from the database.

Main Process Flow

FIG. 3A is a relational block diagram depicting data flow among software modules when running a sequence according to the present invention. Generally, a translator module 30 communicates through an interface module 32 to either write data to or read data from a device 34. The type of interface module 32 depends on the type of device 24 being controlled or queried. A device 34 may be an external device, another software module, or an external control module associated with a particular hardware. Translator module 30 includes the software engine that prompts a user to input custom terminology, and parses the custom terminology and fixed terminology to define devices and create sequences. Once devices are defined using translator module 30, the translator module may be used to create custom sequences for manipulating the devices.

FIG. 3B shows process flow in the system of FIG. 3A, for a translator module 30 running a custom sequence. This figure depicts a process 300 using translator software for controlling up to four general device types. The first two steps 302 and 304, and the final processing step 314, may be performed by a translator module 30 according to the invention. Steps 306, 308, 310 and 312 are interfacing steps. In one embodiment, the interfacing steps may also be performed by the translator module software. Each step 306, 308, 310 and 312 is associated with a respective processing step 307, 309, 311 and 313. Step 307 may be performed by the translator software or by an external process. Steps 309, 311 and 313 may be performed or executed by processes external to the translator module.

The first step in the process is step 302, in which a translator module gathers one or more user-defined sequences to be processed. The gathering step may include receiving or acting on a user command to run the sequence. The sequences gathered may depend on whether the translator software is being operated in editor mode or release-candidate mode. These modes are described below in further detail in the section entitled Records Module. In the editor mode, sequences are processed incrementally from memory. In the release-candidate mode, the sequence name is selected, and the program finds this sequence table in the database. Each record is processed one at a time to avoid corrupting the table or using unnecessary memory. Creation of a sequence using the translator module is described below in further detail in the section entitled Sequence Editor.

In the next step 304, the translator module parses a single function (i.e. a sequential element) from the sequence for processing according to the type of device being driven. The parsing step isolates the sequential element to ensure that the translator module communicates with the proper interface to drive the device. The interface may be a fixed device interface, a memory mapped device interface, a function call interface, or an interface for launching an external process.

If the device is a fixed device, the process 300 goes from step 304 to step 306. In this step, which is an interfacing step, the translator module calls a fixed program or subroutine. Fixed devices are typically generic, and may be used in any sequence. Fixed devices may be pre-defined in the translator software, or they may be defined by a user. Examples of fixed devices include prompts, delays, and program halts. A prompt device may alert a user for manual input, such as input needed to continue the sequence, or to input specific data. A prompt may also request entry from a user of objective pass or fail criteria. A program halt device may stop execution of a sequence. A delay device may define a high-resolution time period between sequence elements, e.g. to specify how long a function may run. An unlimited number of fixed devices are possible. When the fixed device has been called, the process 307 is performed in response to the call. For example, step 307 may prompt a user, cause a timing delay, halt a sequence, etc. After the call has been answered, the process proceeds to step 314.

If the device is a memory mapped device, the process 300 goes from step 304 to step 308. In this interfacing step, the translator module may execute an external process 309 using memory mapping to call the process. A memory map, also known as file mapping, allows two or more applications to share memory. For example, Win32-based applications cannot share memory by any other means. The usage here is to pass data to and from external applications within an environment such as Win32 or Windows. When execution has been initiated in the external process 309 the process proceeds to step 314.

If the device is a function call, such as a *.dll function, the process 300 goes from step 304 to step 310. In this interfacing step, the translator module may call and execute an internal *.dll file associated with a device to be controlled. One implementation of a working dll for translator software according to the invention is given in the following example:

Example cpp File for Dynamic Link Library:

```
#include <windows.h>
#include "cdrom_class.h"
//declared cdrom_class to use global
cdrom_class *cdrom_cls=NULL;
BOOL APIENTRY DllMain( HANDLE hModule,
                      DWORD ul_reason_for_call,
                      LPVOID lpReserved
                    )
{
    switch(ul_reason_for_call)
    {
      case DLL_PROCESS_ATTACH:
        if(cdrom_cls == NULL)
        {
            cdrom_cls = new cdrom_class;
```

```
        }
        // Initialize once for each new process.
        // Return FALSE to fail DLL load.
        break;
    case DLL_THREAD_ATTACH:
        // Do thread-specific initialization.
        break;
    case DLL_THREAD_DETACH:
        // Do thread-specific cleanup.
        break;
    case DLL_PROCESS_DETACH:
        if(cdrom_cls != NULL)
        {
            delete cdrom_cls;
            cdrom_cls = NULL;
        }
        // Perform any necessary cleanup.
        break;
    }
    return TRUE;
}
```

When execution of the *.dll has been initiated in step 311, the process proceeds to step 314. If the device is an external process, the process 300 goes from step 304 to step 312. In this interfacing step, the translator module may launch or terminate an executable file (*.exe, *.bat, *.lnk, etc.), such as notepad.exe or any other executable file. Executable files include all types of executable files, and not just those having ".exe" extensions. When the executable file is launched, it may run in real time. The interface to the executable file is preferably effected through memory mapping. This type of interface may be useful for running background processes and for working in conjunction with a memory mapped device. Once the *.exe function begins running in step 313, the process proceeds to step 314.

Where other software or external processes or devices 307, 309, 311 or 313 return data responsive to a call, the flow of that data returns to the translator module through the corresponding interfacing module 306, 308, 310 or 312. This is conceptually illustrated by the double-ended arrows in FIG. 3B. If any interfacing step 306, 308, 310 or 312 requires return data, that return data is processed in step 314. For example, with the translator software running in an Editor or Composer mode, expected return data may be displayed in step 314. Or, with the translator software running in an Execution or Run mode, if return data is set to be logged, the return data may be stored in a database table, and may also be displayed, in step 314. Data may be set to log, for example, when an error occurs, or when a pass or fail condition is detected as a result of interfacing with other software or external devices. After processing return data and any other results of functions called or programs executed during an interfacing step, process 300 returns to step 304 for the parsing of the next sequence, or next event in a sequence being run.

Menu-Driven Components

Figure 4:
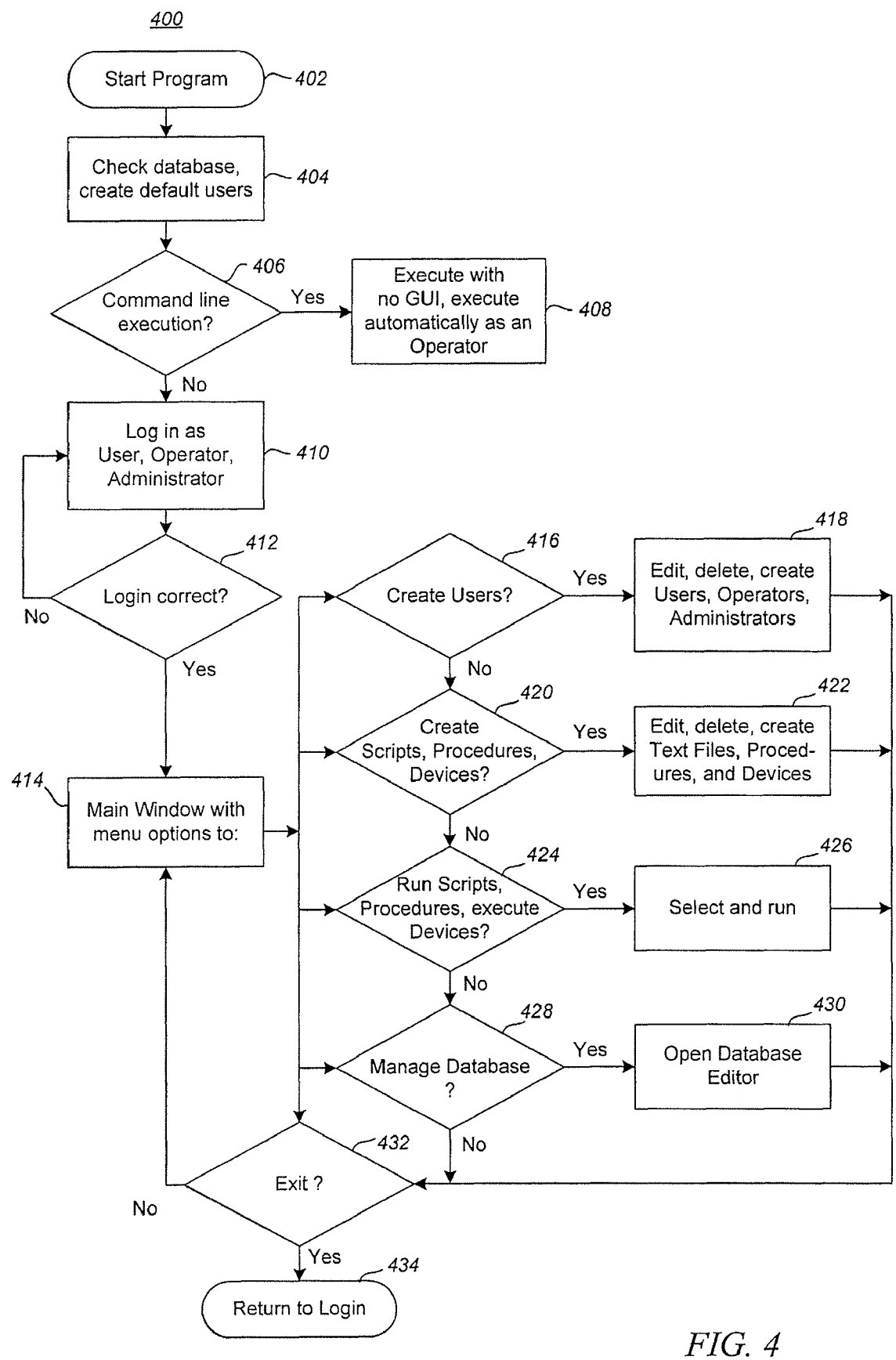
FIG. 4 is a top level flow diagram of one embodiment of translator software according to the invention.

FIG. 4 is a top level flow diagram of one embodiment of translator software according to the invention, illustrating a menu-driven process 400 for operating the software. The software may display windowed menus on a computer monitor (GUI) during steps of process 400 that require user action. Alternatively, the software may prompt a user using command line input/output.

The process begins by starting the translator software program at step 402. After starting the program, the translator software performs an automatic verification step 404, in which it checks to determine whether the proper database exists on the host computer system, and whether default users exist. In a preferred embodiment, the database is a Firebird database. If the database or default users do not exist, the translator software creates them in step 404. A more detailed description of verification step 404 is provided in method 500.

After ensuring that the database and default users exist, the process moves to step 406. In step 406, the program checks for any command line arguments being passed. For example, this step may allow a user entering command line arguments to operate the translator software using command line execution. If command line arguments are being passed, the process moves to step 408 to allow the software to be executed by command line input and output. For example, a Programmer may wish to run the program manually for diagnostic or other purposes. In this case, the remaining menu-driven process blocks are not executed. If execution by GUI is selected, the process moves to step 410.

Figure 12:
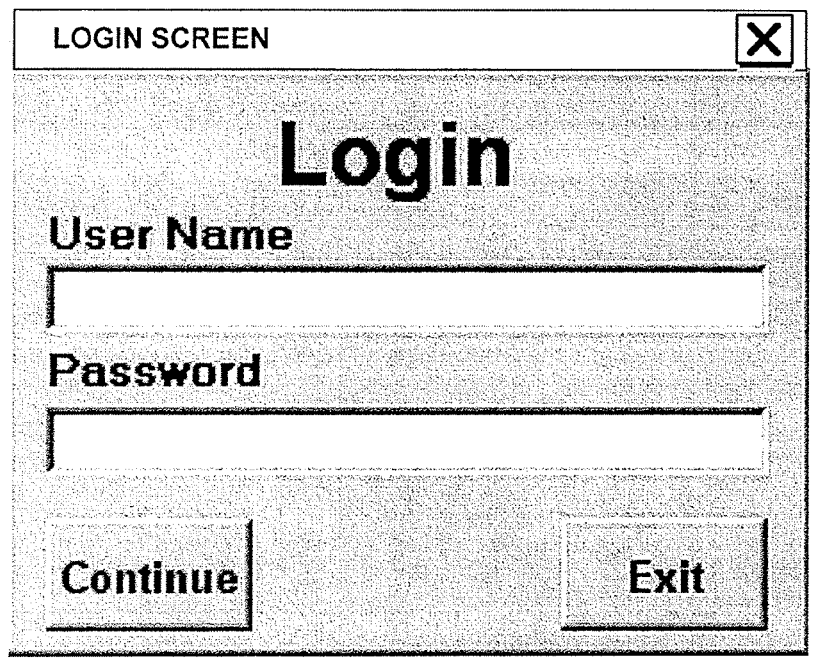
FIG. 12 is an illustration of a login menu in one GUI embodiment of the invention.

Step 410 is a log-in step, in which the program prompts a user to log in, for example, by entering a user name and password. An example of a log-in menu is shown in FIG. 12. In this step, based on the user input, the translator software may determine the security level of the person attempting to access the program, e.g., whether the person is a User, Operator, Administrator, or Programmer. In the next step 412, the software may determine whether the attempted login is correct. This may be done by comparing the login information to permissions data stored in the database, as established according to method 700 described below. If based on this comparison, the login information cannot be verified, the method loops back to step 410.

Figure 13:
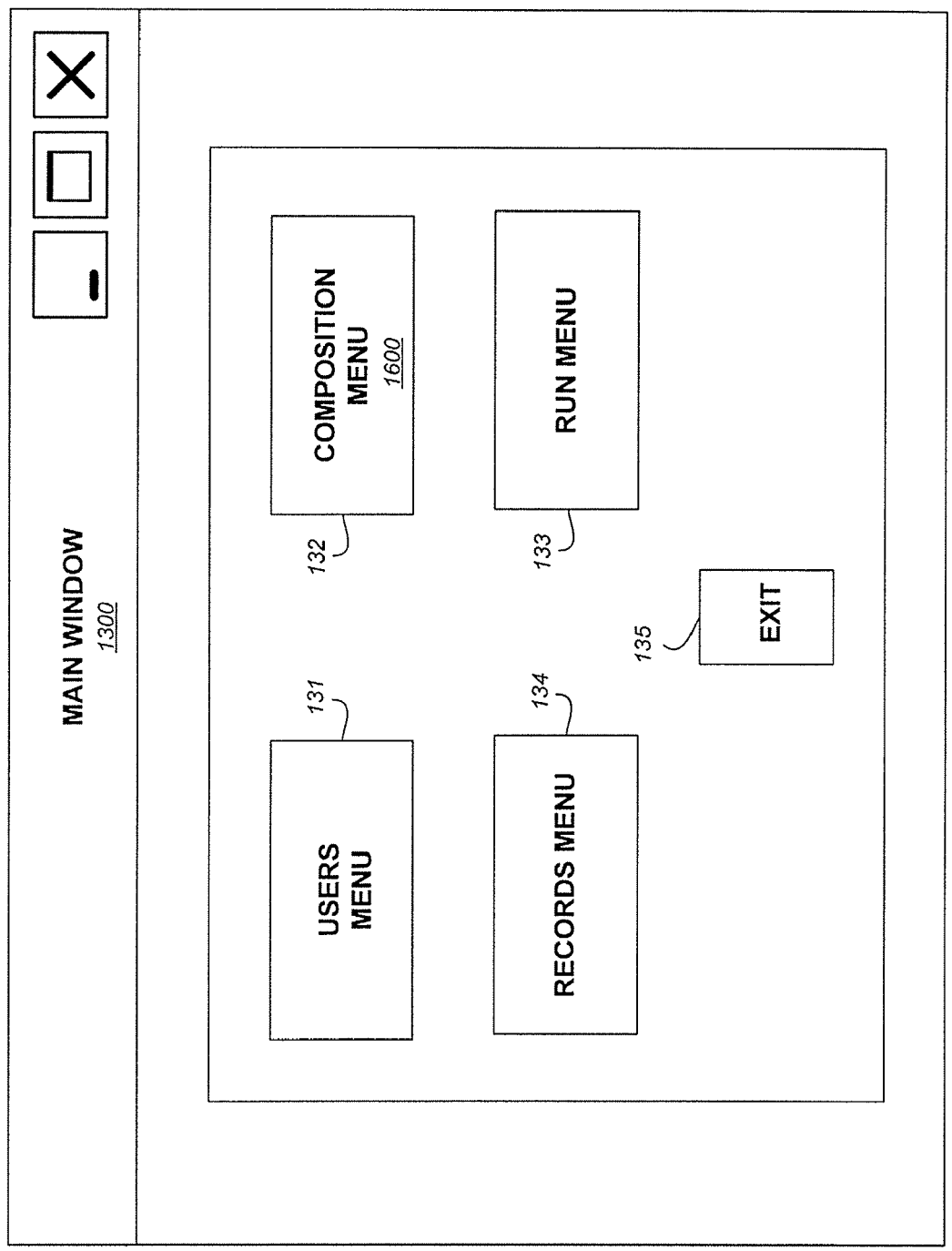
FIG. 13 is an illustration of a Main Window menu in a GUI embodiment of the invention.

If the login information is correct, the method proceeds to step 414. In step 414, the Main Window is displayed. The Main Window displays the main software modules that make up the translator software of the invention as selectable buttons or icons. These buttons or icons may represent the User Module 21, the Device Editor 23, the Sequence Editor 25, the Sequence Execution Module 27, and the Records Module 29. One example of a Main Window is shown in FIG. 13. In this example, User Module 21 is represented by button 131, Device Editor 23 and Sequence Editor 25 are represented by button 132, Sequence Execution Module 27 is represented by button 133, and Records Module 29 is represented by button 134. An additional exit button 135 may be provided to allow a user to terminate the program. Each of the buttons corresponds to a decision block in method 400. From step 414, the process can proceed along any of the parallel paths leading to these decision blocks, depending on user selection.

Button 131 corresponds to decision block 416. When an Administrator or other user having the proper security level wishes to create a new user, selection of button 131 moves process 400 from decision block 416 to process block 418. In block 418, the user may create new users, delete existing users, or edit the login and related information of existing users. The security levels of users may be modified in this block. In one embodiment, only a user having Administrator security may access block 418. A more detailed description of operations that may be performed in block 418 is provided in method 600.

Button 132 corresponds to decision block 420. When a user having the proper security level wishes to create text files, procedures, or devices, selection of button 132 moves process 400 from decision block 420 to process block 422. In block 422, the user may edit, delete or create new text files, procedures and devices. A text file in this context is a written description of a device or sequence that does not contain embedded commands. In one embodiment, text files for devices and sequences are created by the translator software whenever a user creates a sequence or device using the Device Editor or the Sequence Editor. The text file that the editor creates is a keyword document listing properties and information related to the device or the sequence to which it relates. In a preferred embodiment, the translator software loads this text file into a link list for editing purposes. The link list may store the composition in memory, which gives the user the ability to run an individual sequence or a group of sequences whose keywords are contained in the text file. A "procedure" in this context is an electronic document created using the translator software that may contain one or more text files and one or more sequences that manipulate devices. In one embodiment, only a user having a proper security level may access block 422. A more detailed description of operations that may be performed in block 422 is provided in method 700.

Figure 14:
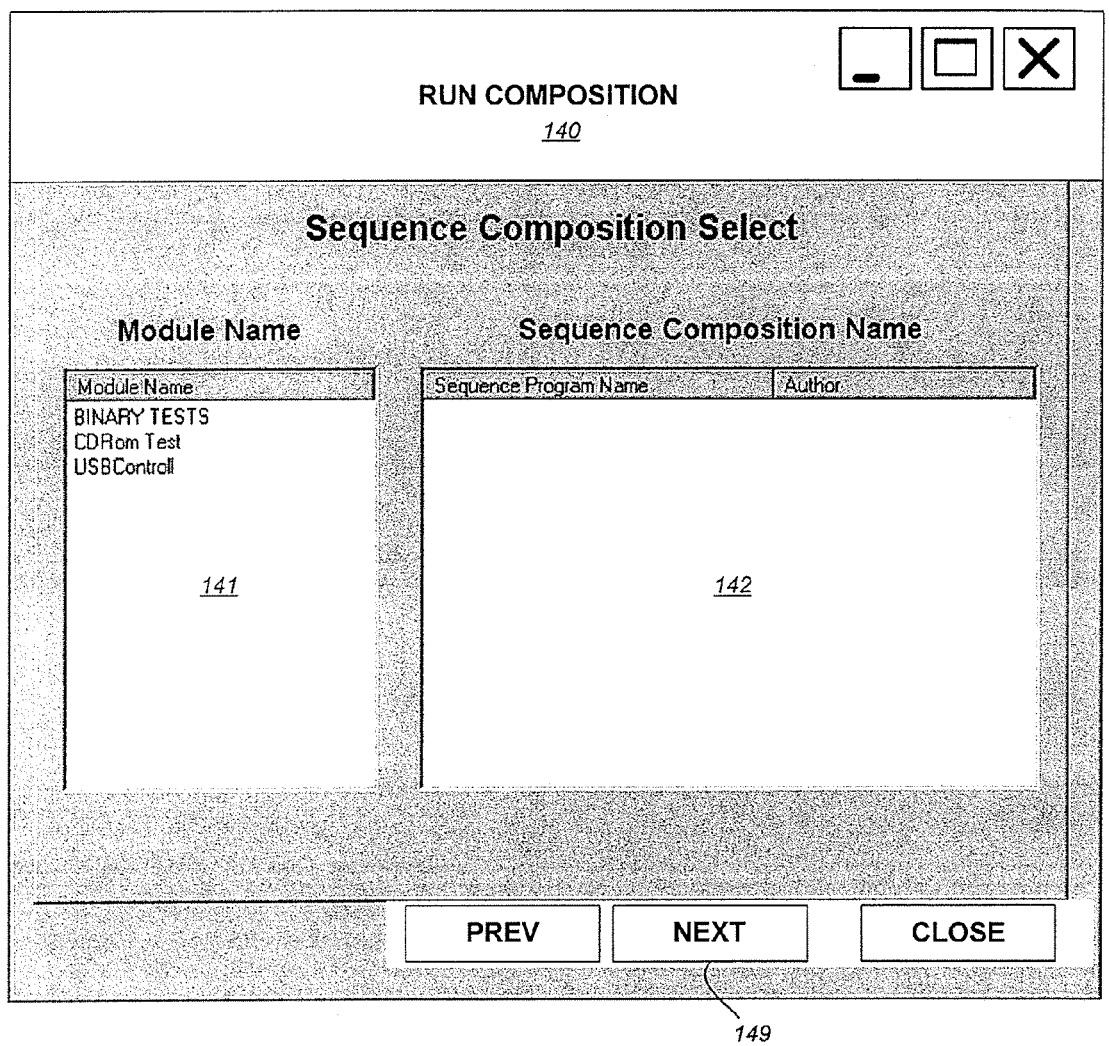
FIG. 14 is an illustration of a menu displaying selectable text files and procedures in a GUI embodiment of the invention.

Button 133 corresponds to decision block 424. When a user having the proper security level wishes to view pre-existing text files, or run pre-existing procedures to execute devices, selection of button 133 moves process 400 from decision block 424 to process block 426. In block 426, the user may select a text file or procedure from a list of possible text files and procedures. An example of a menu window displaying such a list is shown in FIG. 14. Through one or more additional menu selections, the user may then view the desired text file or run the desired procedure. In one embodiment, a user of any security level may access block 426. A more detailed example of a GUI embodiment for selecting and running a procedure according to the invention is provided below in the discussion of FIGS. 14 and 42-45.

Button 134 corresponds to decision block 428. When a user having the proper security level wishes to view, edit, delete, save, print or otherwise manage electronic records created by the translator software, selection of button 134 moves process 400 from decision block 428 to process block 430. In one embodiment, any user may access block 430 in order to view or print records, and only a user having at least Administrator security level may access block 430 in order to save new records, delete existing records, or edit database tables or their content. One example of a record created by the translator software is saved sequence. Another example of record is a data sheet showing the results of a particular instance of running a sequence. Another example of a record is a text file for a released version of a sequence. In one embodiment, a datasheet may be saved to the database as Rich Text Format (RTF) or as a comma delimited file. A more detailed example of a GUI embodiment for managing records according to the invention is provided below in the Records Module section that discusses FIGS. 43 through 47B.

Button 135 corresponds to decision block 432. Any user, by selecting button 135, may exit the process. This moves process 400 to block 434, which returns the user to the login step 410. In the foregoing embodiment, all buttons 131-135 are made available to a user viewing the Main Window. Other embodiments are possible wherein the main menu is a drop-down menu, or where decisions may be resolved sequentially, as indicated by the No paths in FIG. 4. In any embodiment, the Main Window offers a user having proper security level access to the main modules of the translator software, e.g., User Module 21, Device Editor 23, Sequence Editor 25, Sequence Execution Module 27, and Records Module 29.

Figure 5:
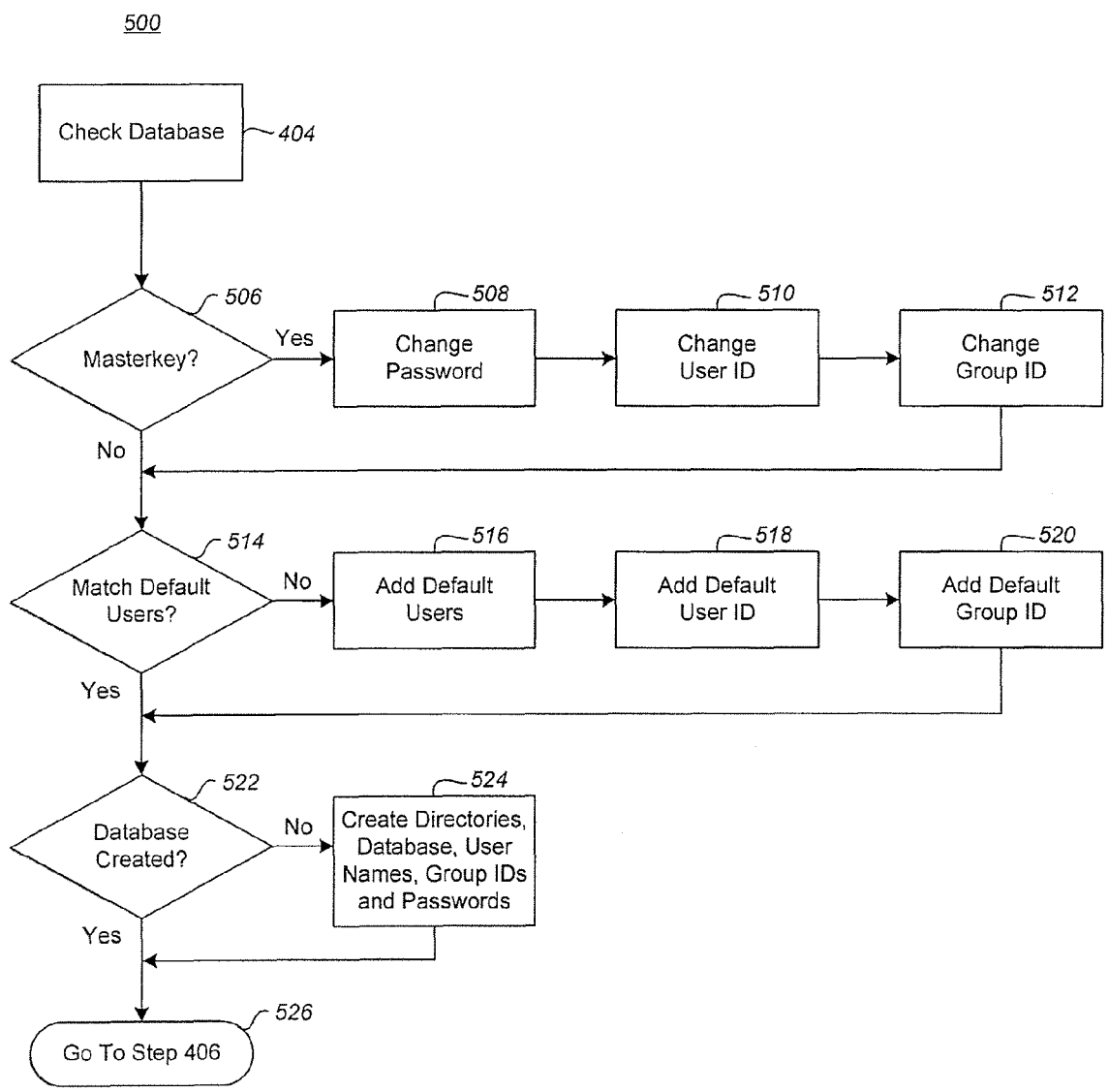
FIG. 5 is a flow diagram showing first-time startup operations of translator software according to one embodiment of the invention.

FIG. 5 illustrates one embodiment of a routine 500 that corresponds to process block 404 for checking the database and creating default users at program start-up. In the first step 506, the program checks the database for a master key. The master key is the default password for the database upon initial installation of the translator software. If the master key is detected, the process proceeds in series to steps 508, 510 and 512. These steps allow a first-time user, or a user running the translator software for the first time, to change or create the password, user ID, and group ID (if any), as indicated in the flow chart. The process then moves to step 514. If in step 506, no master key is detected, the process moves directly to step 514. In step 514, the program checks for a default user match. If no match is found, the program adds default users in step 516, adds corresponding default user IDs in step 518, and adds a default group ID in step 520. The process then proceeds to step 522.

In step 522, the program surveys the host computer to verify that it can access the proper database (e.g. Firebird). If the database cannot be found, the program proceeds to step 524 to create the database, create a database name, database tables, directories, user names, group IDs, and passwords. In one embodiment, the program automatically installs the database in this step. In another embodiment, the program may prompt the user to install the database software in this step. In another embodiment, the program may download the database software from an external source, for example, the Internet. At the conclusion of this step, the program returns to step 406. If in step 520 the program finds that the proper database already exists, the process bypasses step 522 and returns directly to step 406.

Steps 514 and 522 are built-in safety features, in that if there are not default users in the database, the translator software will create them, along with the directories and the database if necessary. The translator software thereby always maintains a list of default user names, a database, and a directory. If the default user names are ever deleted, step 514 ensures that these names will be added every time the program starts.

Figure 6:
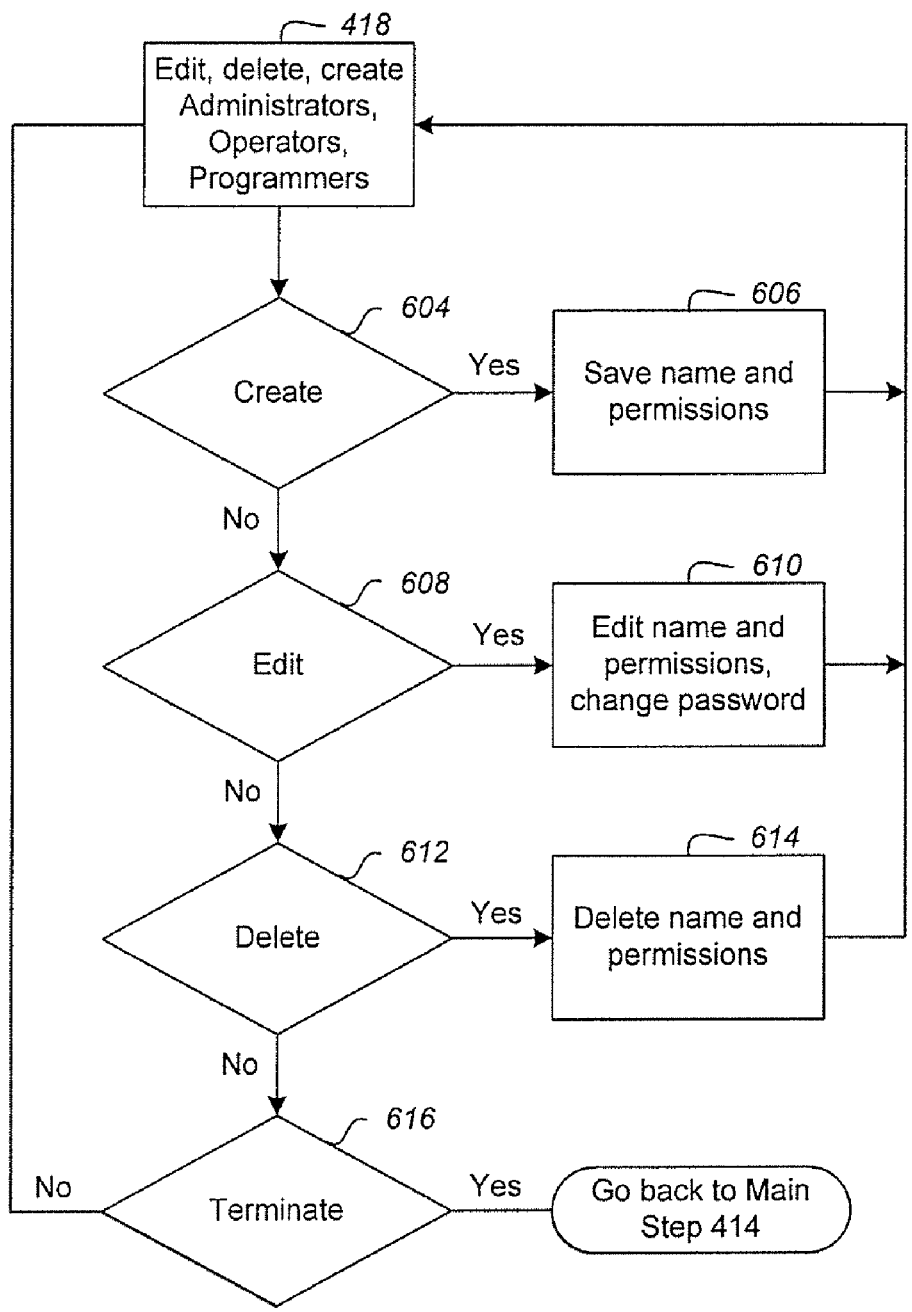
FIG. 6 is a flow diagram showing operation of translator software according to the invention when creating custom nomenclature for sequences and devices.

FIG. 6 illustrates one embodiment of a routine 600 that corresponds to block 418 for managing security rights stored in the database of the translator software. Decisions made in routine 600 may consist of the translator software sequentially prompting an instant user through command line or GUI means, and making a decision based on responsive user input. The first decision block in this routine is 604, which determines whether the instant user wants to create a new user. If so, the process moves to step 606 for entry of the new user name, selection of a security level for the new user name, and selection of permissions (if any). The permissions may be set according to security level, or there may be one or more permissions selectable or de-selectable with respect to default permissions established by security level. If the instant user does not want to create a new user, the process flows to step 608.

Step 608 determines whether the instant user wishes to edit the permissions or the security level of an existing user. If so, then step 610 is performed. In step 610, the routine allows the instant user to access the database and freely edit the name, security and permissions fields established for the existing user. One or more passwords may also be changed in this step. If no editing is desired, then the routine moves to step 612. In step 612, the routine determines whether the instant user wishes to delete an existing user. If so, the routine moves to step 614 wherein the instant user is given access to freely delete any existing user names. In one embodiment, deletion of a user name also deletes all permissions, security levels, and other data associated uniquely with that user name. The routine then returns to step 418. If, however, the routine determines that the instant user does not wish to delete any existing users, the routine proceeds to decision block 616. Block 616 determines whether the instant user wishes to continue managing user security rights, in which case the routine returns to block 418, or whether the user wishes to terminate the routine. In the latter case, the routine terminates by returning to the Main Window step 414.

Figure 15:
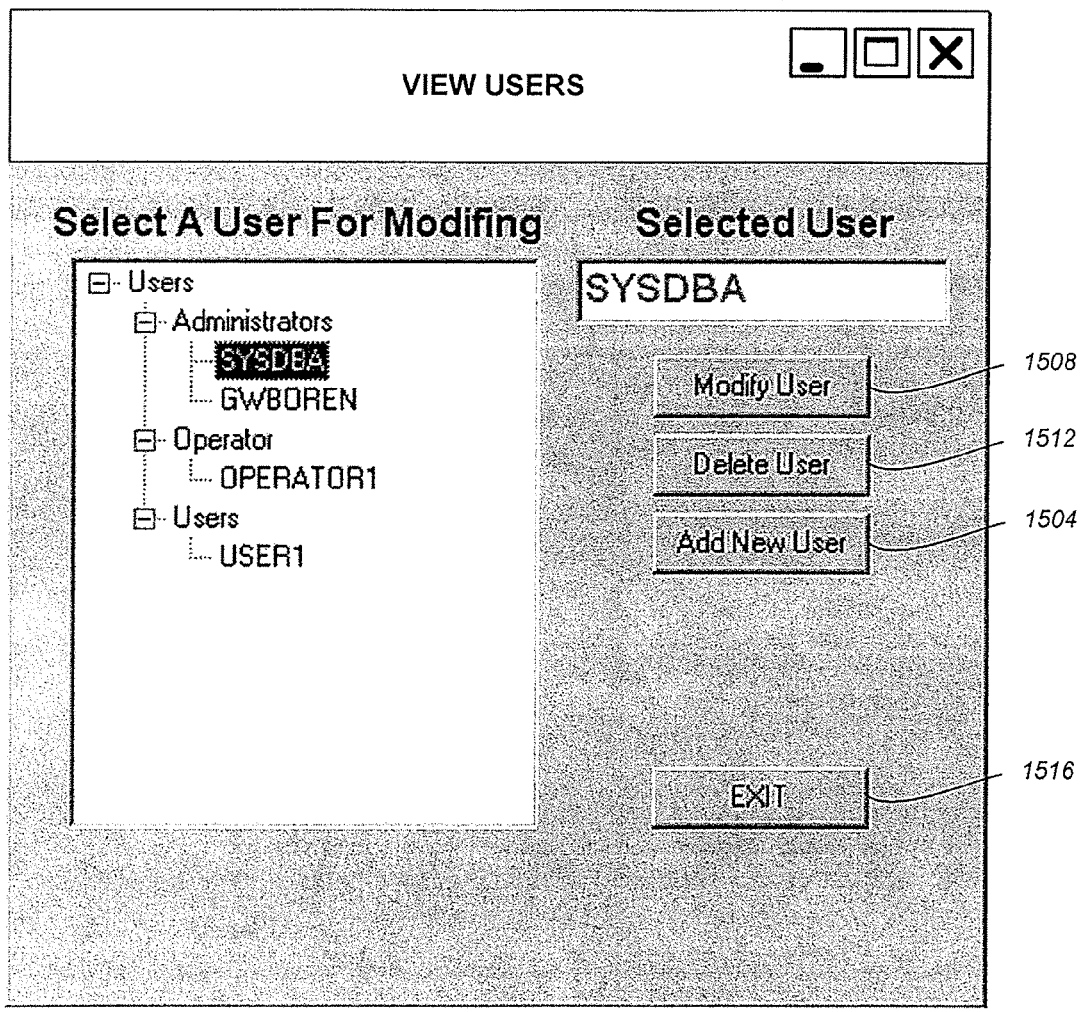
FIG. 15 is an illustration of a menu for managing users and security levels in an embodiment of the invention.

Routine 600 may be embodied as a GUI menu such as that shown in FIG. 15. Options for creating a new user, editing an existing user, deleting an existing user, or exiting the routine may be provided as selectable buttons 1504, 1508, 1512, and 1516 that correspond respectively to decision blocks 604, 608, 612, and 616. In this case, the process may flow from step 418 directly to any of decision blocks 604, 608, 612 and 616, rather than sequentially.

Figure 7:
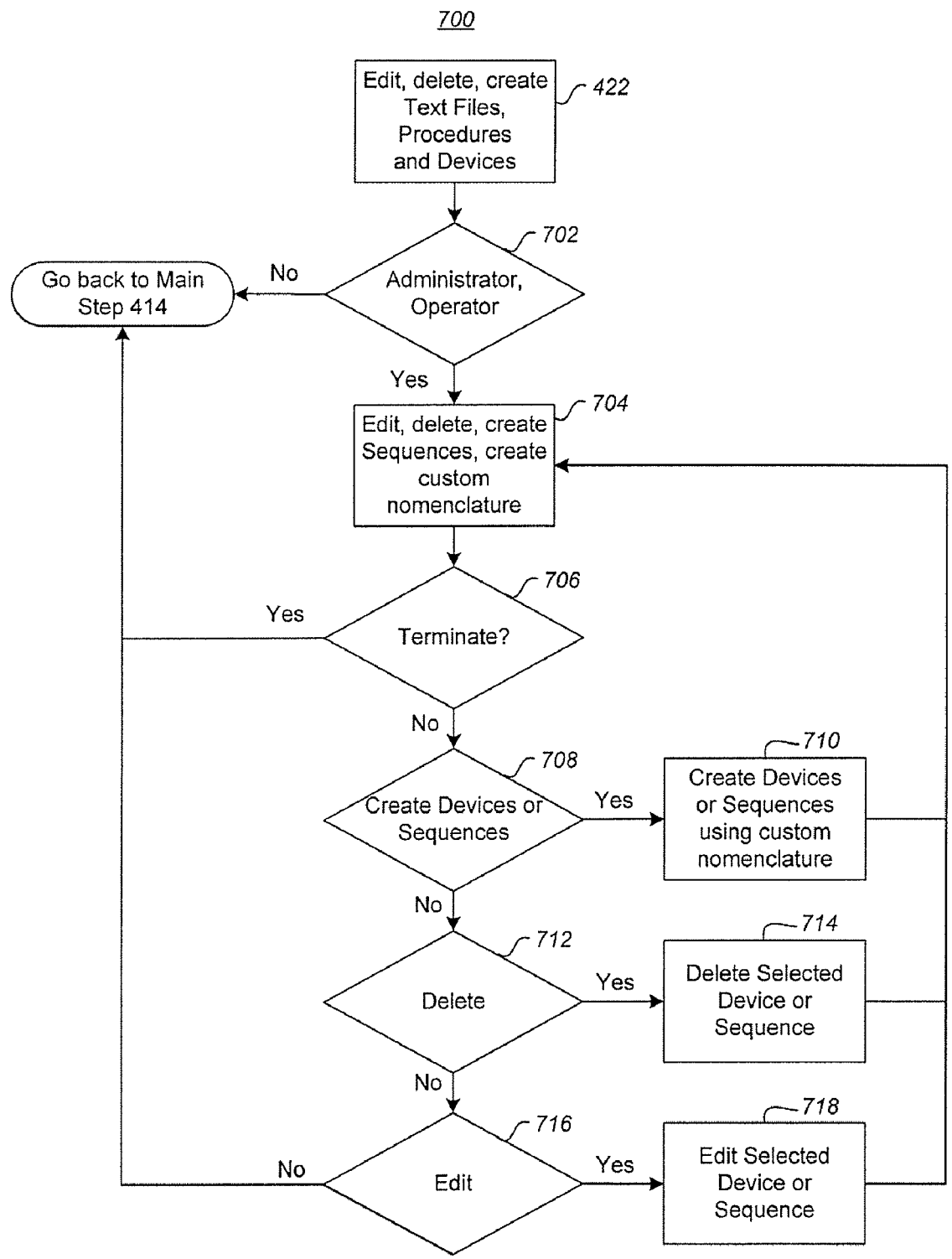
FIG. 7 is a flow diagram showing decisions for creating user access and permissions in translator software according to the invention.

FIG. 7 illustrates a routine 700 that corresponds to block 422 for managing text files, procedures and devices. As in routine 600, the decisions in routine 700 may be performed sequentially, or directly based on user selection. For purposes of illustration only, FIG. 7 shows these decisions as sequential steps. The first decision block shown is block 702, in which the routine determines whether the instant user has the proper security level to operate within this module of the translator software. For example, if the user name is associated with an Administrator or Operator security level, access is granted and the routine moves to step 704. If the instant user does not have the proper security level, the routine returns to Main Window step 414. In one embodiment, a textual message may be displayed when the routine returns to step 414 to indicate insufficient security clearance.

If at decision block 702 it is determined that the user has the proper security level, the routine moves to step 704. In step 704, the program provides the user with menu options for managing devices and sequences. In the exemplary embodiment shown, decision blocks 706, 708, 712 and 716 are listed sequentially. In an alternate embodiment, any one or all of these decisions may be processed directly after step 704.

In step 706 the routine determines whether the user wishes to terminate the routine, and if so, the program returns to Main Window step 414. If, based on user input, the routine determines that the user wishes to manage devices or sequences, the routine proceeds to step 708. In step 708, the routine determines if the user wishes to create devices or sequences. If so, the routine moves to step 710. If not, the routine determines if the user wishes to delete a device or sequence, in which case the routine moves to step 714. In step 716, the routine determines whether the user wishes to edit existing devices or sequences, and if so the routine moves to step 718. If not, the program returns to Main Window step 414. In a preferred embodiment, devices and sequences are listed in the database in separate tables, and must be created, edited, and deleted in separate operations.

Step 710 is a block representing a process according to the invention whereby a user may create custom devices and sequences using common language or nomenclature. Step 714 is a block representing a process according to the invention whereby a user may delete a selected device or sequence. Step 718 is a block representing a process whereby a user may edit a selected device or sequence. Preferred GUI embodiments of these processes 710, 714 and 718 are discussed below under the sections entitled Device Editor and Sequence Editor. In one GUI embodiment, step 704 may display a menu screen from which the user may access additional editing menus for creating, deleting, or editing devices and sequences. One example of such a menu is a Composition Menu shown in FIG. 16.

Figure 8:
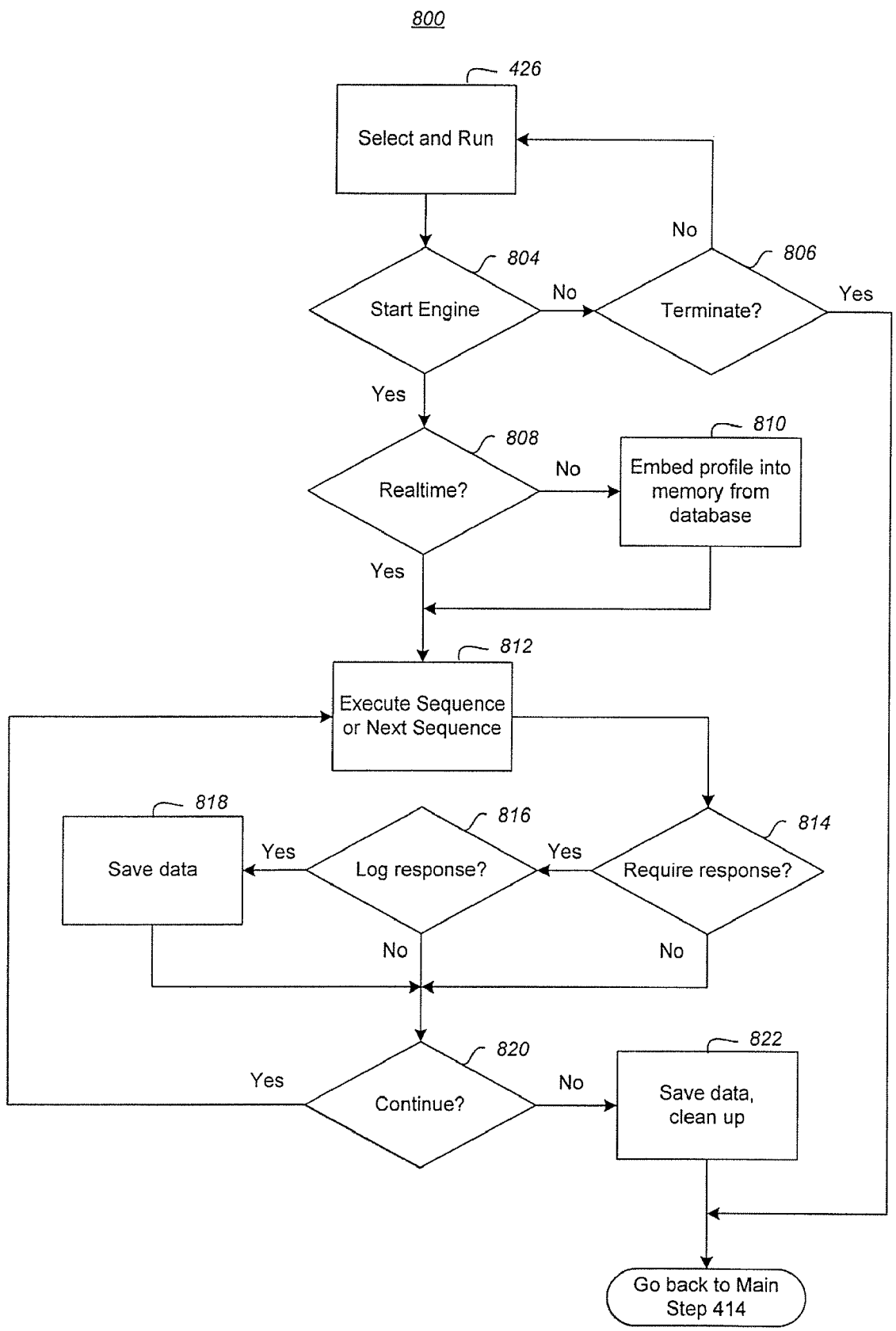
FIG. 8 is a flow diagram of translator software according to the invention for executing a sequence.

FIG. 8 is a flow diagram illustrating steps of a process 800 according to the invention for running a sequence. The process begins at step 426 when a user having proper security level enters this section of the translator software and selects an existing sequence. In step 804, the program determines whether to start the engine for running the selected sequence, based on user input. If not, the routine moves to step 806, and at any time, the user in step 806 may decide to terminate the sequence, in which case the program returns to the Main Window step 414. The user may, however, wish to remain in process 800, for example, to select a different sequence. In that case, the routine returns to step 426.

In step 804, if the routine determines that a user wishes to start the engine to run the selected sequence, the next decision block 808 is processed. In step 808, the routine determines based on user input or on the type of sequence selected whether the sequence is to be run in real time. If not, the routine in step 810 may embed a profile of the sequence to be run into the database memory. In one embodiment, the program loads the sequence into a link list. This step allows a user to specify a later time for running the sequence. For example, it may be more convenient to run a hardware test during the evening or other off-peak hours to minimize the disruption of normal plant operations. In another example, a user may wish to set up a recurring procedure in step 810 to conduct periodic diagnostic tests on a system to check calibration, verify system integrity, or to perform some other recurring hardware or software test or quality assurance procedure.

Whether the selected sequence is to be run in real time or at some later time, the routine proceeds to step 812 when it is time to execute the selected sequence. Step 812 is the sequence execution step in which the translator software manipulates devices, whether fixed, memory mapped, *.dll function calls, or *.exe external processes, in accordance with the sequence parsing process of method 300. If step 812 is performed a subsequent time, it executes the next sequence in the execution order.

After executing the selected sequence in step 812, there may be one or more instances during execution where a response is required, either from the user or from another internal or external process. This situation is depicted in decision block 814, which determines whether such a response is required. If so, the routine moves to step 816. Step 816 is another decision block wherein the program determines whether to log the response in memory. If so, step 818 is performed, which is a processing step for saving the response to the database. If no response is required in step 814, or if a response is required but not to be logged, or if a response to be logged has been saved to the database, the routine proceeds to step 820. In decision block 820, the program determines whether to continue running the sequence. For example, the first run through blocks 812 to 820 may have executed fewer than all functional elements of the selected sequence. In such case, the routine returns to block 812 to execute the next element. When all elements of the selected sequence have run, the process moves from step 820 to step 822. Step 822 is a final step in which the translator software saves data and performs any necessary data clean up, e.g. deletion of temporary files. The program then returns to the Main Window step 414. In one embodiment, steps 814, 816, 818, 820, and 822 make up the results processing step 314 of method 300.

Memory Mapping and Addressing

Figure 9:
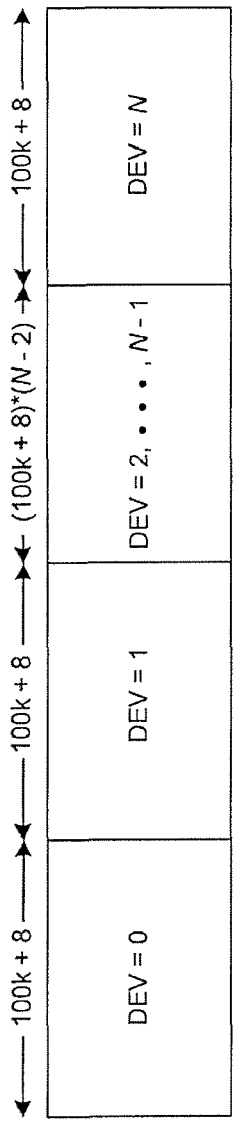
FIG. 9 is a block diagram showing contiguous addressing for devices created by translator software according to one embodiment of the invention.

Upon starting up the translator software, a minimum amount of memory, e.g. RAM, is automatically reserved by the program for memory mapping. Its primary purpose is to pass data back and forth to another application that may be controlling a device in real time. This operation will be invisible to a user. In one example, the translator software may reserve about 1 megabyte of memory for this purpose. Other embodiments are possible where more or less memory may be reserved for memory mapping. FIG. 9 depicts a general addressing scheme, in which N+1 memory blocks with addresses 0 through N are reserved, wherein each block contains about 100 kilobytes of memory. A single memory block is reserved for each of N+1 devices that make up the device capacity of the translator software. In a preferred embodiment, these memory blocks are reserved as a range of contiguous addresses beginning with address 0 (zero), which is reserved for device DEV=0. When a device is created using the translator software, it is assigned to a specific address block to provide memory mapping necessary to access the read, write, or read & write interfaces for the hardware or software module that is represented by the device. In one embodiment, the translator software reserves about 1 megabyte for ten memory blocks (i.e. N=9) of equal size.

Figure 10:
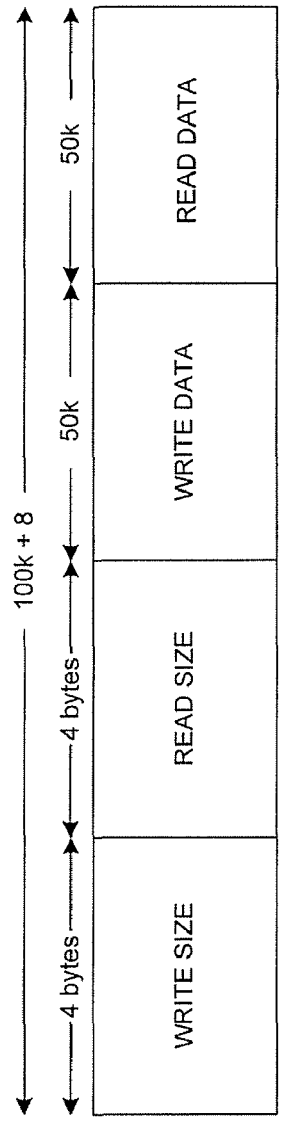
FIG. 10 is a block diagram showing allocation of write and read data at a client address for a device created using the contiguous addressing scheme of FIG. 9.
Figure 11:
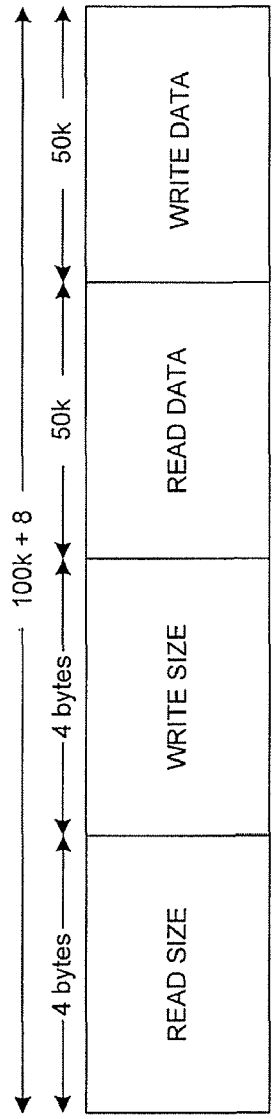
FIG. 11 is a block diagram showing allocation of read and write data at a local address for a device created using the contiguous addressing scheme of FIG. 9.

Memory allocation for client (external processes) and local (translator software) addresses are depicted in FIG. 10 and FIG. 11, respectively. The addressing scheme allows a user to read and write directly to one-byte locations in each memory block. In FIG. 10, the first segment of memory defines the write size. The next segment of memory defines the read size. The third segment of memory is reserved for write data, and the final segment is reserved for read data. In FIG. 11, the first segment defines the read size and the next segment defines the write size. The third segment is reserved for read data and the final segment is reserved for write data. In the embodiments shown, read size and write size segments are four bytes each, which is selected so that the address may be uniquely identified by a combination of two ASCII characters of two bytes each. The read and write data segments are shown as having about 50 kilobytes each. Thus, the total size of the memory block is 100 k+8=100,008 bytes. These are exemplary embodiments shown for illustrative purposes only. Other embodiments are possible having different memory allocations for these segments.

In an embodiment where the memory blocks are contiguously addressed, a starting memory location for the total block of memory reserved by the translator software will be known. This starting location may be defined, for example, as memory start address. The address of any of the M=N+1 devices in the memory block created by the translator software may be identified as the starting location plus the product of the size of a memory block and the address number. For an addressing scheme using a memory block size of 100,008 bytes, the starting address dev_mem_start of the Mth device may be described by the equation:

dev_mem_start(M)=memory_start_address+((100 k+8)*address(M))

where address(M) is be a sequential number equivalent to placement of the Mth device memory block within the series of contiguous blocks of total memory. Thus, at the first memory address DEV=0 where M=1, dev_mem_start(0)= memory_start_address+((100 k+8)*0)=memory_start_address. This addressing scheme according to the invention allows the translator software to quickly access memory mapping for all devices created.

Software Engine Core

The translator software allows a user to create devices and commands using symbols which may be common terms that represent devices and the functions that those devices perform. There are two types of symbols, custom and predefined. The custom symbols are created during device creation, while the preexisting symbols are fixed within the software core.

In creating a device within the software, a user may input a common name for the device, for example, "relay". In creating a command, a user may input a common functional term, such as "binary read write" or "system_on". Alternatively, the user may specify an actual command, which may be already defined, or a low level device command. When the device is created, these custom symbols and actual commands will be saved to a text file and available when creating a sequence. Preexisting symbols are symbols already defined in the software, such as a symbol for effecting GPIB communication. In one embodiment, a user may be prompted to select preexisting symbols from drop-down list. Another menu may then be provided for entry of a GBIB command, an address of an actual device, etc.

Once a text file containing symbols is created, a parsing engine of the translator software will identify the symbols and store them in the database. Once stored in the database, the runtime engine of the translator software can run a sequence based on the symbols.

*.DLL Argument Structure

If a device needs to have a custom protocol, a *.DLL may be used, if and only if the *.DLL conforms to a common structure. The *.DLL name may be any legal name in accordance with an established binary naming convention, such as the Windows binary naming convention. The *.DLL may have only one function name for the software interface.

There is only one argument which is a structure:

```
Structure <name>
{
    char *device_name;
    int size_device_name;
    char *command;
    int size_command;
    char *response;
    int size_response;
};
```

This structure is used on the *.DLL only. Its structure and operation will be invisible to a lay user of the translator software. The address of this structure may be passed to the *.DLL, for example, according to:

<DLL name>(&<structure name>)

There may not be any further depth to this function within this core software. The *.DLL program may parse a command however it likes, so long as it returns a response with the expected symbols. These symbols are the same symbols created in the Device Wizard and used in the Sequence Composer. A software designer may use the same *.DLL for different devices, so long as each device name is unique.

Device Editor

In a preferred embodiment, the translator software allows a user to manage devices in a GUI environment using a menu-driven Device Editor. This section describes one such embodiment. In the Device Editor, menu windows may provide the user with various device management options, and prompt the user for textual input for naming devices, device functions, and device descriptions. In the GUI embodiment, standard Windows buttons may be made available on the various menus, such as buttons for minimizing, maximizing, or closing a window, for navigating to a prior or subsequent menu, or for canceling options selected from the menu, as shown throughout the figures.

Figure 17:
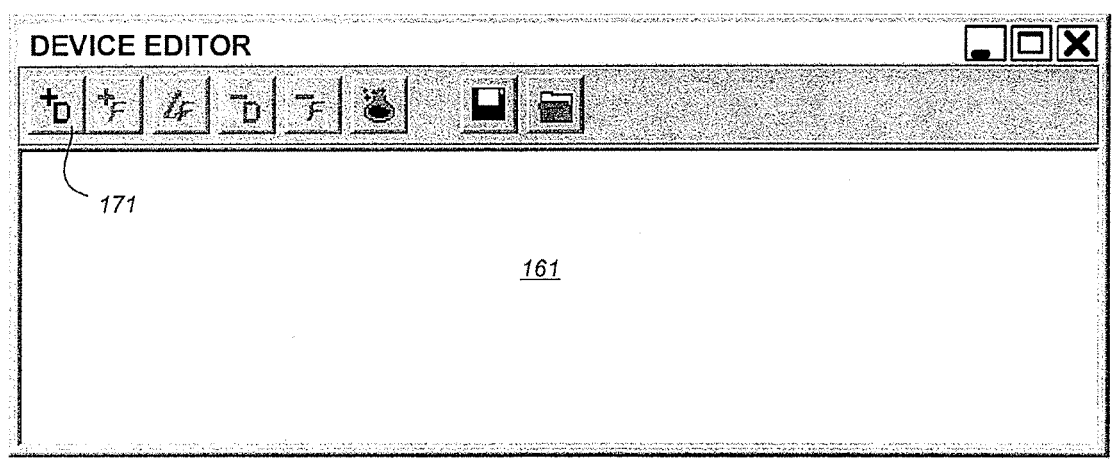
FIG. 17 is an illustration of a Device Editor menu for prompting a user to create devices using a Device Wizard according to the invention.
Figure 16:
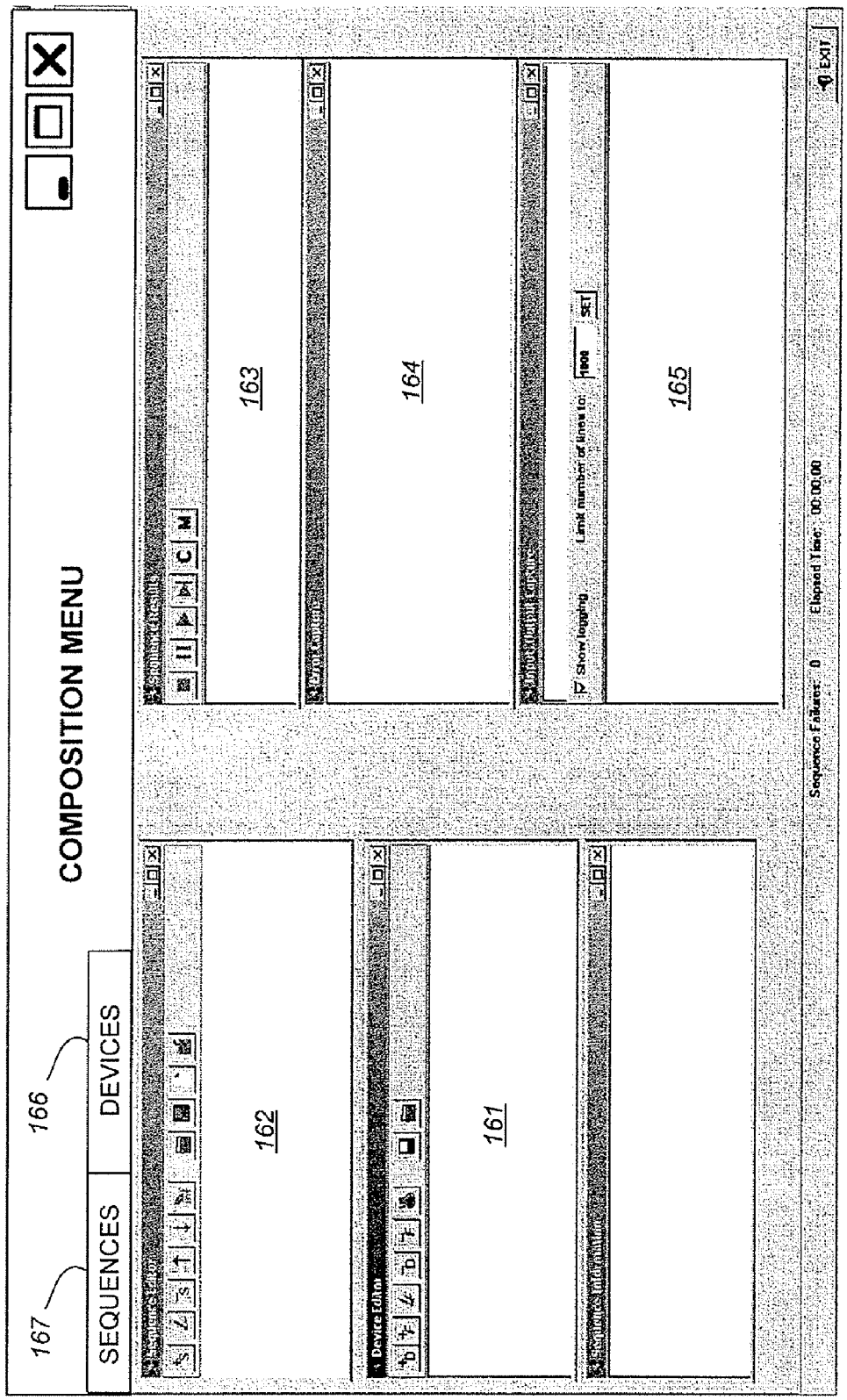
FIG. 16 is an illustration of a composition menu for accessing device and sequence editors in an embodiment of the invention.
Figure 18:
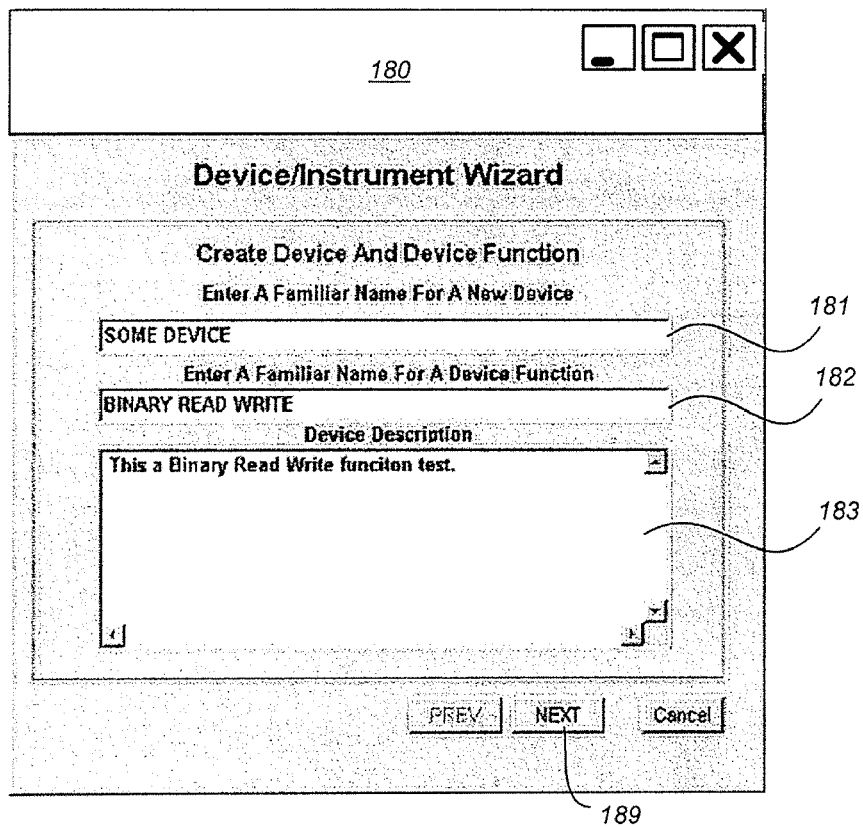
FIG. 18 is an illustration of a menu of the Device Wizard for prompting a user to create a device and a device function in an embodiment of the invention.

The Composition Menu 160 of FIG. 16 may be used to access a Device Editor 161. In this menu, Device Editor 161 may be accessed directly by a user having proper security level by mouse selection means effected within the window area of the Device Editor 161. A maximized view of Device Editor 161 is shown in FIG. 17. Within the Device Editor 161, a user may create a new device by selecting an "add new device" button 171. Alternatively, the user may create a new device by selecting add-new-device text ("Devices" and "Add New Device") from a drop-down list 166 on Composition Menu 160.

When add device button 171 or add-new-device text is selected, the translator software displays a Device Wizard window 180. This window prompts the user to input text into the following fields: device name field 181, device function field 182, and device description field 183. At field 181, the translator software prompts the user to input a familiar name or common term as a name for the new device being created. Next, in field 182, the translator software prompts the user the input a familiar term to describe a function of the new device being created. Then, in field 183, the translator software prompts the user to enter a plain-language description of the device and its function. By prompting the user to input familiar terms in window 180, the device and its function will be more easily recognized later on when creating a sequence using the sequence editor. For example, a user may enter a device name as "printer," a device function as "binary read write," and a device description as "This is a binary read/write function test." In one embodiment, the device name field 181 and device function field 182 may be required fields. When all required fields are completed, the translator software may prompt the user to continue to the next window, for example, by highlighting a NEXT button 189 for selection.

Figure 19:
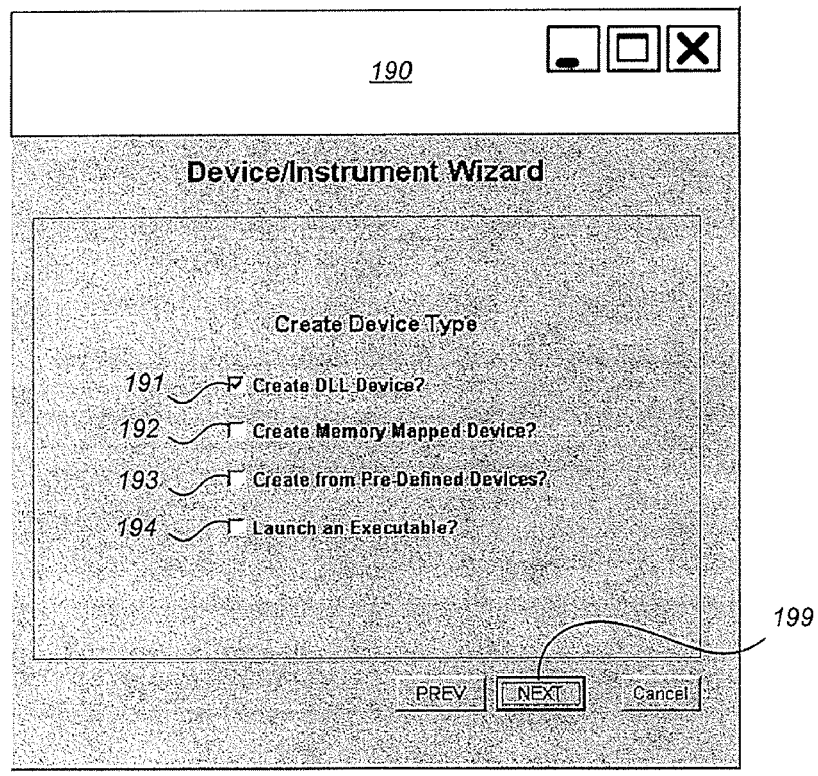
FIG. 19 is an illustration of a menu of the Device Wizard for prompting a user to create creating a device type in an embodiment of the invention.
Figure 20:
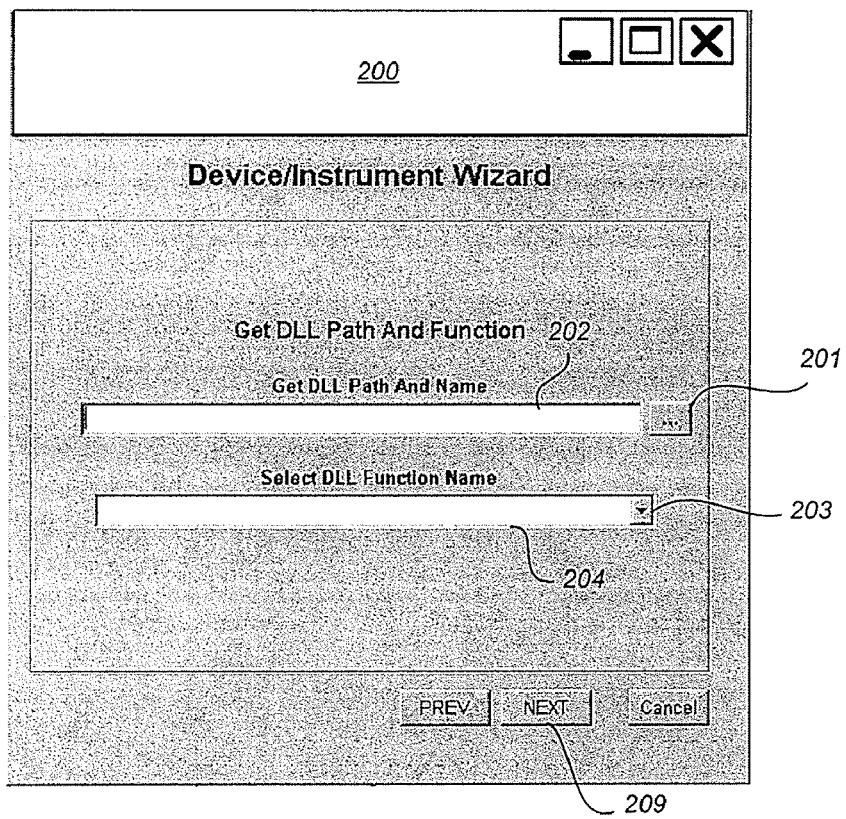
FIG. 20 is an illustration of a Device Wizard menu for mapping a dll type device to a dll path in an embodiment of the invention.

When button 189 is selected, the translator software may display the next Device Wizard window 190, as shown in FIG. 19. Window 190 provides a user with options for specifying the type of device being created. The type of device determines a means by which the translator software communicates with the device when running a sequence. According to the present invention, the possible device types are (i) dll devices, (ii) memory mapped devices, (iii) pre-defined devices, and (iv) devices that launch an executable file. In one embodiment, the translator software may prompt the user to select one of the possible device types by mouse selection means within a check box field, as shown. Check box 191 is for creating a dll device, check box 192 is for creating a memory mapped device, check box 193 is for creating a pre-defined device, and check box 194 is for creating an executable-launch device. When one of the check boxes is selected, the translator software may prompt the user to continue to the next window, for example, by highlighting a NEXT button 199 for selection.

If the new device being created is a dll device, selection of button 199 causes the translator software to display the next Device Wizard window 200. This window allows a user to associate a preexisting *.dll file to the new device being created, and to select a function name from a list of predefined function names to describe the function of the *.dll being selected. In one embodiment, the translator software prompts a user to associate a *.dll file for the new device using a browser button 201. When browser button 201 is selected, a user may access files stored on the host computer, or otherwise accessible by the host computer. In one embodiment, the available *.dll files may be stored in a subdirectory of the main directory containing the translator software. The files may appear, for example, in the form of a file list according to a directory path specified by the user in field 202. A user may select a desired path and file name for a *.dll file by mouse selection means, which when effected displays the selected *.dll path and file name in field 202. To allow a user to select a dll function name, the translator software may provide a drop-down button 203, which when selected, displays a list of predefined function names stored in the database. When fields 202 and 204 contain valid text, the translator software may prompt the user to continue to the next window, for example, by highlighting a NEXT button 209 for selection.

Figure 21:
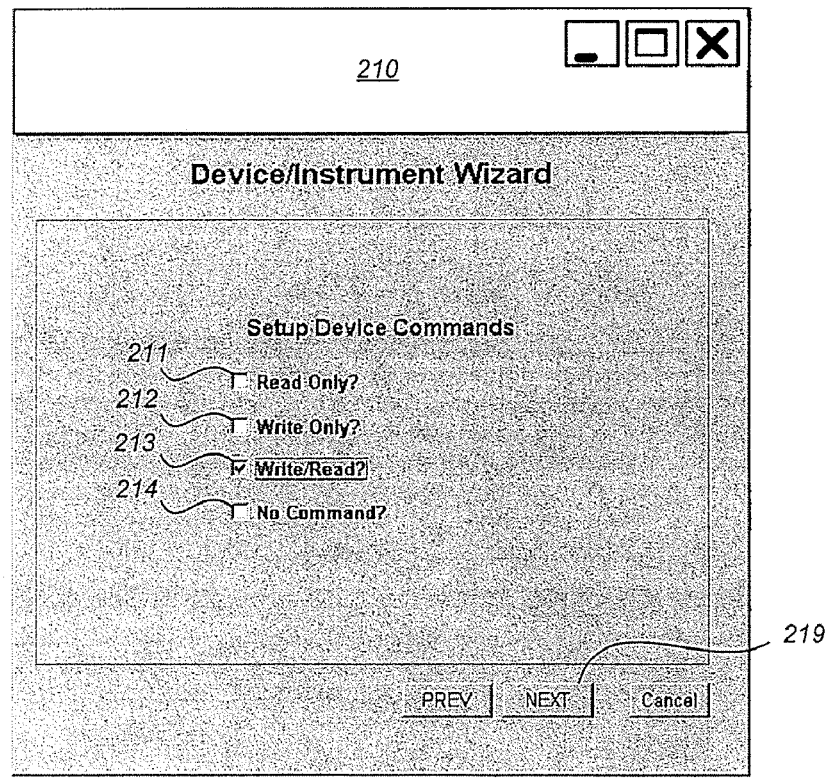
FIG. 21 is an illustration of a Device Wizard menu for setting up device commands in an embodiment of the invention.

The next Device Wizard window is window 210 shown in FIG. 21. Window 210 provides a menu for setting up commands for the device function selected using window 200. There are four possible device commands: (i) read only, (ii) write only, (iii) write/read, and (iv) no command. The read only command only reads data from the function. The write only command only writes data to the function. The write/read command first writes data to the function, then reads data from the function. The no command does not read data from or write data to the command. In one embodiment, the translator software may prompt the user to select one of the possible device types by mouse selection means within a check box field, as shown. Check box 211 is for commanding the function as read only, check box 212 is for commanding the function as write only, check box 213 is for commanding the function as write/read, and check box 214 is for no command. In one embodiment, these command options may be available for all device types, and are not limited to dll devices. When one of the check boxes is selected, the translator software may prompt the user to continue to the next window, for example, by highlighting a NEXT button 219 for selection.

Figure 22:
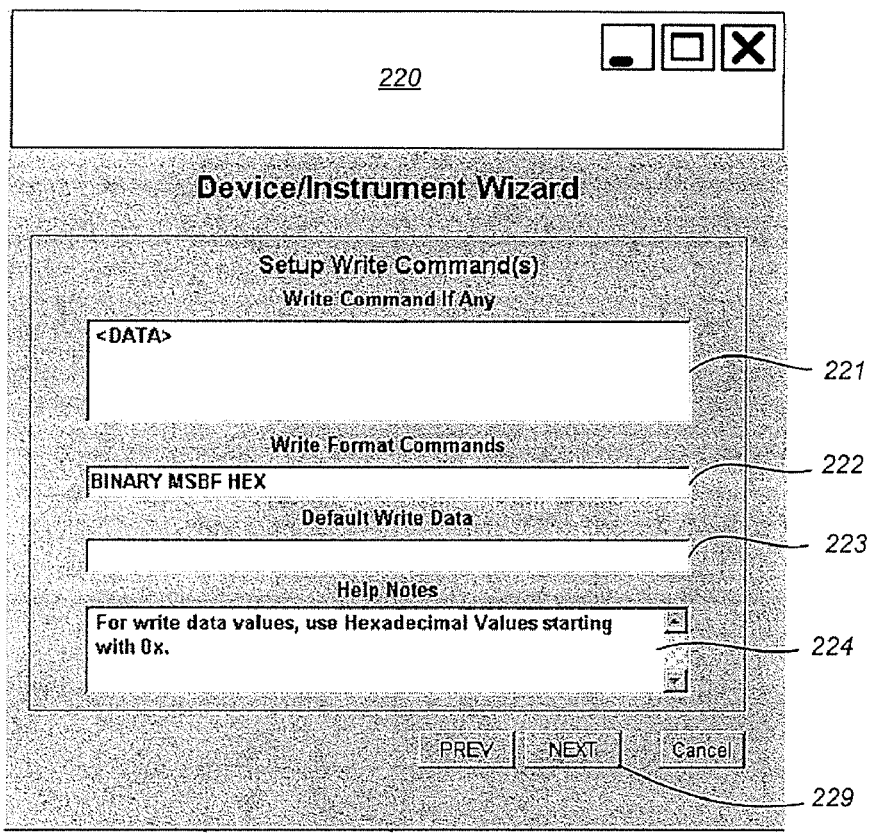
FIG. 22 is an illustration of a Device Wizard menu for specifying write command format for a device according to an embodiment of the invention.

If a write only or write/read command is specified and check box 212 or 213 is checked when button 219 is selected, Device Wizard window 220 may be displayed, as shown in FIG. 22. Window 220 prompts the user to set up any desired write commands for the function selected in Window 200. In the first field 221, the translator software prompts a user to write these commands, if any, into the field. The commands may be required to conform to a predetermined format. For example, date representing a command may be enclosed in brackets <and> as indicated by the symbol <DATA> shown in the figure. The <DATA> is a placeholder used to represent a value being placed into the function by the executing sequence. There may be no placeholders specified in this manner, or there may be one or more placeholders specified in this manner, with no limit to the number of placeholders specified. In one embodiment, it is not necessary to use a separator between placeholders.

In the next field 222, the translator software prompts the user to enter any keywords that may be necessary for transposing placeholder data. Examples of keywords include BINARY, MSBF, LSBF and HEX. The BINARY keyword may be used if the data needs to be transposed into a numeric value instead of sending a text value. For example, "0x000A" is a string of text. "A" is represented by a character code of 65. This code is one byte long. One byte is equal to 0-FF hexadecimal or 0-255 decimal. In order for it to be binary, the text version must convert "0x000A" (the numeric representation of the hexadecimal value) text to numeric. One character in text takes up one byte, so two number characters in text represent one numeric byte in binary. For example, 0A=48 ("0"), 65 ("A"), which when converted to binary, equals 10. The MSBF keyword may be used with the BINARY keyword to specify most significant byte first. The LSBF keyword may be used with the BINARY keyword to specify the least significant byte first. The HEX keyword may be used with the BINARY keyword. When HEX is used in a Setup Write Command (see Window 220), it converts the hexadecimal value from text to binary. When HEX is used in a Setup Read Command (see Window 230), it converts the binary value to a text hexadecimal value.

In the next field 223, the translator software prompts the user to enter any default write data. Default write data may be used when running a sequence, by selecting that default data be used in a particular instance of running the sequence. This is explained below in further detail the discussion of FIG. 26. Each entry of default data in field 223 may correspond to each write command entered in field 221. In one embodiment, if there are more than one data placeholders in field 221, there must be as many default values entered in field 223 as there are data placeholders, and the default values entered in field 223 must be separated by a comma.

The next field 224 is a Help Notes field, in which the user may enter text. For example, the user may enter information here that explains how to use the function or the data values. This information may be made available by the translator software to a user working with the device function in the Sequence Composer. When a user has completed data entry in window 220, selection of next button 229 causes the translator software to display window 240.

Figure 23:
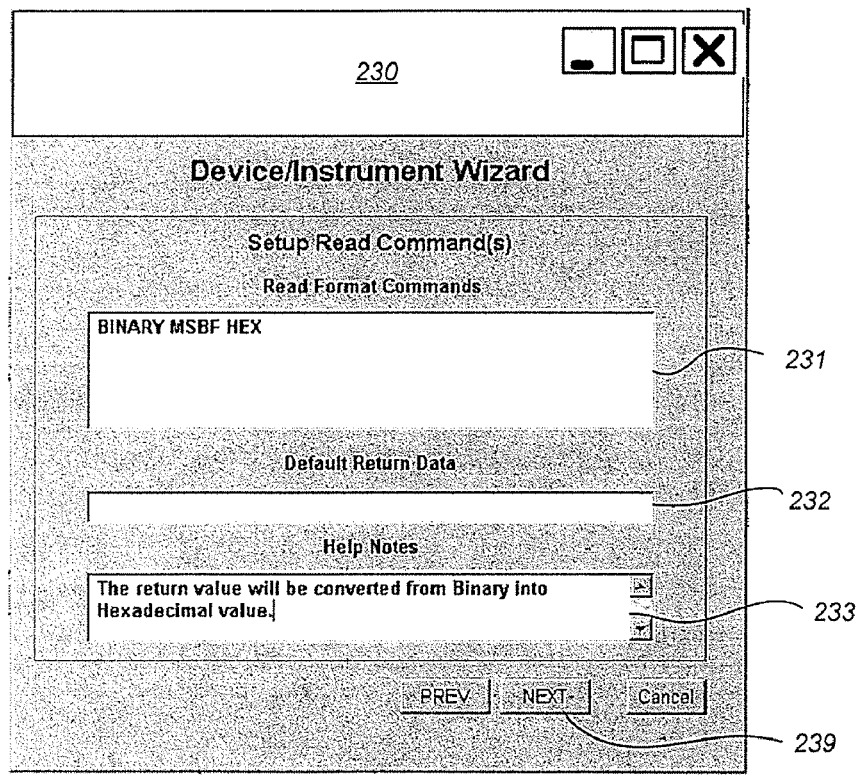
FIG. 23 is an illustration of a Device Wizard menu for specifying read command format for a device according to an embodiment of the invention.

Returning now to window 210, if a read only or write/read command is specified and check box 211 or 213 is checked when button 219 is selected, Device Wizard window 230 may be displayed, as shown in FIG. 23. Window 230 prompts the user to set up a desired format for data to be returned. In field 231, the translator software prompts a user to specify any keywords needed to transpose data returned by a read command. These keywords may be identical to those described above for use in window 220. In field 232, the user is prompted to enter one or more default return values that may be used to compare with actual returned values, for example, as acceptance criteria. In one embodiment, a separator such as a comma may be used to separate default return values entered in field 232. A help notes field 233 may also be provided in window 230. When a user has completed data entry in window 230, selection of next button 239 causes the translator software to display window 240.

Figure 24:
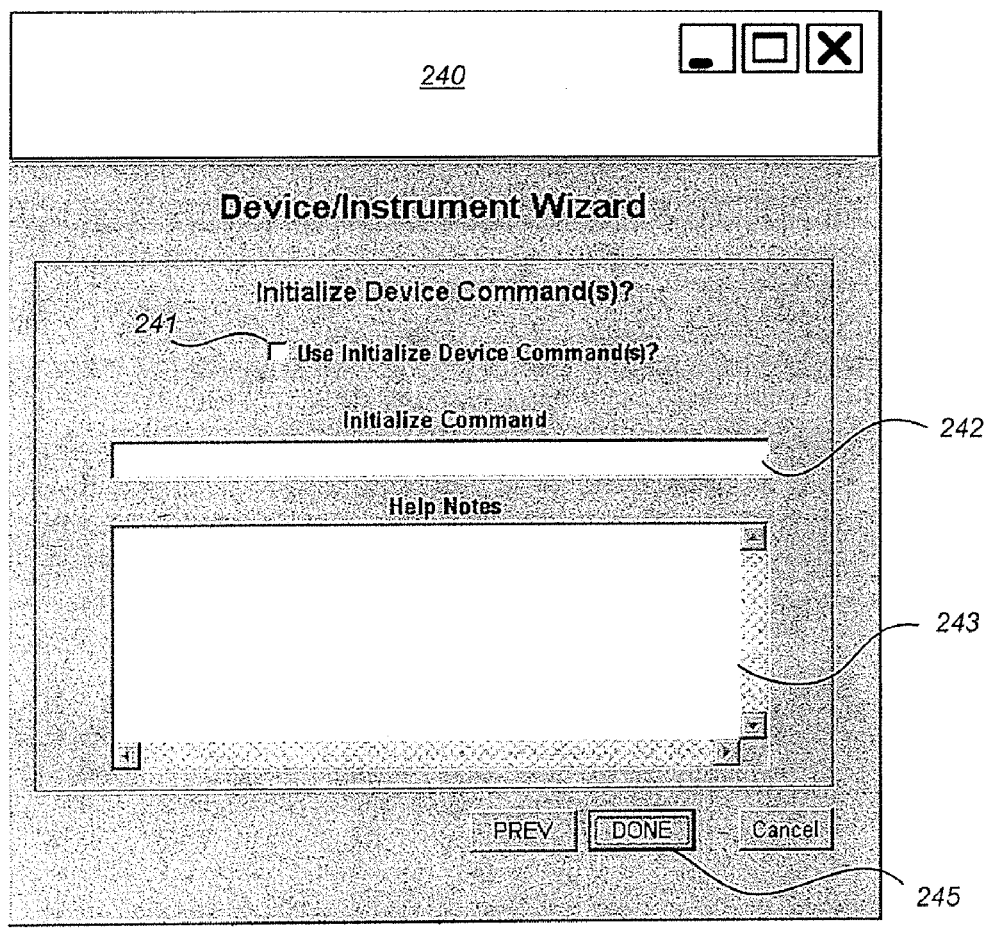
FIG. 24 is an illustration of another Device Wizard menu for specifying initialization commands for a device according to an embodiment of the invention.

FIG. 24 shows a final window 240 of the Device Wizard. With this window, the translator software prompts the user to enter any commands that may be necessary to initialize the device being created. For example, certain instruments, hardware, and sometimes other software devices must be initialized prior to using them. If the Use Initialize Device Command check box 241 is checked, the user may add the setup or initialize command in field 242 that is associated with the device being created. During the actual running of a released sequence composition file, this function will run prior to running the sequence composition file. A help notes field 243 may also be provided in window 240. When all fields (if any) have been completed, the user may select the DONE button 245 to complete device creation. When button 245 is selected, the device and device function are saved to the database.

Figure 25:
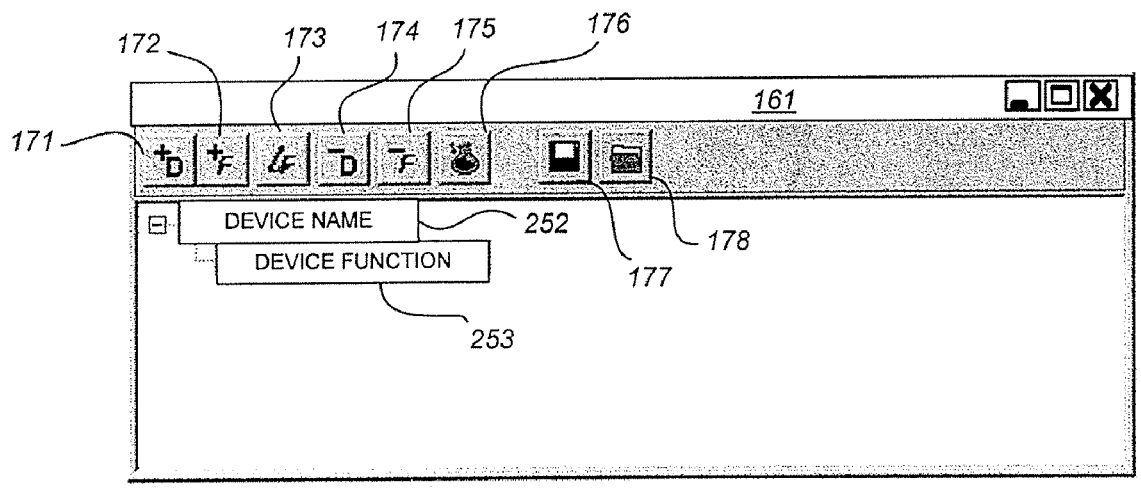
FIG. 25 shows one embodiment of a Device Editor window displaying a list of devices created using the Device Wizard.

FIG. 25 shows one embodiment of a Device Editor window 161 after at least one device has been saved to the database. A file list 251 is displayed in the window listing devices in the database. Each device function 253 is listed as separate file associated with the device 252 to which it pertains. In addition, as long as at least one device is saved to the database, additional toolbar buttons (e.g. those shown to the right of button 171 and to the left of button 177) become active, to prompt a user to perform other device editing tasks.

In one embodiment, one or more of the following toolbar buttons may be provided on Device Editor window 161: add new function button 172, edit function button 173, delete device button 174, delete function button 175, test function button 176, save device button 177, and load device button 178. Each of these buttons may be selected to perform a task on a device or device function that is highlighted in the window. By selecting button 172, a user may be prompted by a window such as window 200 to add a new function to an existing device. Selection of button 173 displays an appropriate window to allow a user to edit data for an existing function. Button 174 deletes a highlighted device from the database and button 175 deletes a highlighted function from the database. Note that buttons 174 and 175 may only be active for users having the proper security level. A button 177 may be provided for saving a device being created or edited, and a button 178 may be provided for loading a device and displaying its available functions.

Figure 26:
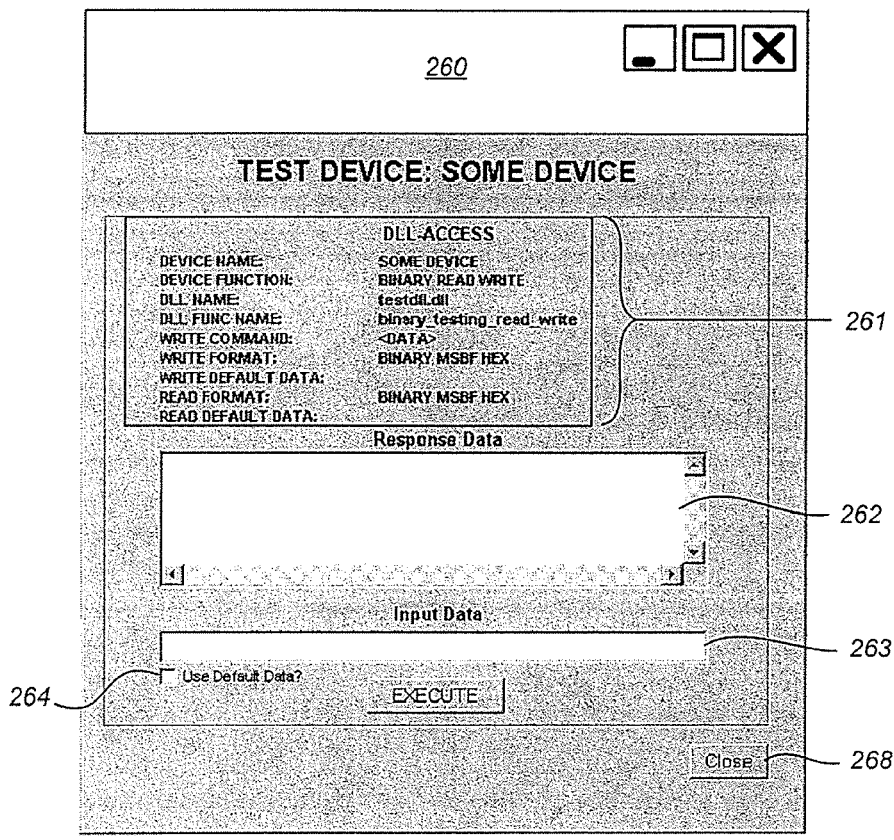
FIG. 26 is an illustration of a test execution window for testing a device according to the invention.

Button 176 is provided to prompt a user to test a device. When a user highlights a device function and selects button 176, the translator software displays a test window 260, as shown in FIG. 26. In the embodiment shown, window 260 provides a description of the test being run in field 261, a response data field 262 for displaying the test results, and an execute button 266 for running the test. Window 260 may also provide an input data field 263. If the function being tested is set up to receive write data, the user may enter the write data into data field 263. Alternatively, the user may select a check box 264 to use the default input data (if any). Selection of the execute button 266 runs the function. There may be one or multiple instances of a window 260 simultaneously on display. In a preferred embodiment, there may be up to 15 windows 260 on simultaneously display, for testing identical or different functions.

With reference again to FIG. 19, creation of other device types according to the invention is now described. If the new device being created is a memory mapped device, selection of button 199 causes the translator software to display the Device Wizard window 220 for setting up write commands. In this case, to create the memory mapped device, the user must enter a mapping address into field 222. In one embodiment, the very first keyword entered into field 222 must be of the form "ADDR=#" where the # symbol indicates an address value from 0 to 9. Any other format commands may follow this keyword. Using memory mapping, the newly created device may write to and read from an address linked to external hardware or software.

If the new device being created is a pre-defined device, selection of button 199 causes the translator software to display a list (e.g. a drop-down list or window) of devices that are built in to the core translator software. There is no limit to the number of pre-defined devices that may be available.

Examples of pre-defined devices include a PROMPT_FORM, an INPUT_FORM, a PASS_FAIL_FORM, a DELAY, and a HALT. An example of a PROMPT_FORM device is a text window with an OK button. An example of an INPUT_FORM device is a prompt that requires a user to input data manually, as into a test field. An example of a PASS_FAIL_FORM device is a prompt needed to indicate a pass or fail status of a test. This type of prompt may be needed when the result may only be determined through qualitative observation by a user. An example of a DELAY device is a time delay of any duration, whether fixed or user-specified. An example of a HALT device is a prompt having a selectable button that stops execution of a sequence.

In one embodiment, a pre-defined device that is a PROMPT_FORM, an INPUT_FORM, a PASS_FAIL_FORM, or a DELAY device, a keyword of the form "TITLE:: (title text)" may be used to set the caption heading for the prompt, where "title text" is specific descriptive text to be entered by the user. Also for these pre-defined devices, a keyword of the form "MSG:: (message text)" may be used to add a body message to the specified prompt. For example, the "message text" may be "Press OK to Continue." For the DELAY device only, the keyword "TM::(time delay)" may be used to specify the delay period in seconds. In one embodiment, the argument (time delay) is a number in milliseconds. Thus, TM::(1000) would specify 1000 milliseconds or one second. Alternatively, the keyword SEC may be used to specify seconds. For example, TM:: 50 SEC specifies a time delay of 50 seconds. For a HALT device, no parameters need to be specified.

A time delay keyword may be entered using window 220 when setting up a device command for a write only or a write/read command. For example, in field 221, a user may enter "TITLE::Time Delay <space or carriage return> MSG:: Waiting 10 seconds <space or carriage return> TM:: 10 SEC". Alternatively, the user may enter this keyword string in the input data field 263 of window 260.

Figure 27:
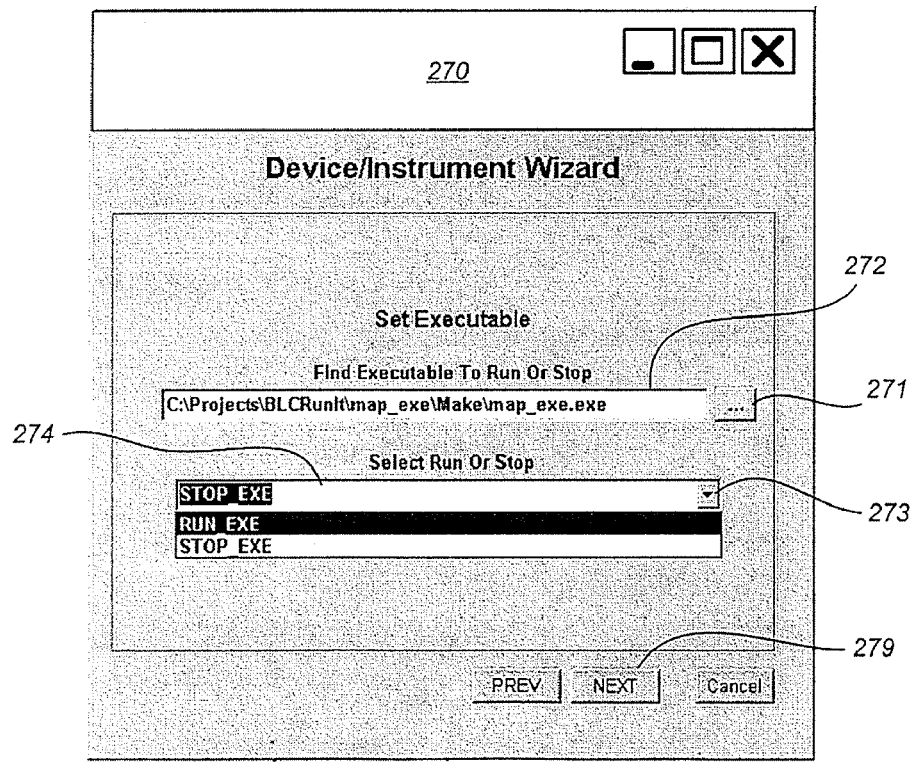
FIG. 27 is an illustration of a Device Wizard menu for prompting a user to associate a executable-launch type device with an executable file.

If the new device being created is an executable-launch device, selection of button 199 causes the translator software to display the Device Wizard window 270 shown in FIG. 27. This window is used to associate a device with an executable file. In one embodiment, this association may be made using a browser button 271, which when selected, allows the user to search for and select an executable file accessible by the host computer. The file selected, for example, by mouse selection means, has its path and file name displayed within field 272 by the translator software. Once the executable file is selected, the user may then specify whether the device being created is to run or stop the executable file. A menu such as a drop-down menu 273 may be provided in window 270 for this purpose, and the run or stop option may be displayed in field 274 when specified. When a user has completed fields 272 and 274 and selects next button 279, the translator software may display window 210. In window 210, the user may select check box 214 to indicate that no command is needed to execute (or stop execution) of the executable-launch type device. The user may then continue managing devices using the Device Wizard windows as previously described. For executable-launch devices, the initialize device command check box 241 should be left blank.

Sequence Editor

A preferred embodiment of translator software according to the invention allows a user to compose sequences in a GUI environment using a menu-driven Sequence Editor. This section describes one such embodiment. In the Sequence Editor, menu windows may provide the user with various sequence management options for creating sequences for operating devices, for reporting sequence results, and for ensuring version control of sequences deemed satisfactory for release.

Figure 28:
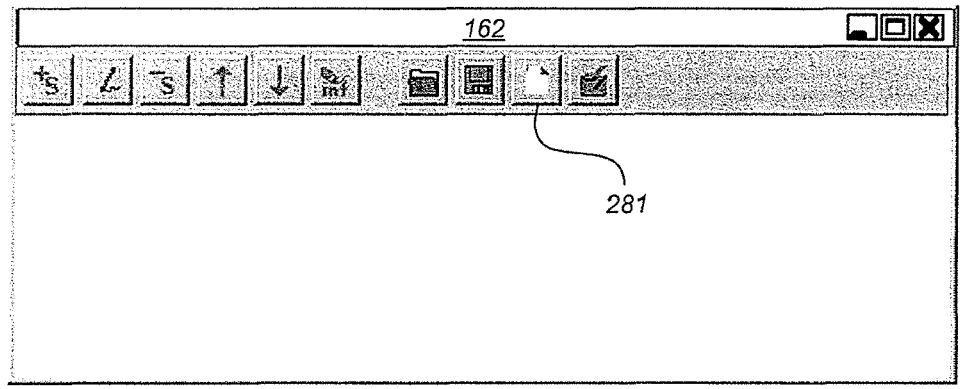
FIG. 28 is an illustration of a Sequence Editor menu for prompting a user to create sequences using a Sequence Wizard according to the invention.

The Composition Menu 160 of FIG. 16 may be used to access a Sequence Editor 162. In this menu, Sequence Editor 162 may be accessed directly by a user having proper security level by mouse selection means effected within the window area of the Sequence Editor 162. A maximized view of Sequence Editor 162 is shown in FIG. 28. Within the Sequence Editor 162, a user may create a new sequence by selecting a "create new sequence" button 281. Alternatively, the user may create a new sequence by selecting add-new-sequence text ("Sequences" and "New Seq File") from a drop-down list 167 on Composition Menu 160.

Figure 29:
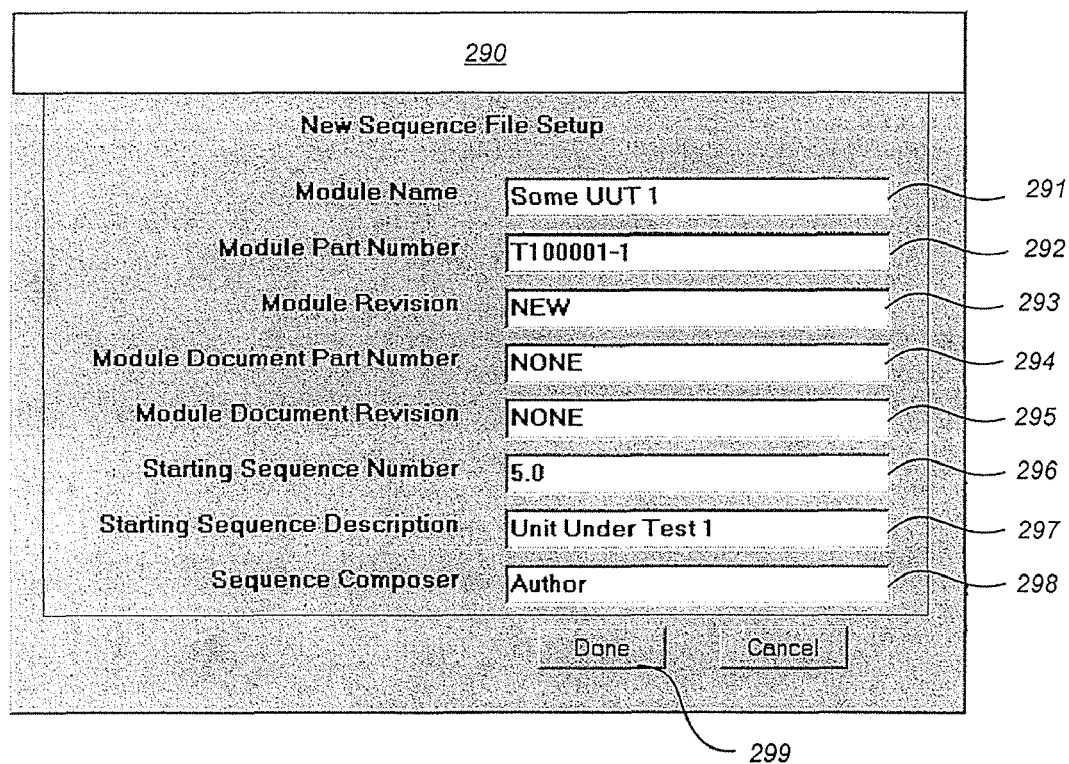
FIG. 29 is an illustration of a file setup menu for entering indicia for a new sequence using a Sequence Editor according to the invention.

When either of these selections is made, the translator software displays a file setup window 290 as shown in FIG. 29. The fields in this window contain indicia for uniquely identifying a module, i.e., a hardware or software system, or combination hardware/software system external to the computer to be tested according to a sequence being created. The figure shows an exemplary list of fields prompting a user for the following: a module name in field 291 to describe the unit under test, a module part number of the unit under test in field 292, a module revision number in field 293, a module document or drawing number in field 294, a module document or drawing revision number in field 295, a starting sequence number in field 296, a starting sequence number description in field 297, and a sequence composer (i.e. the user name) in field 298. In one embodiment, all fields are required fields, in that they must contain data to continue sequence creation. In another embodiment, only certain fields in window 290 are required fields. In alternative embodiments, the list of fields in window 290 may be tailored, as desired, by broadening or reducing the number of fields.

Field 296 allows a user to enter any convenient number to indicate when the sequence begins with respect to other sections of a larger procedure. This is a particularly useful feature when using the Sequence Editor to create supplemental procedures within a test procedure or quality control procedure that must conform to strict formatting requirements. Procedures such as these are usually organized according to sections. For example, a quality control procedure may conform to a format wherein section 1.0 is reserved for describing the purpose, section 2.0 is reserved for references to related documents, section 3.0 is reserved for a list of test equipment, and section 4.0 is reserved for describing preliminary conditions and setup. In this case, a user may specify in field 296 that the sequence shall commence at section 5.0 (or elsewhere) so that a report of the sequence dovetails nicely into any existing procedural format. In addition, the starting sequence number may assume any convenient format, such as 3, 5.0, 6.1.0.1, etc. Any numbering convention may be used, and the translator software customized to assign sequence numbers according to the convention. Once the starting sequence number is entered, it represents the highest tier of the sequence being created. In one embodiment, the highest tier number (e.g. 5.0) may represent as a section heading only. New sequences and sub-sequences may then be assigned corresponding lower-tier numbers, e.g. 5.1, 5.1.1, 5.2, 5.3.4, etc.

When all required fields in window 290 are filled in, the translator software may prompt the user to continue to the next window, for example, by highlighting a DONE button 299 for selection. This action may give the user access to the Sequence Composer.

Figure 30:
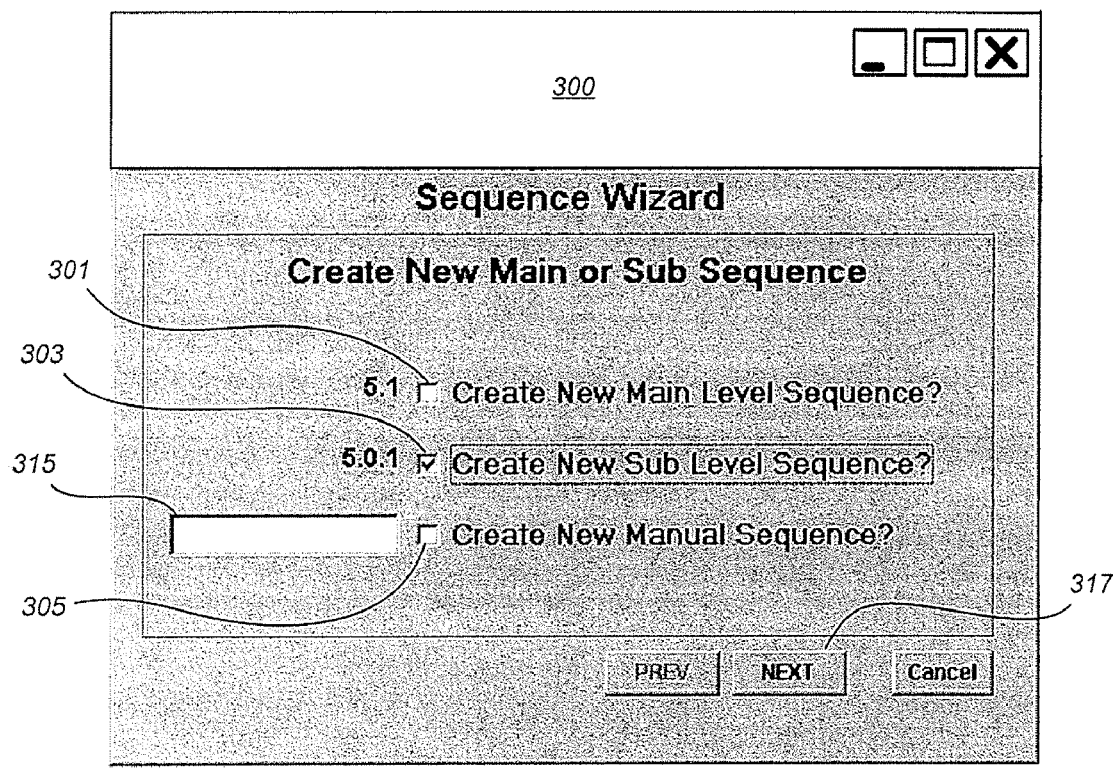
FIG. 30 is an illustration of a Sequence Wizard menu for prompting a user to create a sequence level according to the invention.

FIG. 30 shows an embodiment of a first window 300 of a Sequence Wizard. In the embodiment shown, the user is prompted to select from three levels of sequences to create: a new main level sequence at check box 301, a new sub-level sequence at check box 303, and a new manual sequence at check box 305. If a user checks either check box 301 or 303, the translator software will automatically assign the next available sequential number to the sequence being created. For example, if a user entered a starting sequence number 5.0 in field 296, a new main level sequence may be assigned the number 5.1, or any other main level number that conforms to the desired numbering convention, provided that it has not already been assigned. A new sub-level sequence may be assigned the number 5.0.1, 5.1.1, or any other available sub-level number that conforms to the desired numbering convention. If a user selects check box 305 for creating new manual sequence, a field 315 may be provided to prompt the user to enter a custom number for numbering the manual sequence. When the user has completed window 300, the translator software may prompt the user to continue to the next window, for example, by highlighting a NEXT button 317 for selection.

Figure 31:
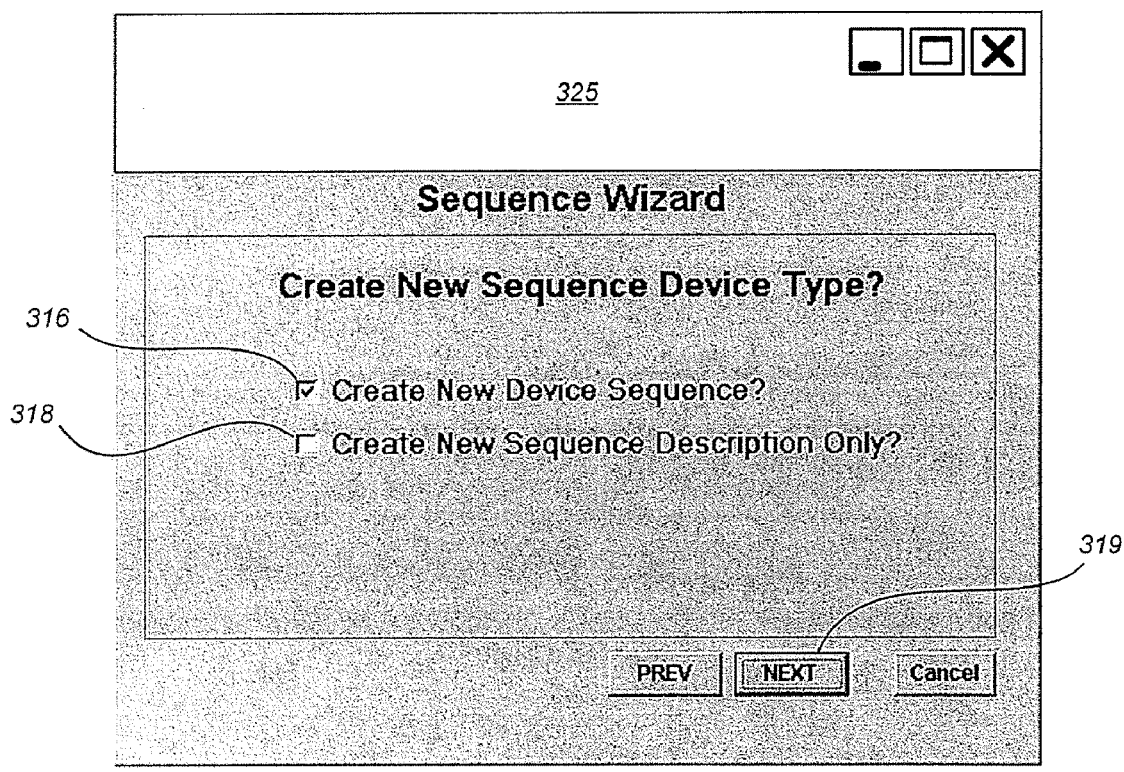
FIG. 31 is an illustration of a Sequence Wizard menu for prompting a user to create a sequence device type according to the invention.

When button 317 is selected, the translator software may display the next window 325 of the Sequence Wizard, as shown in FIG. 31. Window 325 prompts the user to specify whether the sequence being created is a new device sequence or merely a new sequence description. If the sequence is a new device sequence, the user may check box 316. If the sequence is to be a sequence description only, the user may check box 318. The user may wish to check box 318 to create a text heading only, i.e. for a main tier sequence number that has no device operations associated with it. This allows a user to create and record a readable procedure with section headings having meaningful descriptive information, while still conforming to the numbering convention. When the user has completed window 325, the translator software may prompt the user to continue to the next window, for example, by highlighting a NEXT button 319 for selection.

Figure 32:
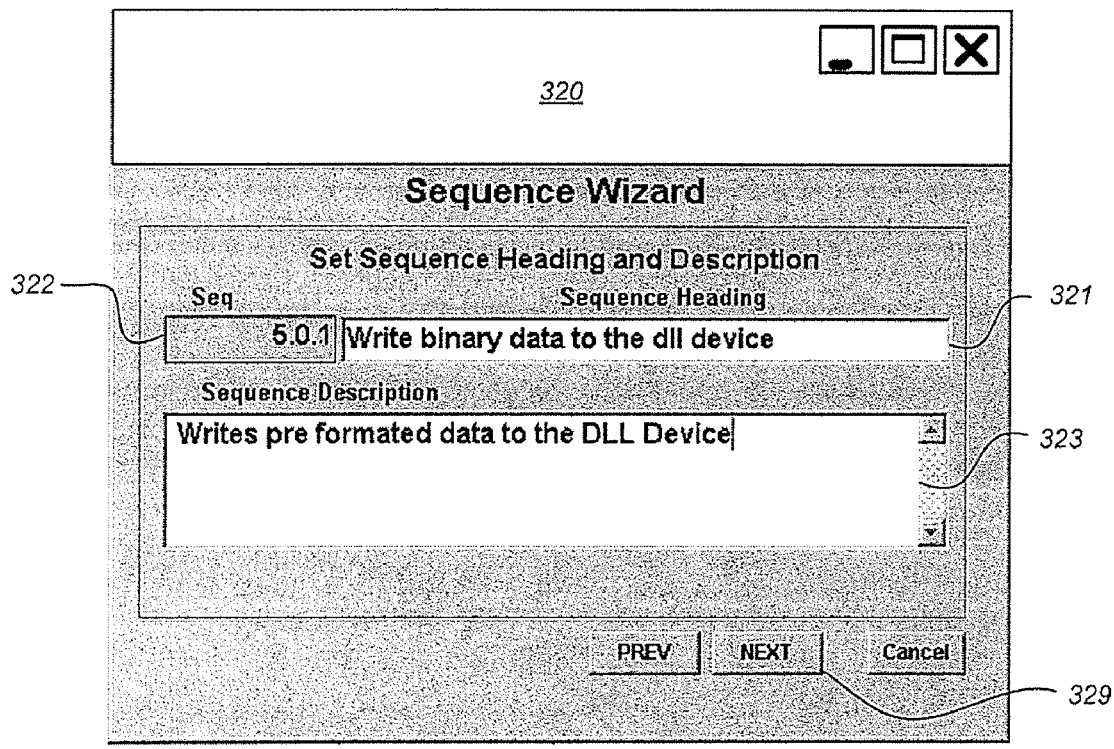
FIG. 32 is an illustration of a Sequence Wizard menu for setting a sequence level heading and description according to the invention.

FIG. 32 shows the next window 320 of the Sequence Wizard. Using this window, the translator software prompts the user to enter a familiar name in field 321 to describe the action performed by the sequence level being created. The sequence level that was previously defined in window 30 may be automatically shown in field 322. In field 321, to describe a device sequence created to perform a write test that writes binary data to a dll device, the user may enter a short description such as: "write binary data test" or "write binary data to the dll device" into field 321. In field 323, the user is prompted to enter a long description of the device. Here the user may enter a more detailed description of the sequence being created, e.g., to provide another user with information about the sequence for future reference. In one embodiment, fields 321 and 323 may be required fields. When all required fields are filled in, the translator software may prompt the user to continue to the next window by highlighting a NEXT button 329 for selection.

Figure 33:
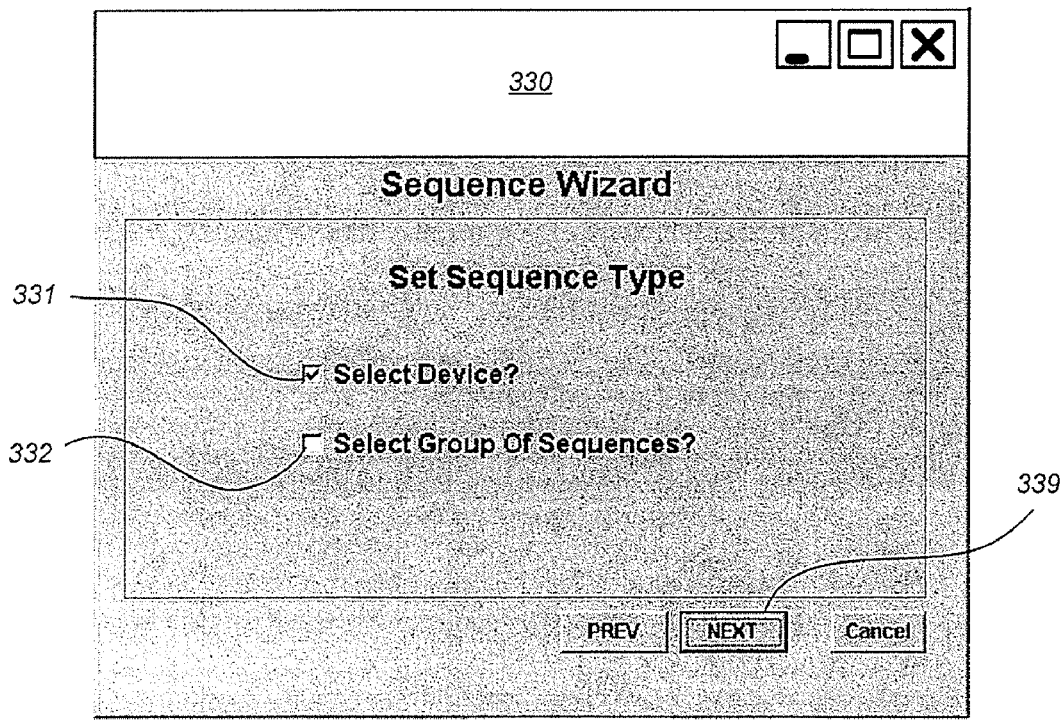
FIG. 33 is an illustration of a Sequence Wizard menu for prompting a user to specify a sequence type according to the invention.
Figure 34:
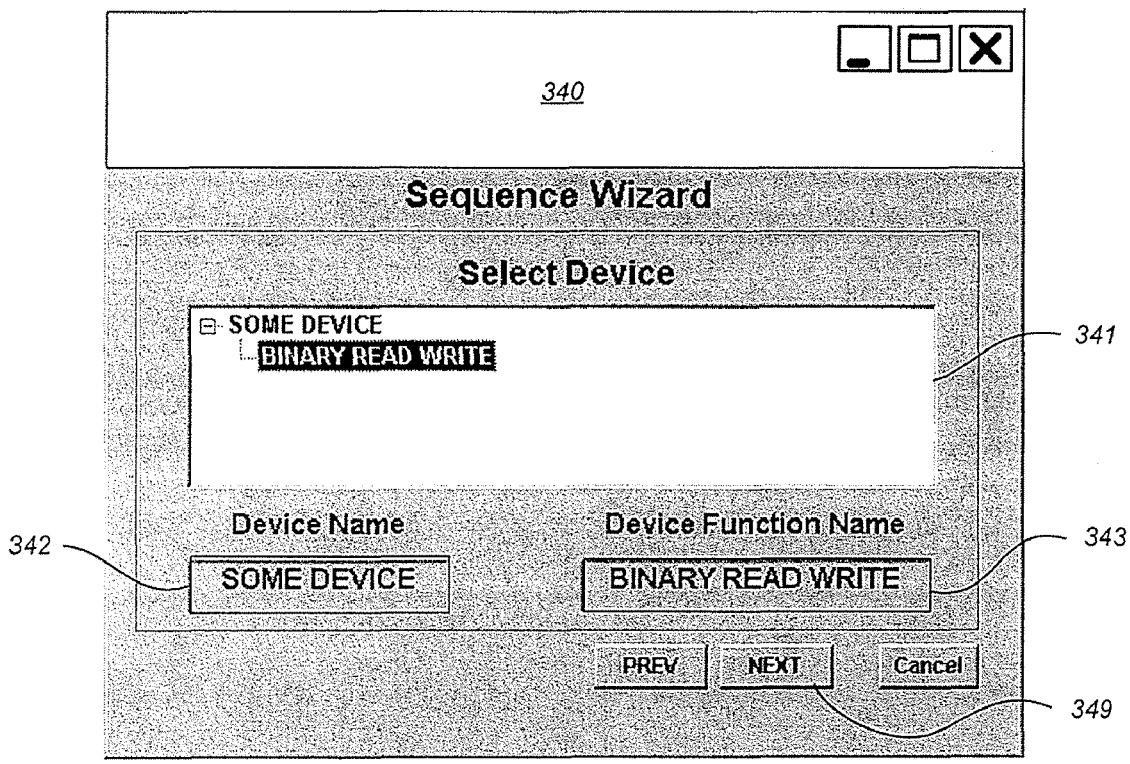
FIG. 34 is an illustration of a Sequence Wizard menu for prompting a user to associate a device with a sequence according to the invention.

FIG. 33 shows the next window 330 of the Sequence Wizard. With this window, the translator software prompts the user to set the sequence type. By specifying the sequence type, a user may select whether the sequence being created acts on a device, or whether it makes a group of one or more other sequences available to run or execute with the sequence being created. Check box 331 may be checked to select a device type, or check box 332 may be checked to select a group of sequences. The user may then select button 339 to continue on in the Sequence Composer. If check box 331 is checked when button 339 is selected, the translator software may display the device selection window 340, as shown in FIG. 34. Here, the user may select a device name and an associated device function name from a list of saved devices displayed in field 341. In one embodiment, in response to user selection of the desired device function name in field 341, e.g., by mouse selection means, the translator software confirms the selection by displaying the device name in field 342 and the device function name in field 343. The translator software may prompt the user to continue to the next window by highlighting a NEXT button 349 for user selection.

Figure 35:
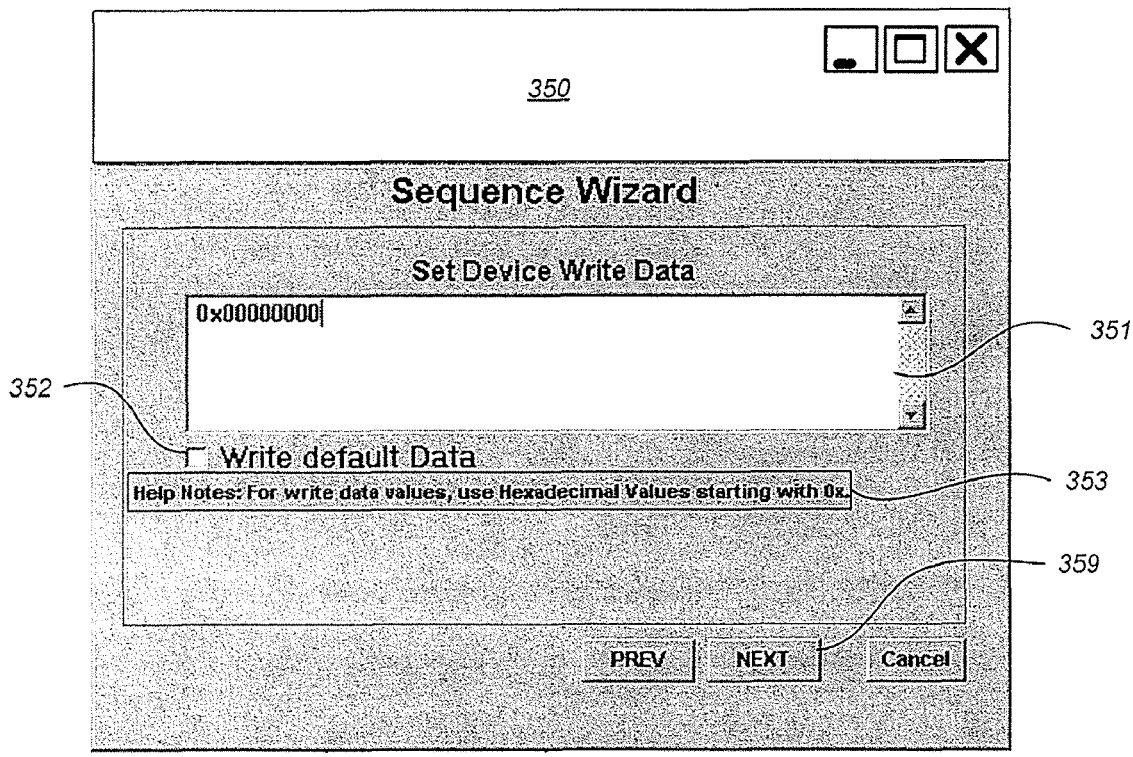
FIG. 35 is an illustration of a Sequence Wizard menu for setting device write data in a sequence according to the invention.

FIG. 35 shows an example of a window 350 of the Sequence Wizard for prompting the user to set device write data. Here, the user may enter into field 351 one or more values that correspond to the write data input required for the particular device now associated with the sequence being created. The value or values to be entered correspond to the placeholders that were established for the device using Device Wizard window 220. Alternatively, the user may select check box 352 to use the default write data that was previously established for the device. In one embodiment, any help notes that are available, e.g. the help notes entered in field 224 of window 220, may be displayed by the translator software in field 353 to assist the user in properly formulating the write data. The translator software may prompt the user to continue to the next window by highlighting a NEXT button 359.

Figure 36:
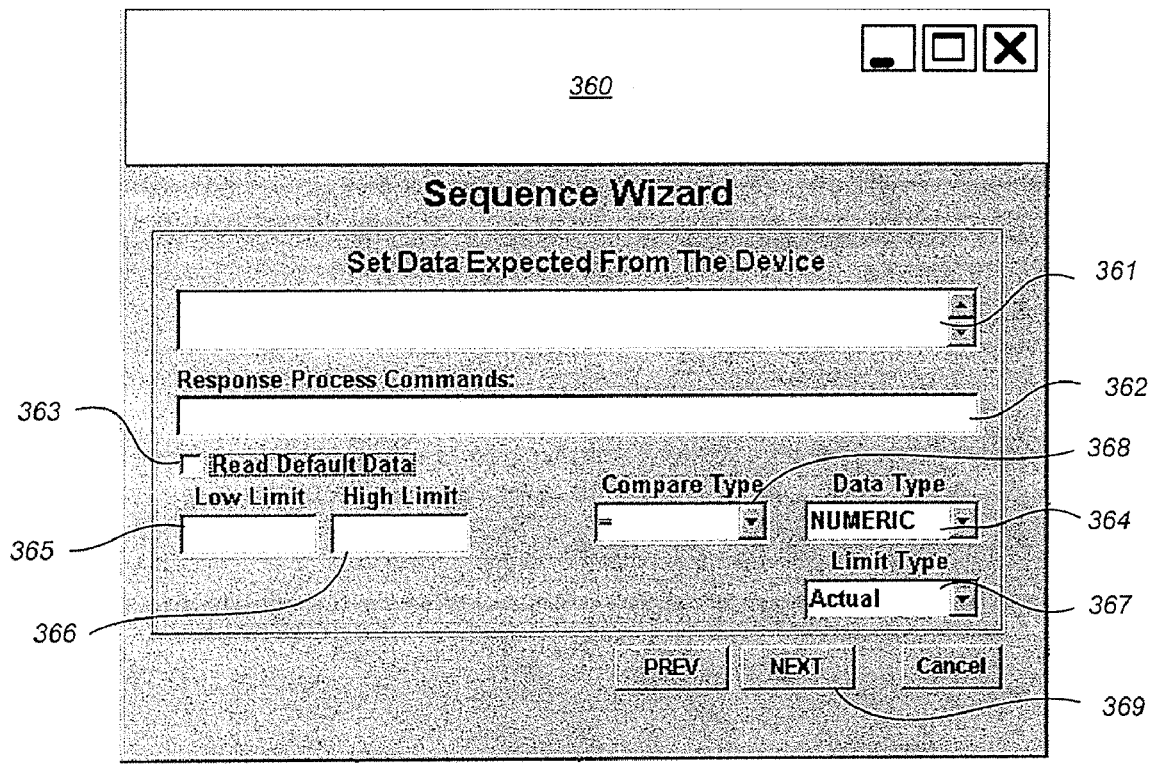
FIG. 36 is an illustration of a Sequence Wizard menu for prompting a user to associate a device with a sequence according to the invention.

The next Sequence Wizard window displayed by the translator software is window 360 shown in FIG. 36. Here, the user is prompted in field 361 to enter read data that is expected from the device being created. The expected read data may then be compared to data that is actually received in order for the software to evaluate test results as pass or fail. As an alternative to specifying expected read data in field 361, the user may select check box 363 to use the default response data that was previously established for the device using Device Wizard window 230. Help notes created for the device under test using the Device Wizard may also be displayed in this window.

Field 362 is provided to allow the user to specify any further processing of read results that may be required before the actual comparison. For example, a read result may contain bits that may need to be ignored or masked in order to effect an accurate comparison to the expected read data. In this case, a process command such as keyword MASK may be entered into field 362. A command line such as MASK 0x<[hex value]> causes the response data and the expected data to be bit-compared minus the masked bits. In this type of command, any bit in the MASK value that is high (i.e. a logical 1) is considered masked.

Field 364 is provided to prompt the user to select the type of data that the sequence is expected to process. In one embodiment, the type of data selected may be provided using a drop-down list that contains some or all possible data types. For example, the possible data types may be TEXT, NUMERIC, or COUNTER. Field 365 prompts the user to specify the type of comparison to be made between the expected data and the read data. In one embodiment, the comparison type may be selected using a drop-down list that contains some or all possible comparison types. For example, if the selected data type is NUMERIC or COUNTER, the comparison types displayed in the drop-down list for field 365 may include: less than (<), greater than (>), less than or equal to (<=), greater than or equal to (>=), equal to (=), less than or greater than (<>), greater than a high limit (>H), less than a low limit (<L), or less than a low limit or greater than a high limit (L<>H). If a comparison type is specified that uses a low limit (L) or a high limit (H) in making a comparison, the translator software prompts the user to enter values for L and H in fields 365 and 366, respectively. Field 367 is provided to prompt the user to specify the limit type. This field may also provide a drop-down list indicating some or all possible limit types, such as an actual limit, an offset limit, or a percent limit. An actual limit may be selected to set a limit value that represents an absolute value for a low or high limit. An offset limit may be selected to set a limit value that allows read data to deviate from the expected data by an absolute amount. A percent limit may be selected for a limit value that allows read data to deviate from the expected data by a percentage of the expected data.

If the selected data type is TEXT, the comparison types displayed in the drop-down list for field 368 may include an equal-to comparator (=Text) for comparing text strings, in addition to the (>=), (<=), (>), (<),(=) and (<>) comparison types. In one embodiment, when (=Text) is specified, if a long text string is returned by the device under test, the text string may be parsed to find a text string segment that matches the expected response. All other comparison types in the drop-down list for comparing TEXT data types compare the actual numeric length of the text. Other comparison types other than those listed here are possible within the scope of the invention. User selection of button 369 moves the translator software to the next window in the Sequence Composer.

Figure 37:
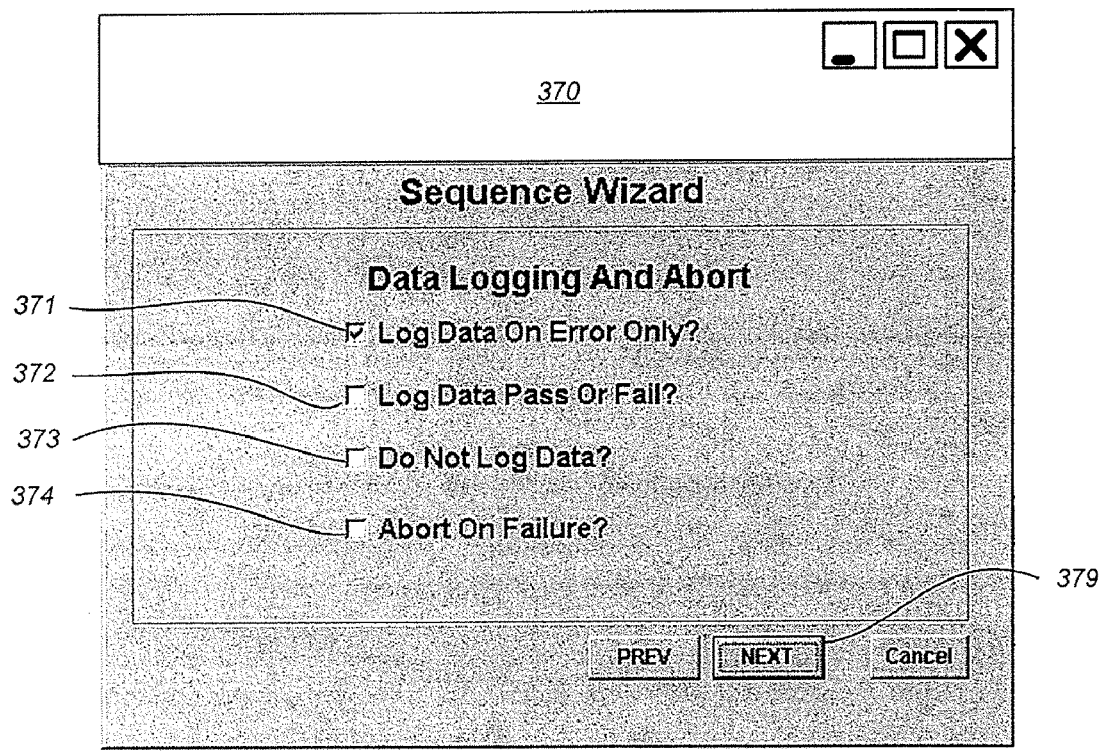
FIG. 37 is an illustration of a Sequence Wizard menu for specifying data logging and abort conditions in a sequence according to the invention.

FIG. 37 shows the next window 370 which the translator software displays to prompt the user to specify preferences for data logging. Check box 371 may be selected if the user wishes to log data only when an error occurs when running the sequence. Check box 372 may be selected if the user wishes to log data for sequences that when run, result in either a pass or fail. Check box 373 allows the user to specify that data not be logged for the sequence. In one embodiment, only one of check box 371, 372 and 373 may be selected. Check box 374 may be selected whether or not another check box is selected in window 370, to specify that sequence execution must halt in the event of a failure. There are many reasons why a user may wish to select check box 374. For example, a sequence that operates a production line being run in real time using the translator software may need to be halted if tests indicate a failure of a hardware device, or failure of an acceptance test, to allow for corrective action prior to continuing. User selection of button 379 moves the translator software to the final window in the Sequence Composer.

Figure 38:
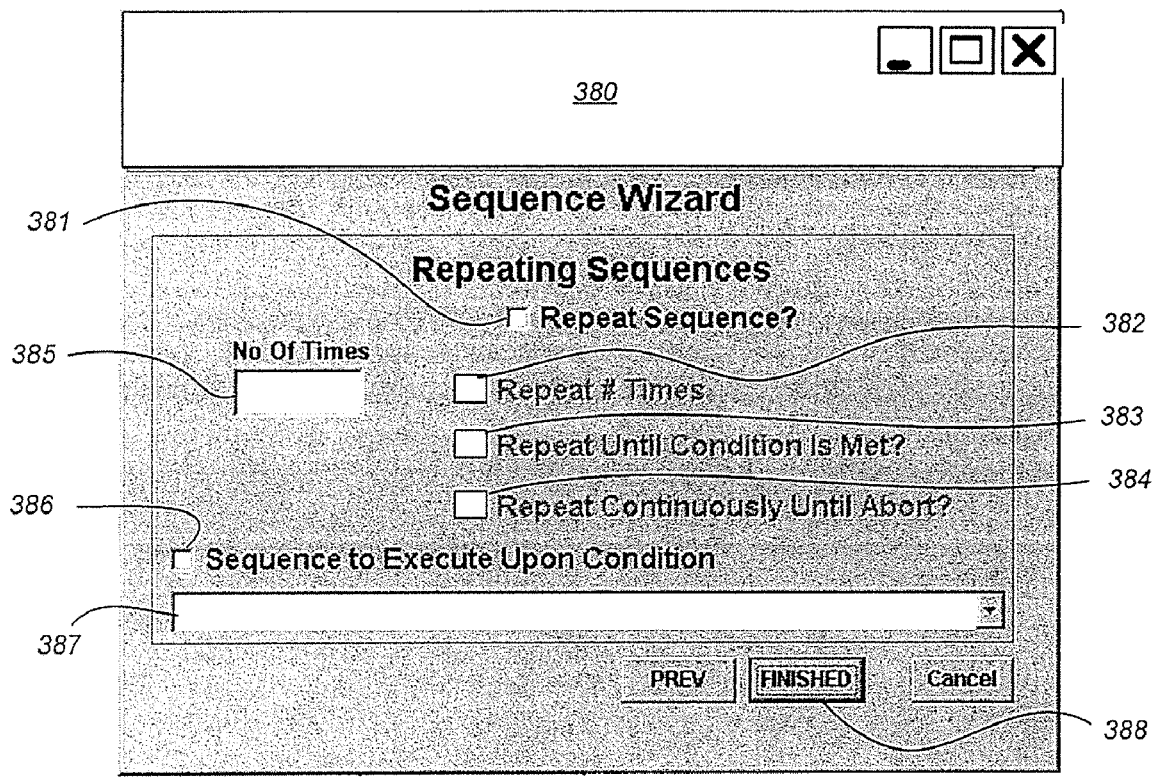
FIG. 38 is an illustration of a Sequence Wizard menu for specifying repeat conditions in a sequence according to the invention.

FIG. 38 illustrates a window 380 of the Sequence Wizard that allows the user to specify options related to repeating a sequence. Completion of this menu may be optional, as it may not be necessary to take additional action after the sequence has run. If the user wishes to repeat a sequence, the user may select check box 381. In one embodiment, when check box 381 is selected, the translator software prompts the user to enter additional information by making check boxes 382, 383, and 384 available. If the user wishes to specify a number of times for the sequence to repeat, check box 382 may be selected and the user may then enter the number of repetitions into field 385. The sequence, when run, will repeat itself incrementally until the number is reached.

If the user wishes to repeat the sequence only when a condition is met, check box 383 may be selected. Here, the condition referred to is a match of read data to expected data as previously specified for the sequence in window 360. The sequence, when run, will continue to repeat until the condition is true, i.e. until a comparison of read data to expected data yields a match. In one embodiment, this option may be selectable along with check box 382, such that if check box 383 is selected and a number is entered in check box 382, the sequence will repeat until either the specified number of repetitions is reached or until the condition is true.

The user may also select check box 384 to allow the sequence to repeat indefinitely until a signal to abort the sequence is received. This selection may be made along with any other selections in window 38. Advantageously, this selection provides the user with a fail-safe method to ensure that a running sequence may be halted.

When check box 386 is selected, the translator software allows the user to run another sequence when the match condition is met. The drop-down menu provided at field 387 allows the user to select an existing sequence from the database to be executed as a subroutine during the running of the sequence being created. When the subroutine sequence is selected using mouse selection means, it may be displayed for the user in field 387. In one embodiment, during execution of the current sequence, after the subroutine is called and has run its course, the current sequence will continue running where it left off. If the user is composing a sequence to operate a group of sequences as specified on window 330, selection of check box 386 will allow the subroutine sequence to be called when any condition is met during execution of the sequence group.

Figure 39:
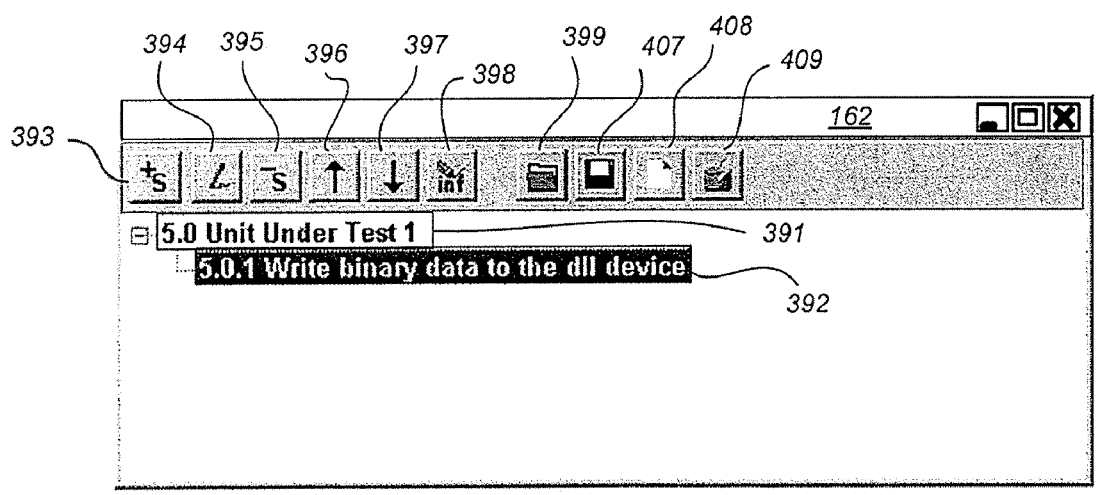
FIG. 39 is an illustration of a Sequence Editor window displaying an ordered list of sequences created using the Sequence Wizard.

In window 380, when FINISHED button 388 is selected, the translator software saves the sequence to the database and closes the Sequence Wizard. FIG. 39 shows one embodiment of a Sequence Editor window 162 after at least one sequence has been saved to the database. A file list 391 is displayed in the window listing sequences in the database. Each lower tier sequence 392 is listed as separate file associated with its corresponding higher tier sequence or sequence heading 393. In addition, as long as at least one sequence is saved to the database, additional toolbar buttons (e.g. those shown to the left of button 294) become active, to prompt a user to perform other sequence editing tasks.

In one embodiment, one or more of the following toolbar buttons may be provided on Sequence Editor window 162: add new sequence button 393, edit sequence button 394, delete sequence button 395, move sequence up button 396, move sequence down button 397, edit file button 398, load sequence button 399, save sequence to disk button 407, create sequence file button 408, and save sequence to database button 409. Each of these buttons may be selected to perform a task on a sequence that is highlighted in the window. By selecting button 393, a user may be prompted by a window such as window 300 to add an existing sequence to the list. Selection of button 394 displays an appropriate window to allow a user to edit data for an existing sequence, such as that shown in window 290. Button 395 deletes a highlighted sequence from the database for users having the proper security level. Button 396 moves a saved sequence up by one line in the sequence list, and button 397 moves a saved sequence down by one line in the sequence list. In one embodiment, the moved sequences are automatically renumbered to maintain proper sequential numbering. Button 398 allows a user to edit file information for a saved sequence. Button 399 loads a saved sequence as the current sequence for purposes of editing or running. Button 407 saves a selected sequence file to a disk location. Button 408 allows a user to create a new sequence file, and button 409 saves a selected sequence to the database.

Working With Groups of Sequences

Groups of sequences are useful when special routines outside of the normal sequence execution need to be performed. Using groups of sequences, a current sequence may be halted and later resumed after a special routine (or subroutine) has run its course. Sequence groups are also useful when a continuous loop is needed for monitoring, or when repetitious tasks need to be performed such as repeating robotic action. Sequence groups are also useful to effect graceful shutdown of devices, equipment, or certain hardware.

Figure 40A:
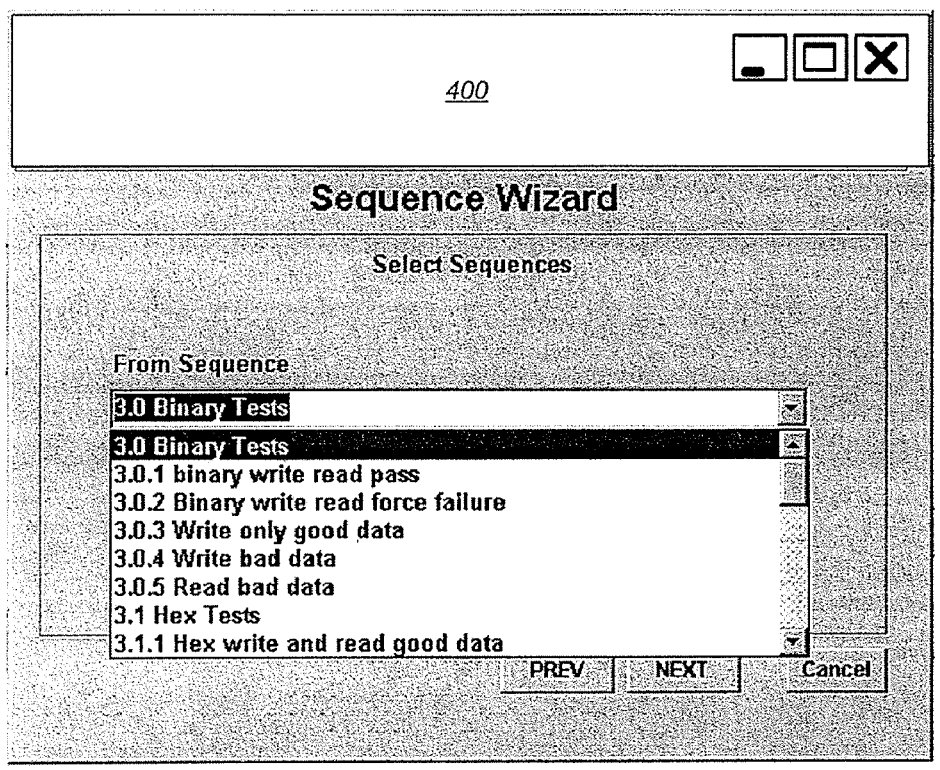
FIG. 40A is an illustration of a Sequence Wizard menu showing a user selecting a starting sequence for running a range of sequences according to the invention.
Figure 40B:
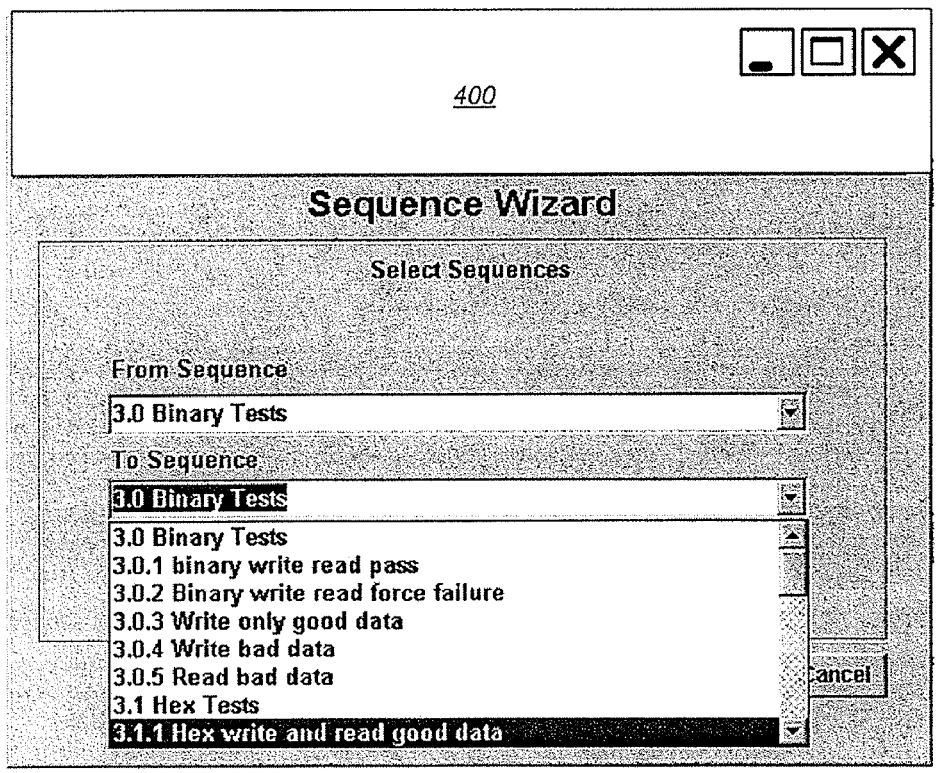
FIG. 40B is an illustration of a Sequence Wizard menu showing a user selecting an ending sequence for running a range of sequences according to the invention.
Figure 40C:
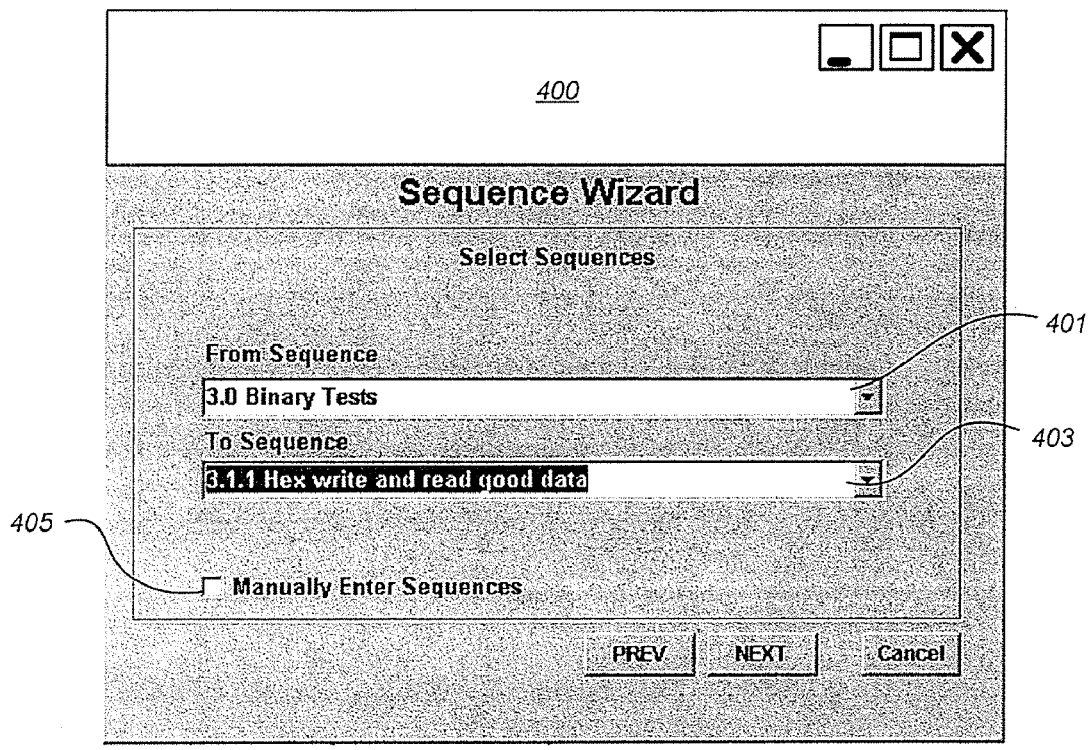
FIG. 40C is an illustration of a Sequence Wizard menu showing final selections of a range of sequences to be run according to the invention.

The translator software allows a user to work with sequence groups by selection of check box 332 on window 330 in the Sequence Wizard. This allows the user to select a range of sequences or to manually select individual sequences that make up a group. When check box 332 is selected and the user then selects button 339, the translator software displays the Select Sequences window 400, as shown in FIGS. 40A-40C. This window displays, in order according to sequence number, a list of sequences saved to the database. To select a range of sequences, the user selects, from the drop-down lists using mouse selection means, a starting sequence number as shown in FIG. 40A, and an ending sequence number as shown in FIG. 40B. The results of these selections are shown in FIG. 40C, with the starting sequence number displayed in field 401 and the ending sequence number displayed in field 403. So selected, all sequences within the range including the start and end sequences will be executed when called during run time.

Figure 41:
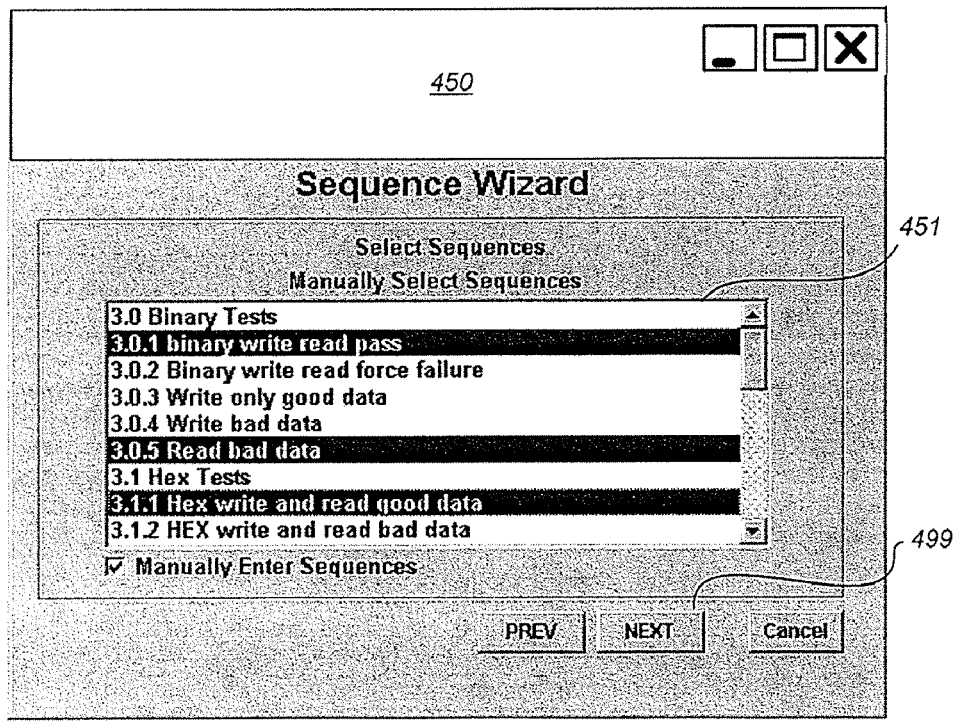
FIG. 41 is

Alternatively, the user may select check box 405 to specify manual selection of sequences that compose the group. When check box 405 is selected, the translator software displays window 450 as shown in FIG. 41. Manual selection of sequences may be effected by individually selecting, from the list of sequences 451, each of the sequences needed for the group. When the selection is complete, the user may select button 499 to continue. The translator software then displays the Repeating Sequences window, and sequence creation may continue as described above in the context of window 380.

Abort Sequence

The abort sequence is special list of sequences that allows for a graceful shut down of attached devices or equipment. These are constructed as normal sequences, but the top level heading must read as "Abort" and placed at the end of all other sequences. The graceful shutdown means that the sequences must be constructed to take action in re-initializing or re-starting devices or attached equipment.

Running Sequences

Figure 42:
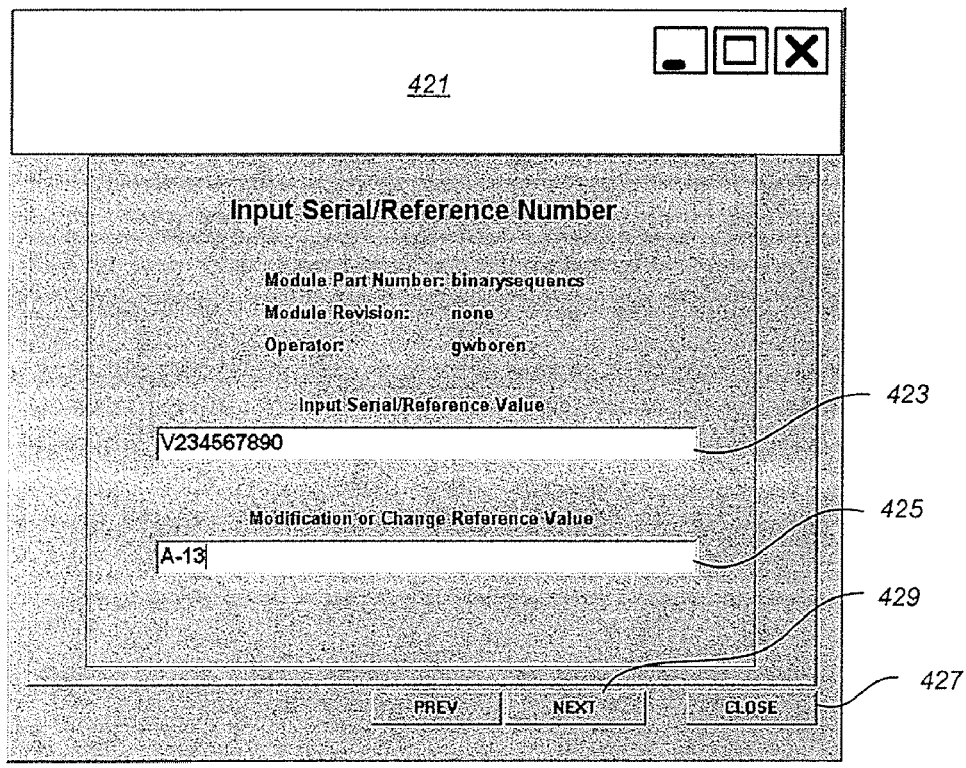
FIG. 42 is an illustration of a Run Composition menu for prompting a user to enter data identifying a module under test when running a sequence according to the invention.

With reference again to FIG. 13, the translator software according to the invention allows a user to run a sequence composed using the Sequence Editor to control a device created using the Device Editor by selecting option 133. In a preferred embodiment, any user may have authority to select this option. When selected, the translator software displays a Run Composition window 140 shown in FIG. 14. Window 140 may display a list 141 of module names and a list 142 of sequence names. In one embodiment, the user must select a module name and a sequence name in order to enable the NEXT selection button 149. When a module name is selected from list 141, list 142 will display sequence names associated with the selected module. When button 149 is selected, a window 421 may be displayed as shown in FIG. 42. This window may allow a user to enter a serial number or other reference number in field 423 for association with the sequence to be run. Similarly, a user may enter a modification or other change reference number in field 425. These entries may be optional steps when running a sequence. If the user selects the CLOSE button 427, the program will return to the menu of FIG. 13. If the user selects the NEXT button 429, the program advances to the next Run Composition window 431.

Figure 43:
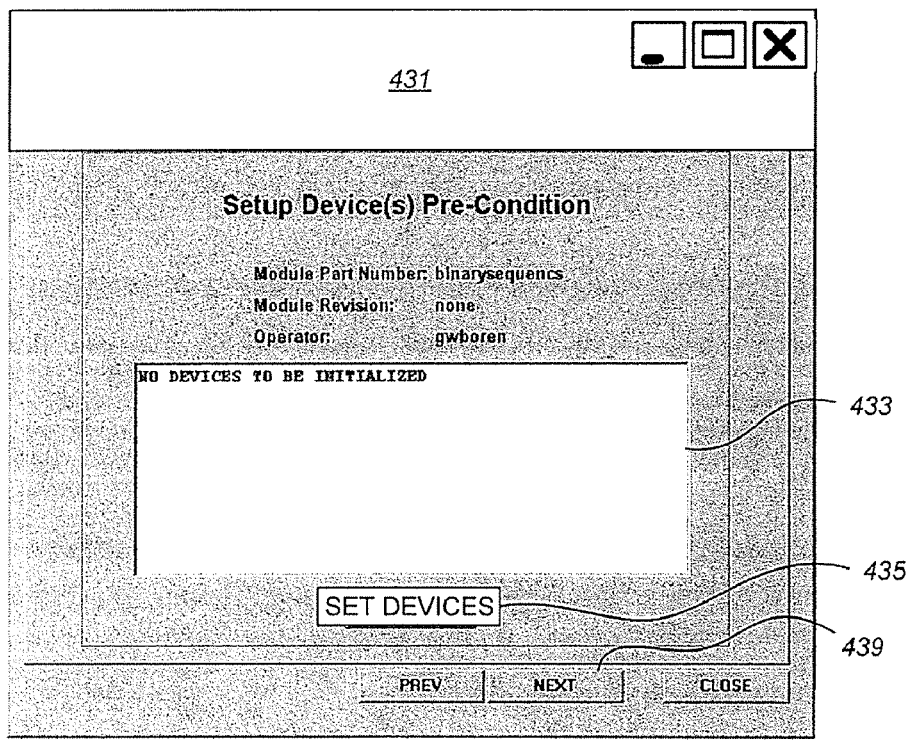
FIG. 43 is an illustration of a Run Composition menu for prompting a user to initialize devices to be run in a sequence according to the invention.

Window 431 is shown in FIG. 43. Using this window, the translator software allows the user to initialize any devices that need to be initialized prior to being controlled or otherwise manipulated when running the desired sequence. Any such devices will have been identified using the Device Wizard procedures previously described, and will be listed in field 433. If there are devices that need to be initialized, the set devices button 435 will be enabled for selection. When a user selects button 435, all devices listed in field 433 will be initialized according to the initialization procedure prescribed using the Device Wizard. Selection of the NEXT button 439 causes the translator software to display window 440.

Figure 44:
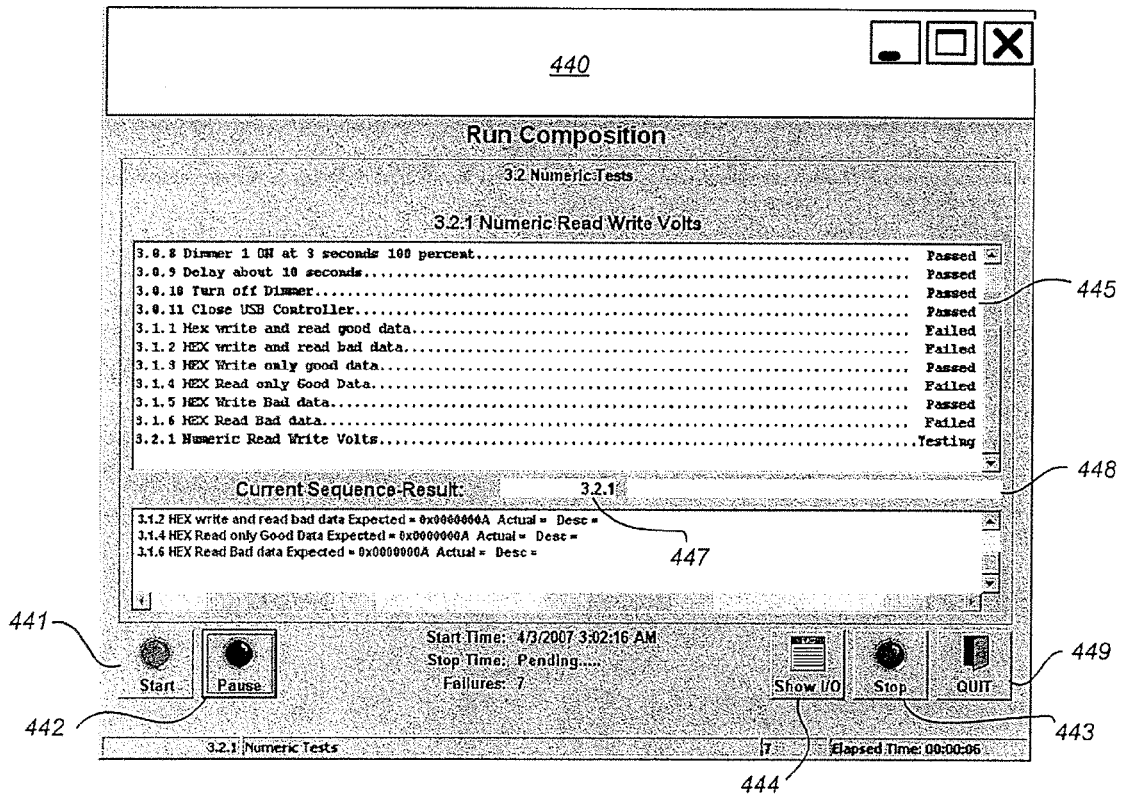
FIG. 44 is an illustration of a Run Composition menu showing user controls for, and results of, running a sequence according to the invention.

Window 440 is the main Run Composition window, shown in FIG. 44. This window, when displayed, contains indicia identifying the sequence selected by the user in window 140. Using window 440, the user may run the selected sequence and view the results using appropriate control buttons 441, 442, 443 and 444. Start button 441 allows the user to start the selected sequence. Pause button 442 pauses a running sequence. Stop button 443 stops the sequence. Show I/O button 444 when selected displays the steps being executed in field 445, and any results in field 446. In one embodiment, the current sequence step (or section number) being executed is displayed in field 447, and the result (if any) of executing that step may be displayed in field 448. Button 449 allows the user to exit from window 440 and return to a main menu.

In window 440, once the sequence has run to completion, or is stopped or otherwise halted, the translator software may prompt the user to save the results. This may be effected, for example, by means of a prompting window. In one embodiment, the user may also have the option of entering comments to be recorded with the saved results. If a logging data option has been established for the sequence using the Sequence Editor, the results will be automatically stored in a database table.

Figure 45:
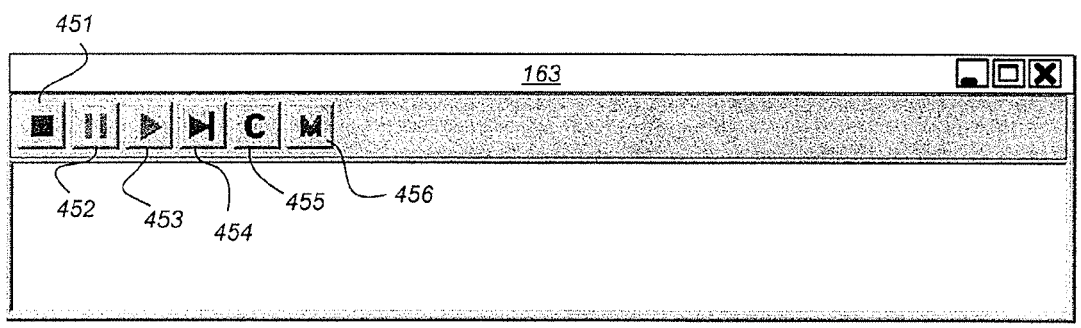
FIG. 45 is an illustration of toolbars available for user selection in a Sequence Results window for running sequences and viewing results according to the invention.

Once a sequence file with at least one sequence has been loaded or created, the translator software allows a user an alternative means to run the sequence using the buttons in the Run Sequences window 163. A maximized version of window 163 is shown in FIG. 45. This window contains the following task buttons, each of which performs its designated task when selected by the user using mouse selection means. Button 451 stops a currently running sequence. Button 452 pauses a currently running sequence. Button 453 runs a current sequence, i.e. executes a sequence that has been loaded. Button 454 runs a selected sequence only (single sequence execution), without executing any other associated sequences. Button 455 clears the run windows 163, 164 and 165 and returns available memory logged during the run. Button 456 returns available memory. During the running of sequences, the translator software may display any logged errors in the Error Capture window 164. If data logging is selected, the translator software displays the logged data in the Input/Output Capture window 165.

Records Module

The translator software provides a Records Module 29 that allows a User, Operator, or Administrator to view and print datasheets. The Records Module also allows a user with proper security level (e.g. an Administrator) to save data results to the database as a file, or to delete composition or results tables. The Records Module may be accessed by selection of the Records Menu window 134 of FIG. 13.

Figure 46:
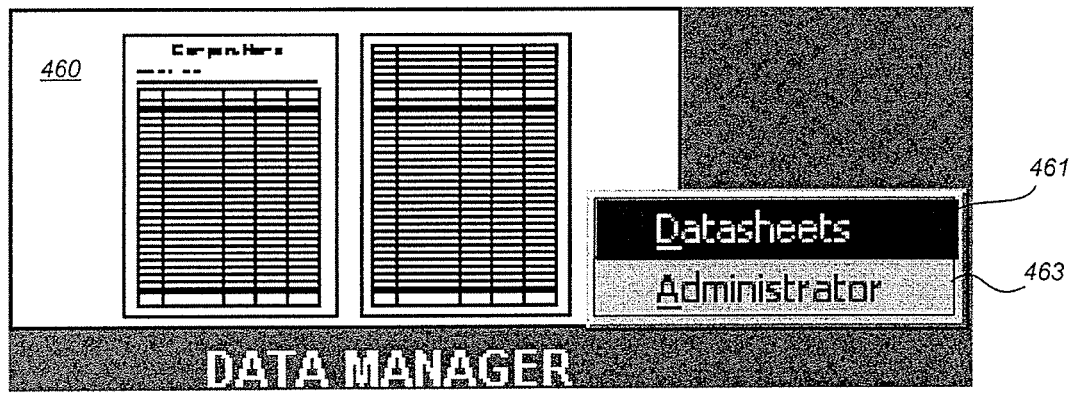
FIG. 46 is an illustration of a main Data Manager menu according to the invention.

When window 134 is selected, the translator software displays a data manager window 460, as shown in FIG. 46. This window gives a user two choices for selection: a "Datasheets" option 461 and an "Administrator" option 463. If the Datasheets option 461 is selected, the translator software opens the Datasheets Wizard. In a preferred embodiment, any user has proper security level to view and print datasheets; however, only an Administrator may save a datasheet, e.g., as an RTF file or as a comma delimited file.

Figure 47:
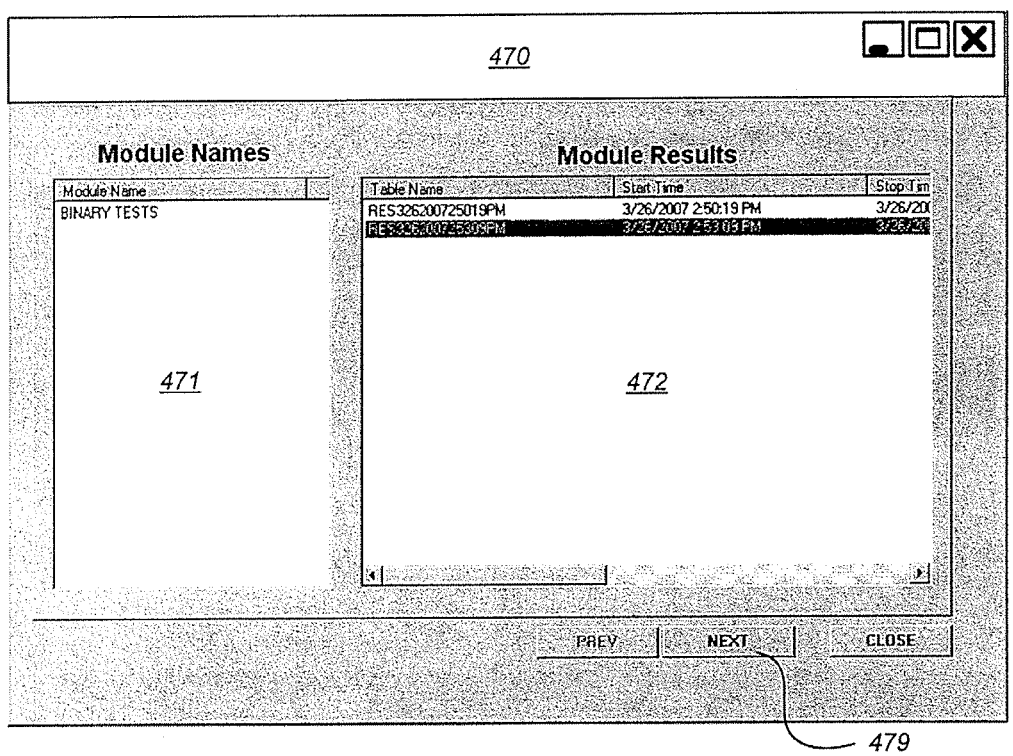
FIG. 47 is an illustration of a Datasheets Wizard menu displaying file lists of records saved according to the invention.

The first screen in the Datasheets Wizard is window 470 shown in FIG. 47. In the embodiment shown, window 470 may contain a file list of module names 471 and a file list of datasheets 472. The module names list 471 displays all of the modules for which datasheets exist. Datasheets are saved files of data logged that capture the results of running a particular sequence (or sequence group) associated with a selected module name. When a module name in list 471 is selected (or highlighted by mouse selection means), the module results list 472 lists all of the existing datasheets that correspond to the selected module name. A user may then select one of the datasheets. Selection of button 479 may then allow the user to view or save the selected datasheet in the next window.

Figure 48:
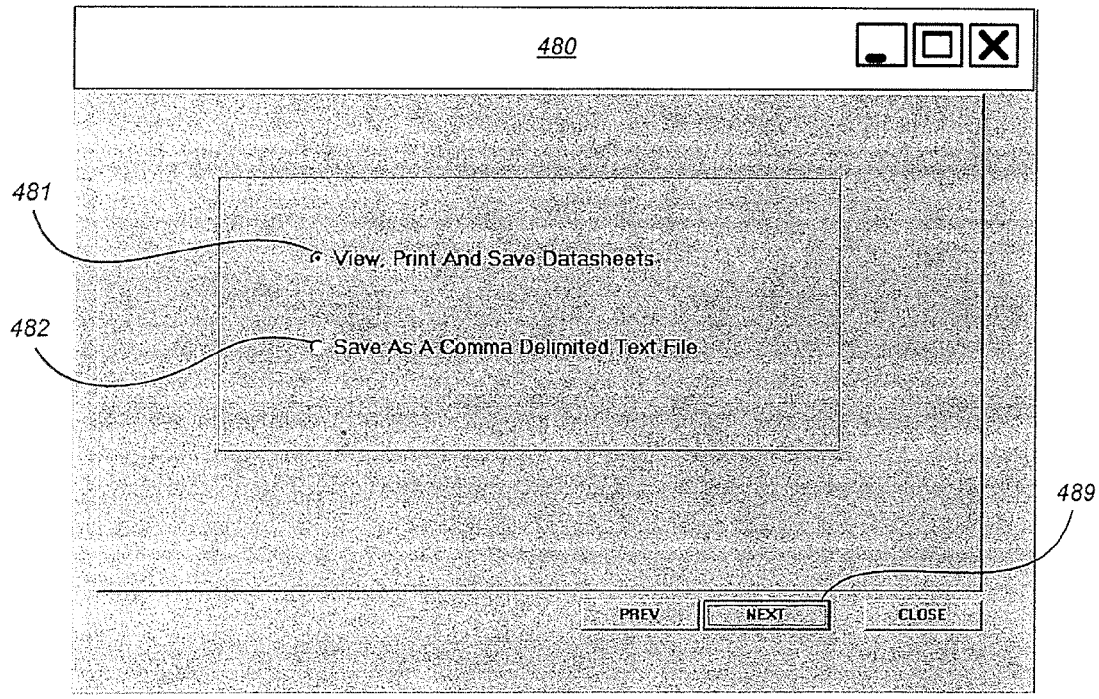
FIG. 48 is an illustration of a Datasheets Wizard menu prompting a user for datasheet management options according to the invention.
Figure 49:
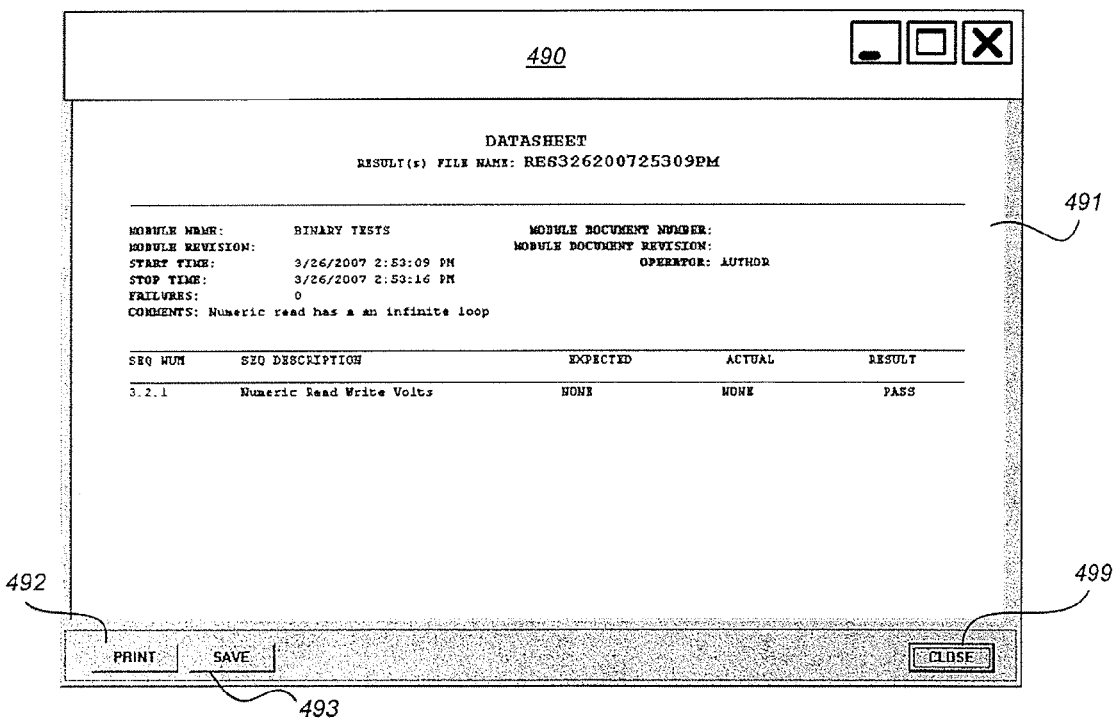
FIG. 49 is an illustration of a window for displaying and printing module results according to the invention.

The next window of the Datasheets Wizard is window 480 shown in FIG. 48. In this menu, the user may select option 481 to view, print and save the selected datasheet. Or, the user having proper security level may select option 482 to save the datasheet as a comma delimited text file. With option 481 selected, selection of button 489 causes the translator software to display the Viewer form 490, an example of which is shown in FIG. 49. Field 491 displays the data, and may allow the user to print the data using button 492, or save the datasheet in RTF format using button 493. Button 499 closes the Viewer.

Figure 50A:
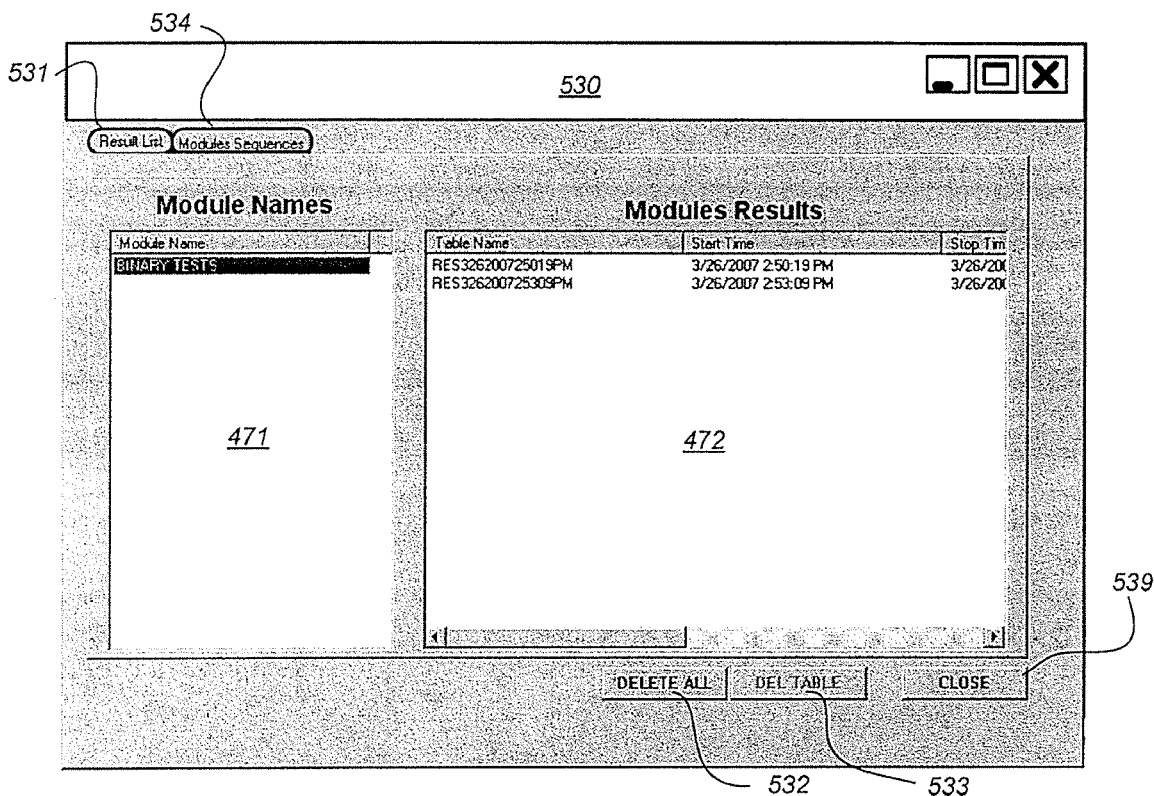
FIG. 50A is an illustration of a Datasheets Wizard menu allowing options for an Administrator to delete selected module records according to the invention.
Figure 50B:
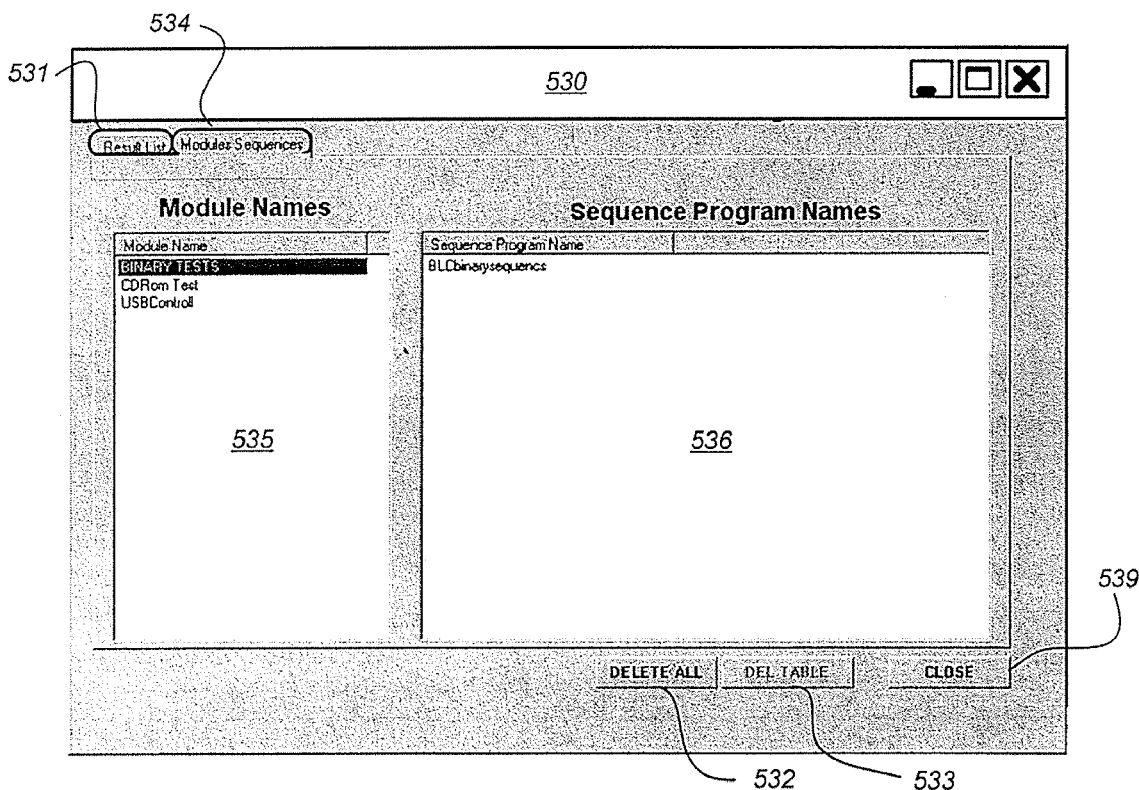
FIG. 50B is an illustration of a Datasheets Wizard menu allowing options for an Administrator to delete selected sequence records according to the invention.

If on window 460 a user having proper security level (i.e. and Administrator) selects the Administrator option 463, the translator software opens the Database Manager window 530 shown in FIGS. 50A and 50B. In one embodiment, if the Results List tab 531 is selected, window 530 may display the same lists 471 and 472 of module names and datasheets as window 470. In addition, window 530 may provide an option at button 532 for the user to delete all results datasheets associated with a selected module name, and an option at button 533 for the user to delete an individually selected datasheet. If the Module Sequences tab 534 is selected, window 530 may display a list 535 of module names, and a list 536 of sequence names. When a module name in list 535 is selected, all sequence names related to the selected module name may be displayed in list 536. The user may then have the option to remove any unwanted modules or sequence compositions from the database using buttons 532 and 533. Selection of button 539 closes the Database Manager window 530.

Translator Software Methods

With the foregoing description of translator software in mind, as supplemented by the various embodiments and examples of relevant parts thereof that are possible within the scope of the invention, it should be apparent to an artisan skilled in the relevant art that many variations on methods of practicing the invention are possible. A representative disclosure of such methods is presented here.

Figure 51:
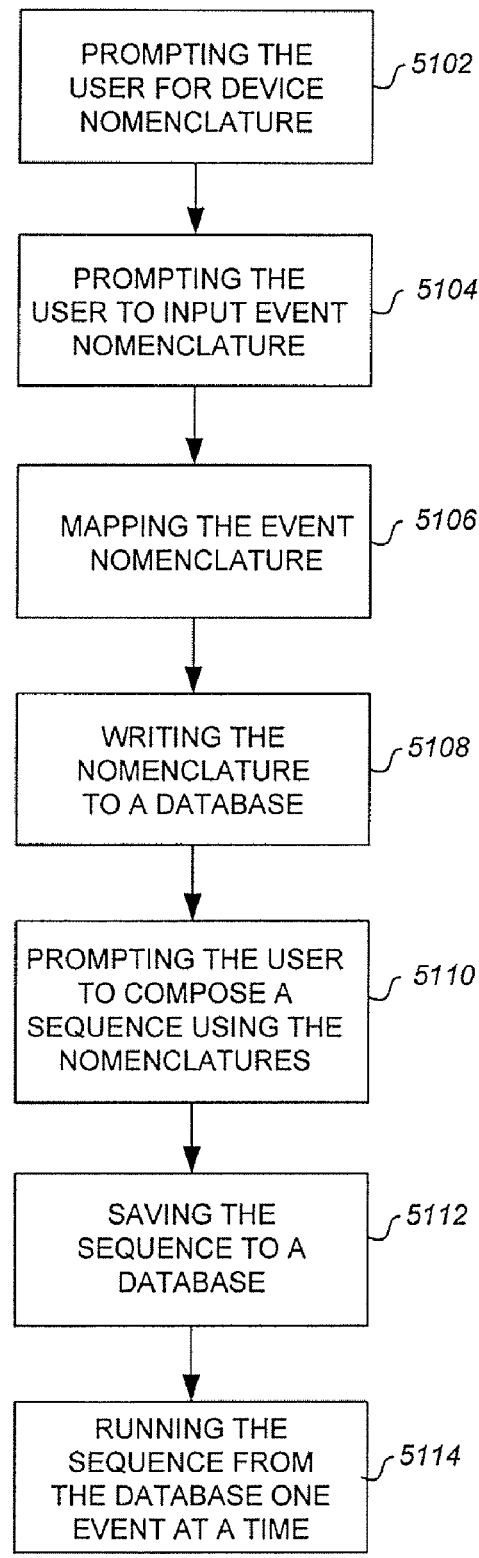
FIG. 51 is a process flow diagram of one embodiment of the invention whereby translator software enables a computer user to create a procedure for operating a module external to the computer.

FIG. 51 shows one embodiment of a method 5100 according to the invention. In method 5100, the translator software enables a computer user to create an executable procedure for executing a sequence of events in a module external to the computer. In the first step 5102, the user may be prompted to input device nomenclature for representing a device. This allows the user to enter a familiar term such as "PRINTER" or "CDROM" for describing the device. Prompting may be accomplished using menus displayed on the computer monitor, as shown and described throughout the disclosure in the context of the Device Wizard. In the next step 5104, the user may be prompted to input event nomenclature representing one or more events (or functions) to be processed by the one or more devices named in the previous step. Again, the user may enter familiar terminology by means of a window or other input method. In one embodiment, a menu such as window 180 may prompt a user in the first two steps.

The next two steps may be invisible to the user. In step 5106, the event nomenclature entered in the previous step is mapped to, or associated with, another location or file accessible by the computer. In one embodiment, the accessible location may be an executable file. In step 5108, the device nomenclature and event nomenclature may be written to a database accessible by the computer. In one embodiment, the database in stored in local memory. In another embodiment, the database (e.g. Firebird) whose installation is ensured during startup of the translator software.

Method 5100 then proceeds to step 5110. In step 5110, the user may be prompted to compose a sequence containing the device nomenclature and the event nomenclature. This step may be performed as shown and described throughout the disclosure in the context of the Sequence Wizard. In step 5112, the sequence so composed is saved to the database. In the final step 5114, upon user command the sequence is run by parsing the event nomenclature from the database one event at a time. In one embodiment, the parsing sequence is performed according to the general process of steps 304-314 of FIG. 3B.

Figure 52:
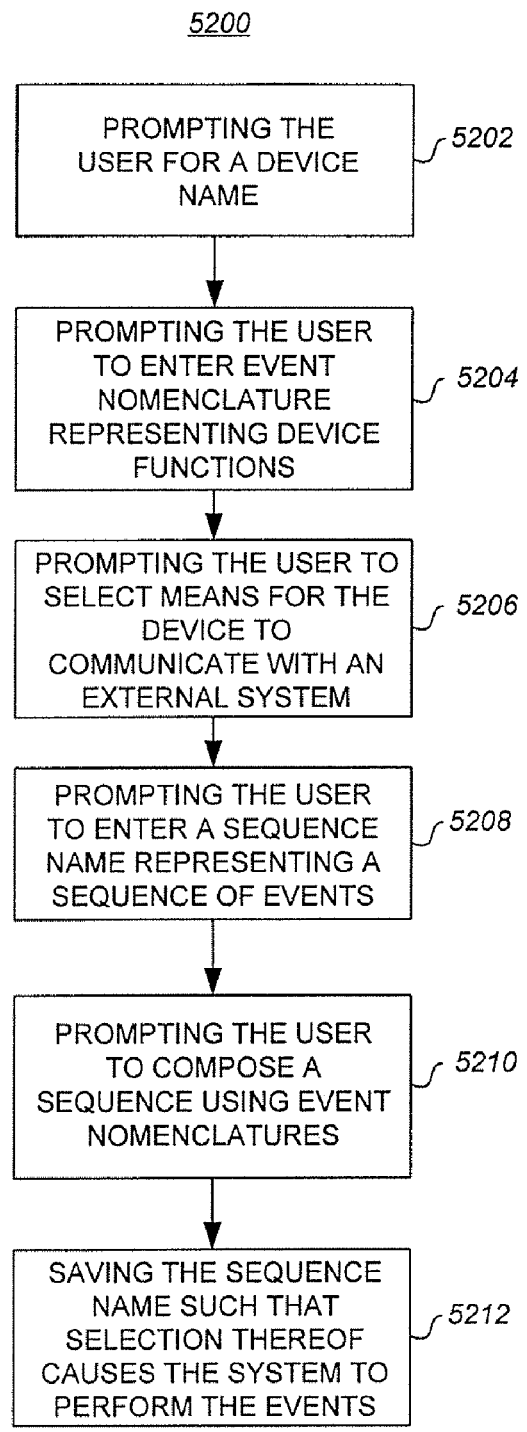
FIG. 52 is another process flow diagram of an embodiment of the invention whereby translator software through a GUI interface enables a computer user to create a procedure for operating a system external to the computer.

FIG. 52 shows another embodiment of a method 5200 according to the invention that enables a computer user to create a procedure for automatically executing a sequence of events in an external system. The first two steps are similar in character to the initial steps of method 5100, and may be performed using a Device Wizard. Step 5202 prompts a user to enter a device name representing a device, and step 5204 prompts the user to enter event nomenclature representing one or more functions of the named device. The next step 5206 prompts the user to select a means for the device to communicate with the external system. For example, selecting the communication means may be equivalent to specifying a device type, whether a DLL device, a memory mapped device, a pre-defined device, or an executable-launch device.

In the next step 5208, the user may be prompted to enter a sequence name representing the sequence of events. In one embodiment, the sequence of events may consist of a single event. The sequence may be composed in the next step 5210, for example, by prompting the user using the Sequence Wizard to select the events from the event nomenclature. In the final step in the method, step 5212, the sequence name is saved in the computer system, such that when the user selects the sequence name for execution, the device through its selected communication means causes the external system to perform the functions according to the sequence of events. In one embodiment, the these functions may be performed event by event in a parsing sequence as indicated in the general process of steps 304-314 of FIG. 3B.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for enabling a computer user to create an executable procedure for executing a sequence of events in a module external to the computer, the method comprising:
   prompting the user to input device nomenclature representing one or more devices;
   prompting the user to input event nomenclature representing one or more events to be processed by the one or more devices;
   mapping the event nomenclature to an executable file accessible by the computer;
   writing the device nomenclature and the event nomenclature to a database accessible by the computer;
   prompting the user to compose a sequence containing the device nomenclature and the event nomenclature;
   saving the sequence to the database; and
   running the sequence upon user command by parsing event nomenclature from the database one event at a time.

2. The method of claim 1 wherein the devices are selected from the group comprising DLL devices, memory mapped devices, pre-defined devices, and executable-launch devices.

3. The method of claim 1 wherein each device has at least one of a read interface and a write interface.

4. The method of claim 3 further comprising prompting the user to input with the device nomenclature a placeholder representing a write value to be entered when running the sequence.

5. The method of claim 1 further comprising saving the sequence to the database as a text file.

6. The method of claim 1 wherein the prompting steps further comprise displaying a menu using a graphical user interface.

7. The method of claim 1 wherein the user command is received via a graphical user interface.

8. In a computer system having a graphical user interface, a method for enabling a computer user to create a procedure for automatically executing a sequence of events in a system external to the computer system, the method comprising:
- prompting the user to enter a device name representing a device;
- prompting the user to enter event nomenclature representing one or more functions of the named device;
- prompting the user to select a means for the device to communicate with the external system;
- prompting the user to enter a sequence name representing the sequence of events;
- prompting the user to compose the sequence of events by selecting each event from the event nomenclature; and
- saving the sequence name in the computer system, such that when the user selects the sequence name for execution, the device through the communication means causes the external system to perform the functions according to the sequence of events.

9. The method of claim 8 wherein the device is selected from the group comprising a DLL device, a memory mapped device, a pre-defined device, and an executable-launch device.

10. The method of claim 8 wherein the device has at least one of a read interface and a write interface.

11. The method of claim 10 further comprising prompting the user to enter with the event nomenclature a placeholder representing a write value needed for the device to communicate with the external system.

12. The method of claim 11 wherein the device causes the external system to perform at least one of the functions responsive to receiving the write value during sequence execution.

13. The method of claim 12 further comprising prompting the user to enter the write value as a default value during sequence composition.

14. The method of claim 10 further comprising prompting the user to enter with the event nomenclature a format for an expected read value to be received responsive to communicating with the external system.

15. A computer readable medium storing translator software enabling a computer user to create a procedure for automatically executing a sequence of events for operating a system external to the computer, the translator software comprising:
- a user module for controlling user access to the software;
- a device editor enabling the user to define a name and functional description for a device having at least one of a read interface and a write interface, and a means for communicating with the device;
- a sequence editor enabling the user to specify a sequence of events comprising at least one of a read and write operation from or to the device via the communication means;
- a sequence execution module enabling the user to run the sequence; and
- a records module enabling the user to store the device name, the device function, and the sequence in a database of the computer, such that when the sequence is selected for execution, the device through the communication means causes the external system to run the sequence of events.

16. The computer readable medium of claim 15 wherein the user module of the translator software provides a plurality of user security levels including a highest security level.

17. The computer readable medium of claim 16 wherein the user module of the translator software only allows a user having the highest security level to store the sequence.

18. The computer readable medium of claim 15 wherein during running of the sequence the sequence execution module compares read data received from the external system to an expected value to obtain a result.

19. The computer readable medium of claim 18 wherein the sequence execution module stores the result in the records module.

20. The computer readable medium of claim 15 wherein the sequence editor enables the user to specify storing sequence results in the records module upon occurrence of a sequence error.

* * * * *